United States Patent [19]
Hirai et al.

[11] Patent Number: 5,706,617
[45] Date of Patent: Jan. 13, 1998

[54] ROOF SYSTEM UTILIZING A SOLAR CELL

[75] Inventors: Takashi Hirai; Keisuke Hirai, both of Tokyo, Japan

[73] Assignee: Hirai Engineering Corporation, Tokyo, Japan

[21] Appl. No.: 581,960

[22] Filed: Jan. 2, 1996

Related U.S. Application Data

[62] Division of Ser. No. 155,306, Nov. 19, 1993, Pat. No. 5,497,587.

[30] Foreign Application Priority Data

Nov. 19, 1992 [JP] Japan ............................ 4-332249
Feb. 3, 1993 [JP] Japan ............................ 5-37278

[51] Int. Cl.$^6$ ............................................. E04D 13/18
[52] U.S. Cl. ................... 52/173.3; 33/645; 52/90.2; 52/105; 52/200; 126/621; 126/623; 136/251
[58] Field of Search .................. 33/613, 645; 52/1, 52/173.1, 173.3, 105, 90.1, 90.2, 198, 199, 200, 204.591, 204.597, 747.1, 748.1, 749.1; 126/621, 622, 623; 136/244, 251, 291

[56] References Cited

U.S. PATENT DOCUMENTS

| | | | |
|---|---|---|---|
| 3,135,070 | 6/1964 | Waring et al. | 52/90.3 |
| 4,228,791 | 10/1980 | Hirai et al. | 52/460 X |
| 4,336,413 | 6/1982 | Tourneux | 52/173.3 X |
| 4,579,303 | 4/1986 | Midlik | 52/105 X |
| 5,121,583 | 6/1992 | Hirai et al. | 52/90.1 |
| 5,164,020 | 11/1992 | Wagner et al. | 136/251 |
| 5,367,843 | 11/1994 | Hirai et al. | 52/200 |
| 5,406,936 | 4/1995 | Hirai et al. | 52/173.3 X |
| 5,497,587 | 3/1996 | Hirai et al. | 52/173.3 |
| 5,531,049 | 7/1996 | Hirai et al. | 52/200 |

FOREIGN PATENT DOCUMENTS

| | | |
|---|---|---|
| 0 417 303 | 2/1990 | European Pat. Off. . |
| 34 19 299 | 11/1985 | Germany . |
| 62-178650 | of 1987 | Japan . |
| 2-24443 | 1/1990 | Japan . |
| 92 09768 | 6/1992 | WIPO . |

*Primary Examiner*—Carl D. Friedman
*Assistant Examiner*—Kevin D. Wilkens
*Attorney, Agent, or Firm*—Lowe, Price, LeBlanc & Becker

[57] ABSTRACT

A roof system utilizing a solar cell comprising a first modular roof member composed of a plurality of first light collecting plate segments each of which having a solar cell embedded therein, the first light collecting plate segments being aligned in one direction and in the other direction perpendicular to the one direction; and a second modular roof member composed of a plurality of second light collecting plate segments each of which is equal in size to the first light collecting plate segment, the second light collecting plate segments being aligned in one direction and in the other direction perpendicular to the one direction, the number of the second light collecting plate segments in one direction being larger by one than that of the first light collecting plate segments.

4 Claims, 69 Drawing Sheets

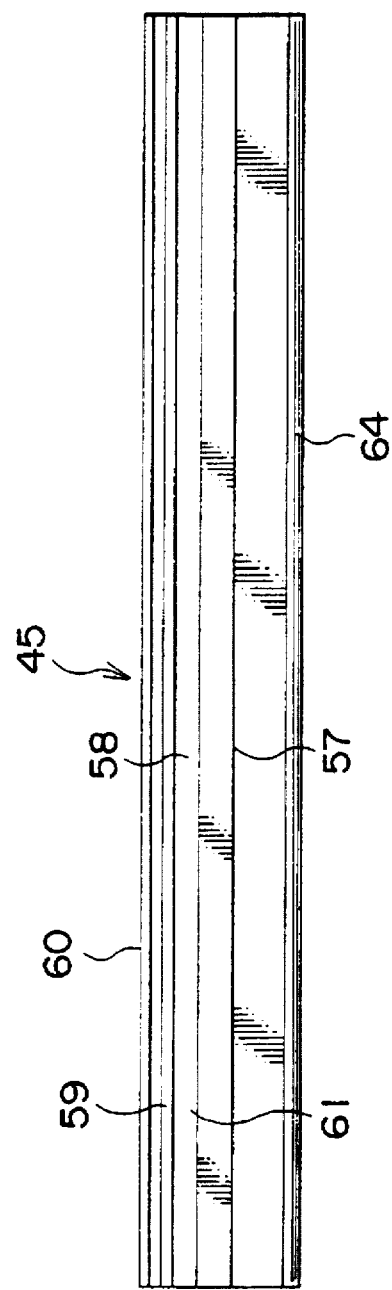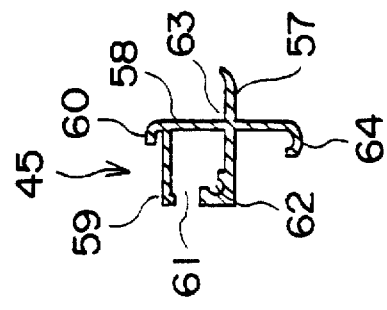

FIG. 35

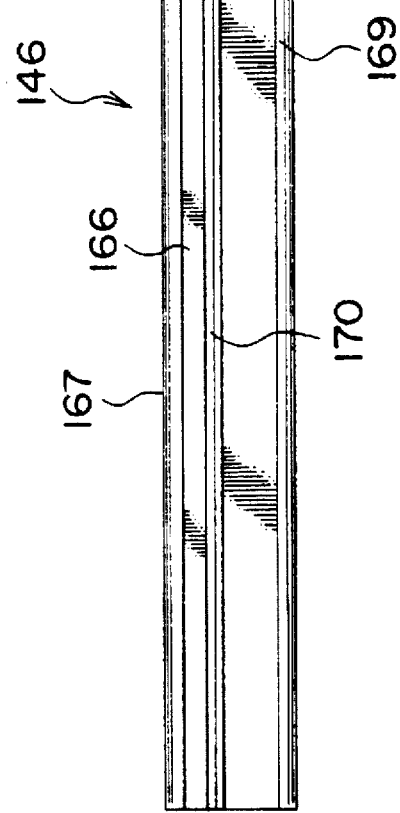
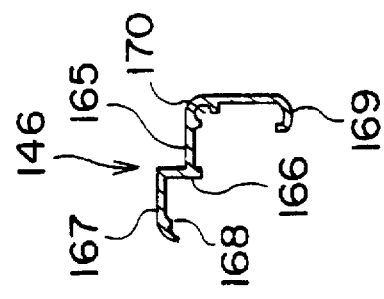

ROOF SYSTEM UTILIZING A SOLAR CELL

This application is a division of application Ser. No. 08/155,306 filed Nov. 19, 1993 now U.S. Pat. No. 5,497,587.

BACKGROUND OF THE INVENTION

This invention relates to a roof system utilizing a solar cell in which a length of each roof member having a solar cell embedded therein can be adjusted depending on a length of a roof in a lateral or slope direction thereof.

An error may sometimes be caused between the width of a roof member and that of the roof deck in a roof where roof members are connected to each other in the lateral direction through connecting members placed in the slope direction. In such a case, a conventional method requires to adjust the width by means of subjecting the roof members to working such as cutting, making a notch or soldering. This method, however, increases the necessary work in the field and is less efficient, so that it is seriously inadequate for the roof members with a solar cell embedded therein.

With this respect, the present applicant has previously suggested a method for adjusting a lateral width of a solar energy collecting roof as disclosed in Japanese Patent Laid Open No. 24443/1990. In this method, connecting members each of which has width adjusting portions at an external edge thereof are placed along the slope direction of the roof. Each of lateral edges of a lighting framework is engaged with the corresponding width adjusting portion of the connecting member. Thus, the lateral edge of tile lighting framework can be moved towards the center or a lateral edge of the connecting member to adjust the width of the roof members with respect to a sheating width. In addition, to change the width of a verge member results in cancellation of the error between the width of the roof member and that of the roof deck.

This method, however, is disadvantageous in that the verge member having a large width reduces an energy collection area with respect to the entire area of the roof to degrade light-gathering efficiency.

In addition, when an error is caused between the total length of the roof members and that of the roof deck in the slope direction in a roof where a plurality of roof members are connected in the slope direction, it is necessary to adjust the width thereof by means of subjecting the roof members to working such as cutting, making a notch or soldering, which increases the necessary work in the field and is less efficient. Consequently, this method is seriously inadequate for the roof members with a solar cell embedded therein.

With this respect, the present applicant has previously suggested a solar energy collecting roof as disclosed in Japanese Patent Laid Open No. 178650/1987. In this method, three divergent lighting members are combined that are different from each other in length in the slope direction. A plus/minus adjusting device is slidably attached to the uppermost end of each lighting member at the edge of the roof. A combination of the lighting members is varied as well as the plus/minus adjusting device is moved in the slope direction to cancel the error between the length of the lighting member and that of the roof deck in the slope direction.

SUMMARY OF THE INVENTION

An object of the present invention is to provide a roof system utilizing a solar cell in which the length of each roof member having a solar cell embedded therein can more readily be adjusted with respect to the length of the roof in a certain direction.

Another object of the present invention is to provide a roof system utilizing a solar cell that has high efficiency of a solar energy collection.

It is still another object of the present invention to provide a roof system utilizing a solar cell of which roof members are normalized to improve the productivity and are applicable to a roof of any length.

It is yet another object of the present invention to provide a cost saving roof system utilizing a solar cell that requires no additional working in the field and is readily be constructed.

In order to achieve the above mentioned objects, a roof system utilizing a solar cell according to the present invention comprises a first modular roof member composed of a plurality of first light collecting plate segments each of which having a solar cell embedded therein, the first light collecting plate segments being aligned in one direction and in the other direction perpendicular to the one direction; and a second modular roof member composed of a plurality of second light collecting plate segments each of which is equal in size to the first light collecting plate segment, the second light collecting plate segments being aligned in one direction and in the other direction perpendicular to the one direction. The number of the second light collecting plate segments in one direction is larger by one than that of the first light collecting plate segments.

The one direction is a lateral direction of a roof and the other direction is a slope direction of the roof. Each of the first and the second modular roof members is composed of an intermediate connecting member having a width adjusting portion for slidably laterally engaging with a lateral edge of each of said first and said second modular roof members along both external edges thereof; and a lateral connecting member having a width adjusting portion for slidably laterally engaging with a lateral edge of each of said first and said second modular roof members along either one external edge thereof.

Each of said first and said second modular roof members comprises a framework body consisting of right and left end jambs, a head beam and a sill beam, each of the end jambs having an internal surface to which a corresponding supporting jam is mounted, the end jambs and beams being formed into a rectangular shape in plane; and composite assembly interfitted to an internal periphery of said framework body. The composite assembly having a transparent substrate beneath which a plurality of light collecting plate segments are juxtaposed.

Each of the end jambs comprises a vertical wall in which a plurality of flashing protrusions are longitudinally formed at a vertically upper end thereof and to which a horizontal overhanging piece is disposed at an internal surface thereof; a vertical supporting leg disposed at an inner end of said horizontal overhanging piece, said vertical supporting leg extending upward; and ventilation notches formed in said vertical wall and lower ends of said vertical supporting leg closer to the eaves and the ridge. The vertical wall is provided with a first fitting bore formed at the end thereof closer to the eaves and a second fitting bore formed at a position closer to the ridge and lower than where said first fitting bore is formed.

The head beam comprise a horizontal piece having a strip-like shape, said horizontal piece being extended in a direction perpendicular to a roof slope direction; a riser wall longitudinally disposed on an upper surface of said horizontal piece; a horizontal upper plate parallel to said horizontal piece, said horizontal upper plate being upwardly overhung towards the eaves; a flashing wall disposed by means of bending the end of said horizontal upper plate closer to the ridge; and a fixture engaging piece formed by means of being elongated downward from an lower surface of said horizontal piece and bend towards the eaves and further bend upward. The horizontal piece and the upper plate are so arranged that a lighting plate supporting groove is formed therebetween. The horizontal piece is longitudinally provided with a hollow curved groove formed therein at the end closer to the eaves and is provided with a drain groove formed in an upper surface thereof at a position closer to the ridge.

The sill beam comprises a lighting plate mounting piece having a horizontal strip-like shape; a lighting abutting wall disposed at an upper surface of an edge of said lighting plate mounting piece closer to the eaves, said lighting abutting wall being slightly smaller in height than said composite assembly; a covering piece overhung from an upper end of said lighting abutting plate, said covering piece being provided with a flashing protrusions at a lower surface thereof and being so formed that a tip thereof is curved downward; and a curved water-proof roof gutter disposed at an edge of said lighting plate mounting piece closer to the ridge, said curved water-proof roof gutter being curved downward to the eaves. The lighting plate mounting piece and said curved water-proof roof gutter are so arranged that a hollow curved groove is formed at a connecting portion therebetween.

Each of the supporting jamb comprises a hollow lighting framework acceptance framework having an inner wall, an outer wall and an external surface, the inner wall being longitudinally provided with a gap at an upper portion thereof, the external surface being provided with a concave groove, and the outer wall being provided with fixing bores formed at both ends thereof.

The one direction is a roof slope direction, the other direction is a roof lateral direction, and the roof system further comprises: third light collecting plate segments each of which being equal in dimension to the first light collecting plate segment, the third light collecting plate segments being aligned in the slope and lateral directions and being equal in number to said second light collecting plate segments; and a ridge roof member where a length adjusting piece is slidably engaged in the slope direction along an upper end portion thereof along the slope direction.

The ridge roof member comprises: a framework body consisting of right and left end jambs, a ridge beam and a sill beam, the end jambs and beams being formed into a rectangular shape in plane; and composite assembly interfitted to an internal periphery of said framework body, said composite assembly having a transparent substrate beneath which a plurality of third light collecting plate segments are juxtaposed. The ridge beam comprises: a riser wall; and a horizontal adjusting surface provided with a bolt supporting groove formed in the tip portion thereof, the bolt supporting groove being opened upward along the roof lateral direction and having an opening portion and a bottom portion, the opening portion is smaller in width than the bottom portion.

The bolt supporting groove is provided, at a middle portion thereof, with a notch for accepting a bolt head.

The length adjusting piece comprises: a horizontal slide surface that is approximately equal in width and in length to said horizontal adjusting surface; a ridge door portion extending upward and disposed at an end portion of said horizontal slide surface closer to the eaves; and a flashing portion extending upward and disposed at an end portion of said horizontal slide surface closer to the ridge. The horizontal slide surface has lateral portions where an elongated adjusting bore is formed in the slope direction, the elongated adjusting bore is provided with a scale at a lateral edge thereof.

The one direction is a roof slope direction, the other direction is a roof lateral direction, and the roof system further comprises: fourth light collecting plate segments each of which being equal in dimension to the first light collecting plate segment, the fourth light collecting plate segments being equal in number to said first light collecting plate segments; and a ridge roof member where a length adjusting piece is slidably engaged in the slope direction along an upper end portion thereof along the slope direction.

These and other objects and features of the present invention will become more fully apparent from the following description and appended claims taken in conjunction with the accompanying drawing.

BRIEF DESCRIPTION OF THE DRAWING

FIG. 7 is a side view of a head beam;

FIG. 8 is a sectional view of the head beam;

FIG. 35 is a transversal sectional view of a lateral portion of the roof system utilizing a solar cell according to the second embodiment of the present invention, in which being illustrated is a minus adjustment state thereof;

FIG. 45 is a side view of a sill beam;

FIG. 46 is a sectional view of the sill beam;

FIG. 71 is a perspective view of the ridge member before being placed on;

FIG. 72 is a perspective view of the ridge member after being placed on;

DETAILED DESCRIPTION OF THE PREFERRED EMBODIMENTS

Figure 1:
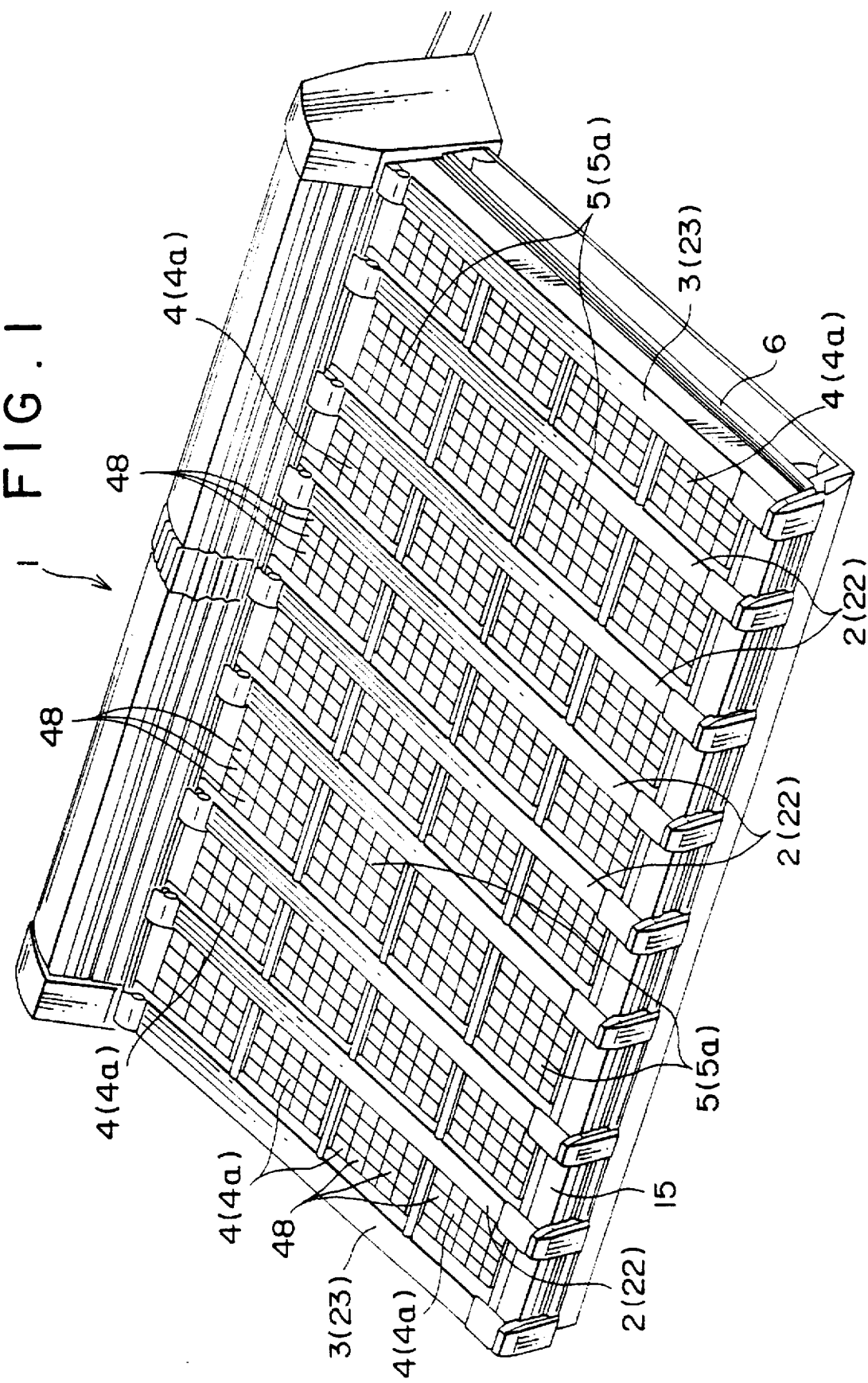
FIG. 1 is a perspective view of a roof system utilizing a solar cell.

Embodiments of the present invention are described below with reference to the drawing and, throughout the following detailed description, similar reference numerals refer to similar elements in all figures of the drawing.

In FIG. 1, a roof system 1 utilizing a solar cell comprises a plurality of intermediate connecting members 2 arranged on an upper surface of a roof deck. The intermediate connecting members 2 are away from each other at an adequate space. Lateral connecting members 3 are arranged in parallel to the intermediate connecting members 2 on the upper surface of the roof deck at both sides thereof closer to verges. In other words, the intermediate connecting members 2 are interposed between the lateral connecting members 3. First and second modular roof members 4 and 5, respectively, serving as roof members, are mounted between the intermediate connecting members 2 or between the intermediate connecting member 2 and the lateral connecting member 3. Verge member 6 is attached to an external flank of each lateral connecting member 3. In addition, an eaves's member 15 is fixed along the eaves.

Figure 2:
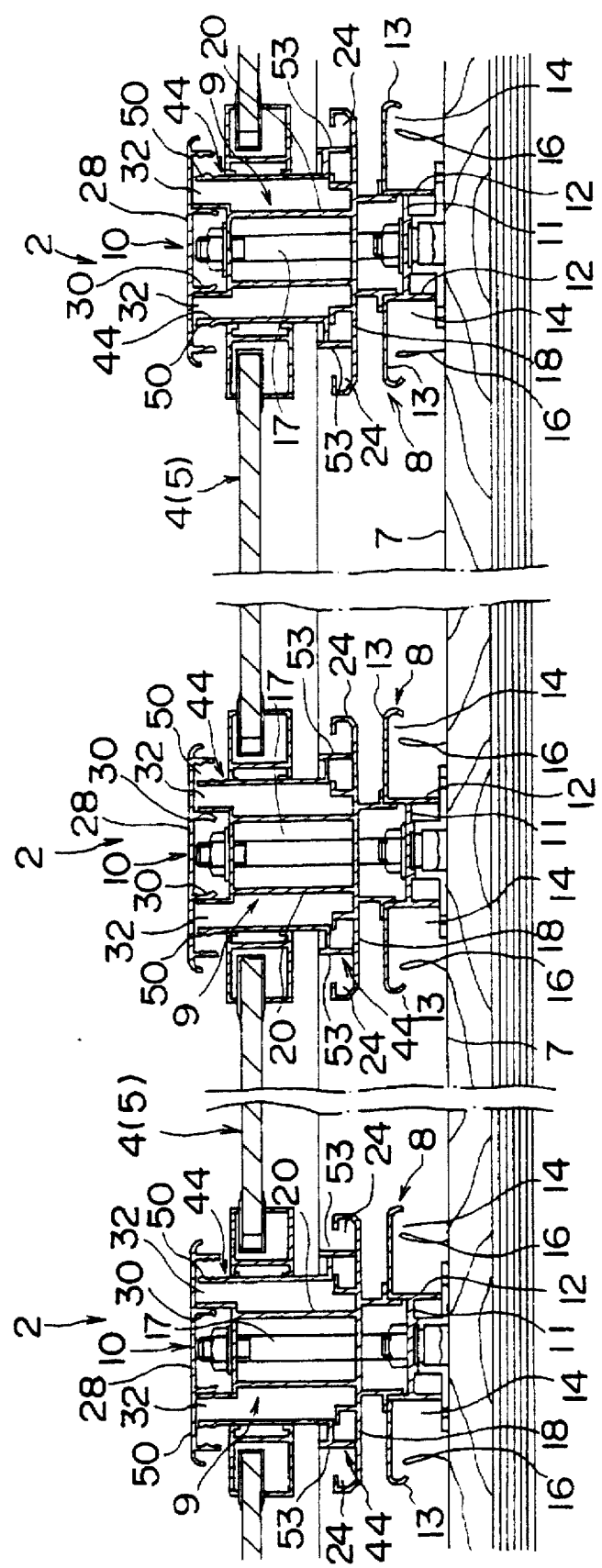
FIG. 2 is a transversal sectional view of a central portion of a roof system utilizing a solar cell according to a first embodiment of the present invention.
Figure 3:
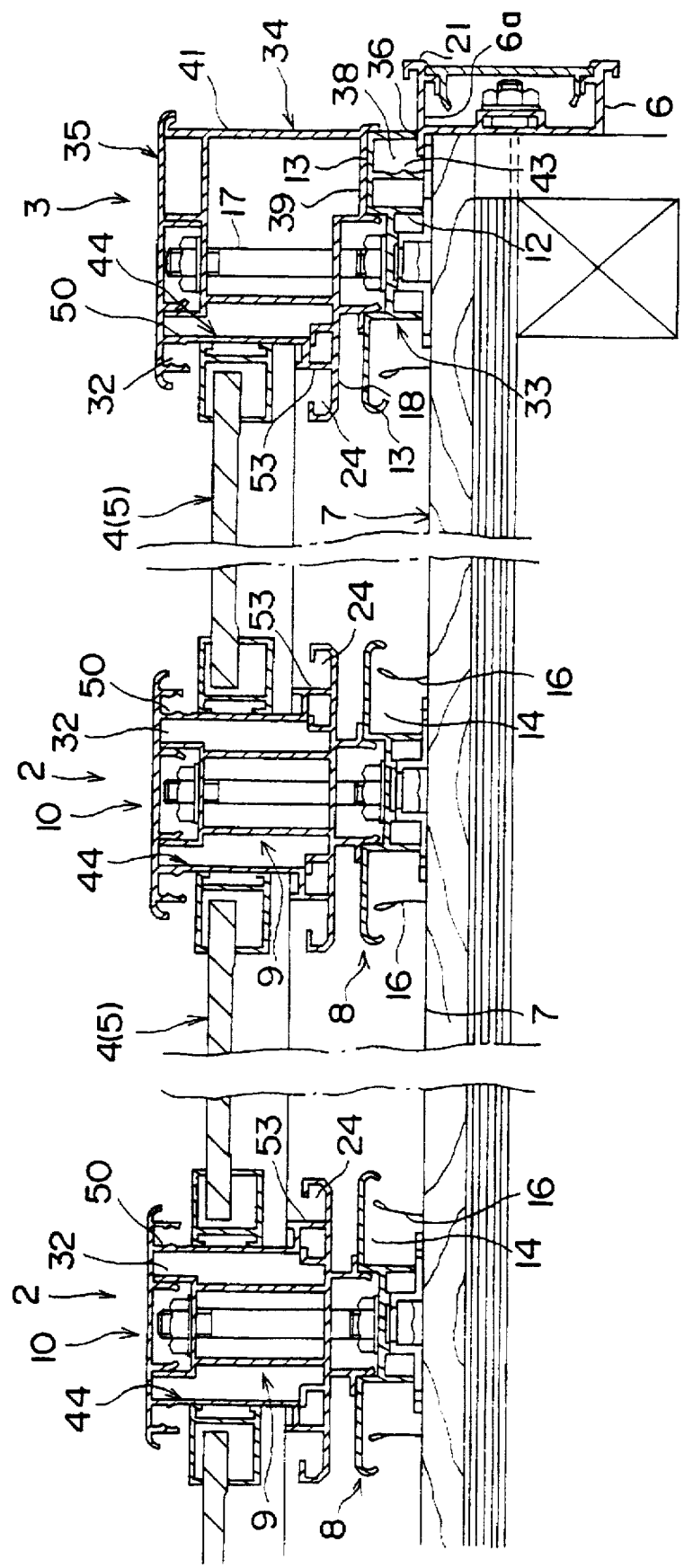
FIG. 3 is a transversal sectional view of a lateral portion of the roof system utilizing a solar cell according to the first embodiment of the present invention.

FIGS. 2 and 3 shows a first embodiment of the present invention in which a water-proof plate 7 is laid on the roof deck with being away from the first and the second modular roof members 4 and 5. Each of the intermediate connecting members 2 comprises a lower connecting member 8, an upper connecting member 9 and a connecting member cover 10. The lower connecting member 8 is for connecting the intermediate connecting member 2 with the water-proof plate 7 while the upper connecting member 9 is for connecting the first modular roof member 4 with the second modular roof member 5. As a case may be, the upper connecting member 9 serves to interconnect two first modular roof members 4. The connecting member cover 10 covers the upper portion of the upper connecting member 9. The lower connecting member 8 comprises a vertical wall 12. The vertical wall 12 extends upward passing by a transversal end of a horizontal fixing portion 11. An overhanging portion 13 is outwardly projected from the upper end of the vertical wall 12. A wide lower width adjusting portion 14 is defined by the lower surface of the overhanging member 13 and the outer surface of the vertical wall 12. The lower width adjusting portions 14 are for use in engaging corresponding water-proof walls 16 formed on a lateral edge of the water-proof plate 7. A connecting bolt 17 is mounted upwardly while passing through the horizontal fixing portion 11.

The upper connecting member 9 comprises two vertical pieces 20 being apart from each other. The vertical pieces 20 are disposed on the upper surface of a horizontal substrate 18 at a position closer to the center thereof. Wide groove-like intermediate width adjusting portions 24 opened upward are formed in both transversal ends of the horizontal substrate 18.

The connecting member cover 10 has a flat covering portion 28. A pair of locking legs 30 is disposed on the lower or back surface of the flat covering portion 28. The locking legs 30 are apart from each other around the center of the flat covering portion 28. In addition, wide groove-like upper width adjusting portions 32 are formed outside the locking legs 30. More particularly, each of the upper width adjusting portion 32 is opened downward in the direction perpendicular to the flat covering portion 28. For assembling the intermediate connecting member 2, the lower connecting member 8 is first secured to the roof deck along the slope direction. Subsequently, the upper connecting member 9 is longitudinally disposed on the upper surface of the lower connecting member 8. The connecting bolt 17 of the lower connecting member 8 is then inserted into the upper connecting member 9. Each nut of the corresponding connecting bolt 17 is tightened to fix the lower connecting member 8 to the upper connecting member 9.

Subsequently, the connecting member cover 10 is laid over the upper portion of the upper connecting member 9 and the locking legs 30 are engaged with the respective upper ends of the vertical pieces 20 of the upper connecting member 9.

Each of the lateral connecting members 3 comprises, as shown in FIG. 3, a lateral lower connecting member 33, a lateral upper connecting member 34 and a lateral connecting member cover 35. The half of these members closer to the inner side of the roof is similar in structure to that of the lower connecting member 8, the upper connecting member 9 and the connecting member cover 10. Accordingly, similar components are represented by like reference numerals and description of such parts will be omitted.

A verge member presser piece 36 is projected downward from the transversally outer end of the overhanging portion 13 of the lateral lower connecting member 33 that is located at the closest position to the verge member 6. The verge member presser piece 36 abuts to the upper surface of an upper horizontal plane 6a of the verge member 6. A wide lateral width adjusting portion 38 is formed between the verge member presser piece 36 and the vertical wall 12.

The half of the lateral upper connecting member 34 closer to the verge is formed as a supporting piece 39. The supporting piece 39 is formed by means of lowering slightly the horizontal substrate 18 and is mounted on the upper surface of the overhanging portion 13 of the lateral lower connecting member 33. A lateral edge vertical wall 41 is projected from the upper surface of the supporting piece 39. The lower end of the lateral edge vertical wall 41 engages with the verge member presser piece 36 of the lateral lower connecting member 33.

The portion of the flat covering portion 28 of the lateral connecting member cover 35 closer to the verge is formed widely depending on the width of the lateral upper connecting member 34.

In addition, the transversally outer end of the horizontal plane 6a of the verge member 6 is provided with a flashing projection 21 while the transversally inner end thereof is provided with a riser wall 43. The riser wall 43 is inserted into the lateral width adjusting portion 38 of the lateral lower connecting member 33 to secure the verge member 6 to the external portion of the lateral connecting member 3.

Figure 4:
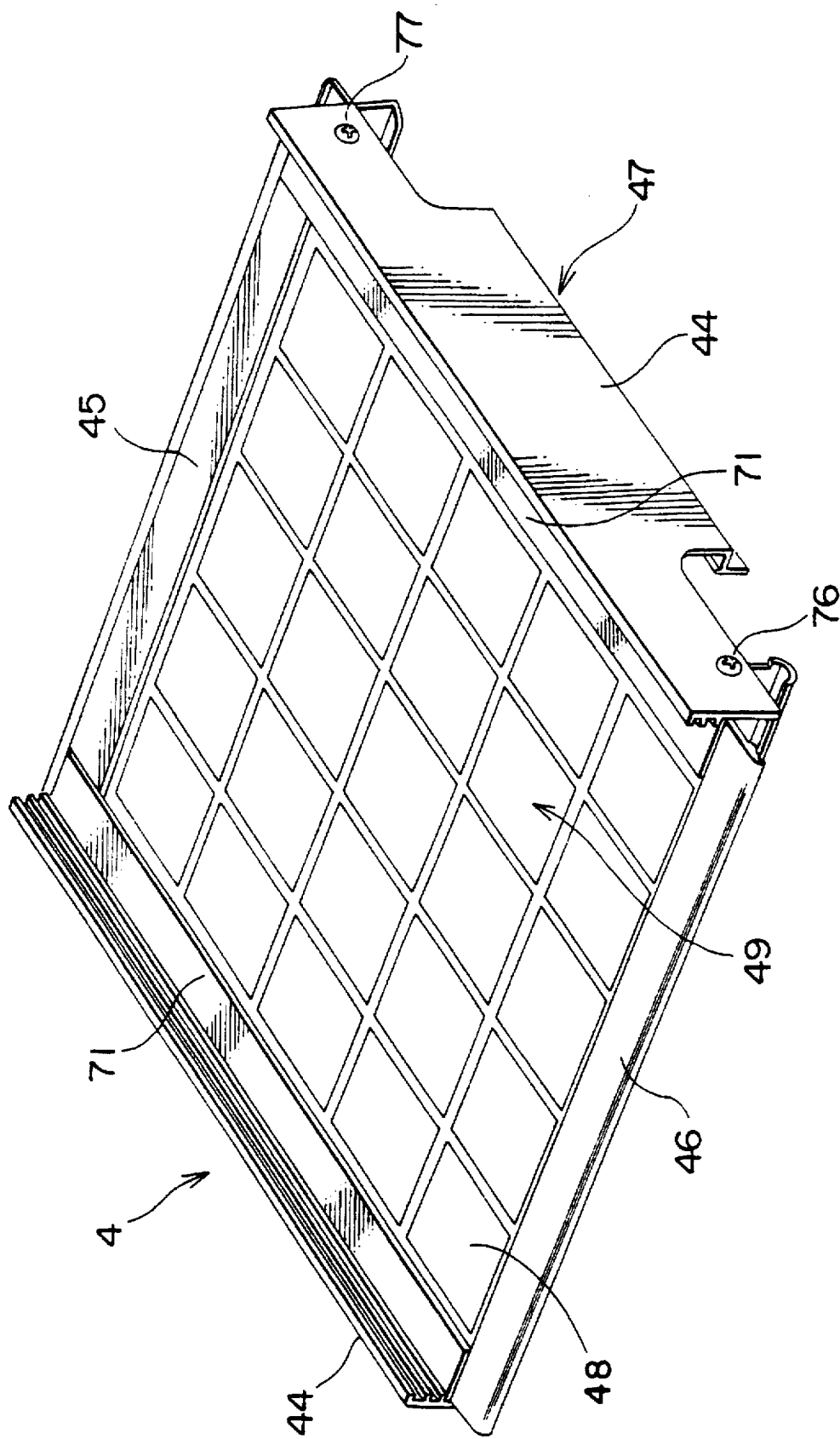
FIG. 4 is a perspective view of a first modular roof member according to the first embodiment of the present invention.

The first modular roof member 4 comprises, as shown in FIG. 4, end jambs 44 provided on right and left sides thereof, a head beam 45 and a sill beam 46. The end jambs 44, the head beam 45 and the sill beam 46 are formed into a rectangular shape in plane. Each of supporting jambs 71 is mounted along the inner surface of the corresponding end jamb 44. The combination of jambs and beams are formed as a framework body 47. A first light collecting plate segment 48 is generally composed of a transparent substrate and a solar cell embedded beneath the substrate. The solar cell may be a polycrystalline silicone solar cell or the like. An individual light collecting plate segment 48 in this embodiment has a square shape with sides of 100 mm in length. The light collecting plate segments 48 are arranged into an array as a composite assembly 49 with five rows and five columns. In other words, each row consists of five light collecting plate segments 48 aligned in or juxtaposed with each other in the roof lateral direction. Likewise, each column consists of five light collecting plate segments 48 aligned in or juxtaposed with each other in the slope direction perpendicular to the lateral direction.

The light collecting plate segments 48 are apart from each other at a connection distance of about 5 mm. In addition, the framework body 47 is away from the composite assembly 49 at the connection distance of about 5 mm. Besides the connection distance of about 5 mm, a space (hereinafter, referred to as an installation space) of about 20 mm is required for installing the composite assembly 49 in the framework body 47. The installation space is required at both sides of the composite assembly 49 opposing to the end jambs 44, about 10 mm for each. Consequently, the width of the composite assembly 49 of the first modular roof member 4 is approximately equal to 550 mm, including the installation space of 20 mm. An execution width L (see FIG. 13) except for the installation space is thus approximately equal to 530 mm in the lateral direction perpendicular to the eaves/ridge or slope direction.

Figure 5:
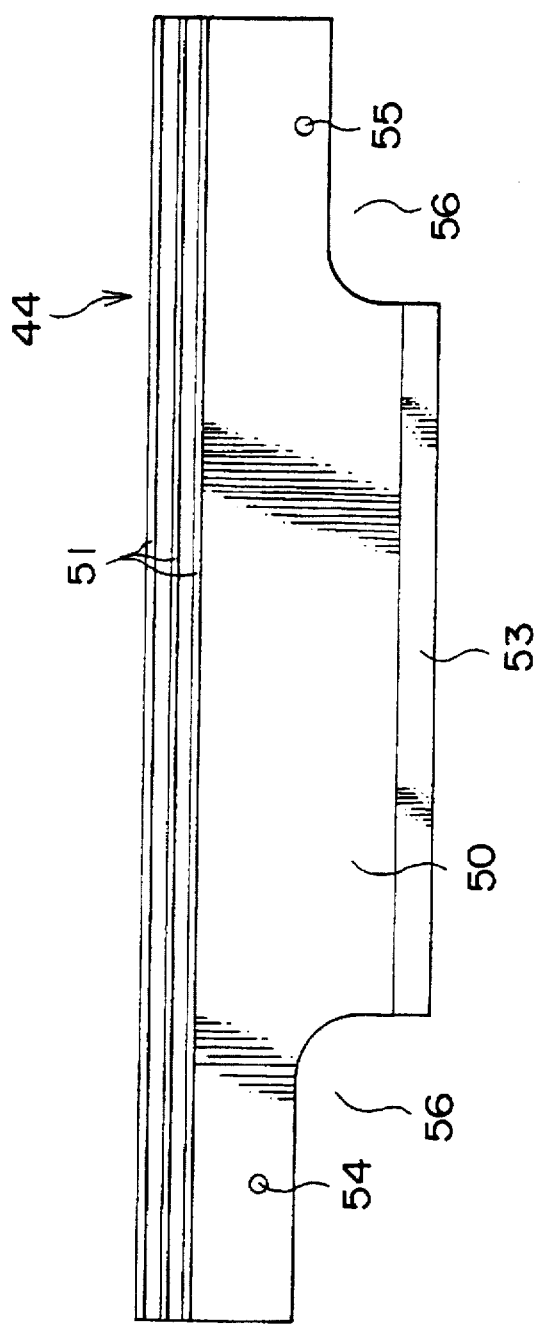
FIG. 5 is a side view of an end jamb.
Figure 6:
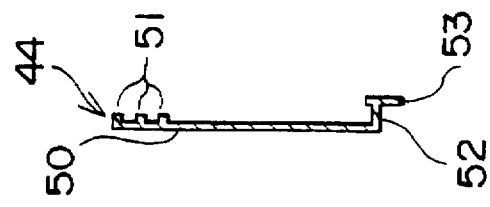
FIG. 6 is a sectional view of the end jamb.

Each of the end jambs 44 comprises, as shown in FIGS. 5 and 6, a vertical wall 50 having an inner surface provided with a plurality of flashing protrusions 51 longitudinally formed at the upper end of the vertical wall 50. The inner surface of the vertical wall 50 is also provided with a horizontal overhanging piece 52 at the lower end thereof. In addition, the transversally inner end of the horizontal overhanging piece 52 is provided with a vertical supporting leg 53 extended perpendicular to the horizontal overhanging piece 52.

A fitting bore 54 is formed in the transversal end of the vertical wall 50 closer to the caves. The other transversal end of the vertical wail 50, a position closer to the ridge, is provided with a fitting bore 55 formed therein at a position slightly lower in level than that of the fitting bore 54. Ventilation notches 56 are formed beneath the transversal ends of the vertical wall 50.

The head beam 45 comprises, as shown in FIGS. 7 and 8, a strip-shaped horizontal piece 57 extending in a direction perpendicular to the slope direction. An upright wall 58 is longitudinally disposed on the upper surface of the strip-shaped horizontal piece 57. A horizontal upper plate 59 is extended from the upper portion of the upright wall 58 with being overhung towards the caves in parallel to the horizontal piece 57. A flashing wall 60 is provided by means of bending the end of the horizontal upper plate 59 closer to the ridge. More particularly, the flashing wall 60 is formed into generally U-shape in section at the ridge-side end of the horizontal upper plate 59. A lighting plate supporting groove 61 is formed between the horizontal piece 57 and the horizontal upper plate 59. A curved groove 62 is longitudinally formed in the end portion of the horizontal piece 57 closer to the caves. A drain groove 63 is formed in the upper surface of the horizontal piece 57 at the end portion thereof closer to the ridge. A fixture engaging piece 64 is extended downward from the lower surface of the horizontal piece 57 and is bent towards the eaves and further bent upward to form a hook-like portion.

Figure 9:
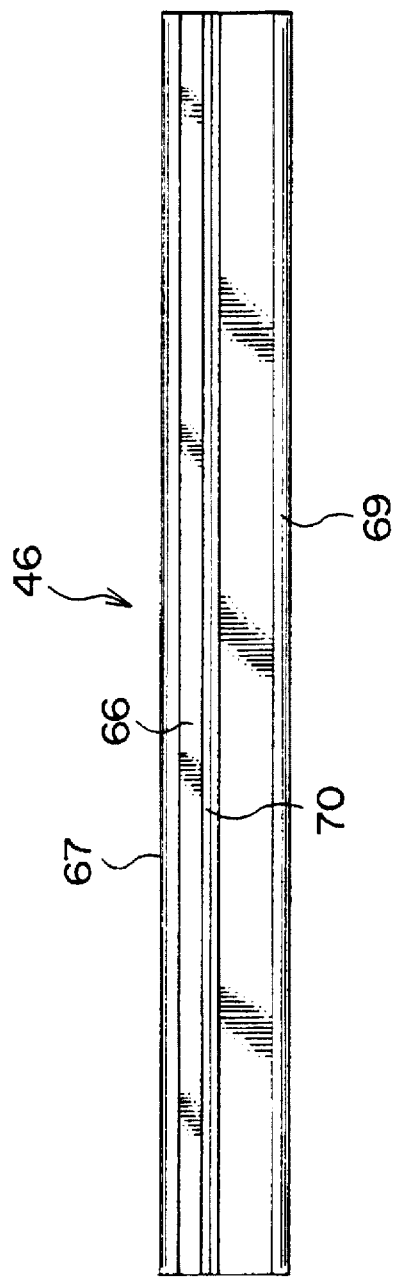
FIG. 9 is a side view of a sill beam.
Figure 10:
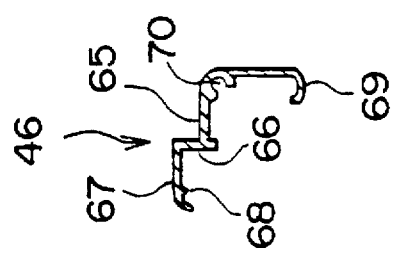
FIG. 10 is a sectional view of the sill beam.

The sill beam 46 comprises, as shown in FIGS. 9 and 10, a lighting plate mounting piece 65 of a horizontal strip shape. The upper surface of the edge of the lighting plate mounting piece 65 closer to the eaves is provided with a lighting plate abutting wall 66 having a thickness slightly, smaller than that of the composite assembly 49. A covering piece 67 is projected from the upper end of the lighting plate abutting wall 66 towards the eaves to cover the upper portion of the horizontal upper plate 59 of the head beam 45. A transversal end of the covering piece 67 closer to the eaves is bent downward and the lower surface thereof is provided with a flashing protrusion 68. The edge of the lighting plate mounting piece 65 closer to the ridge is provided with a curved water-proof gutter 69 that is curved downwardly towards the eaves. A hollow curved groove 70 is formed in a connecting portion between the lighting plate mounting piece 65 and the curved water-proof gutter 69.

Figure 11:
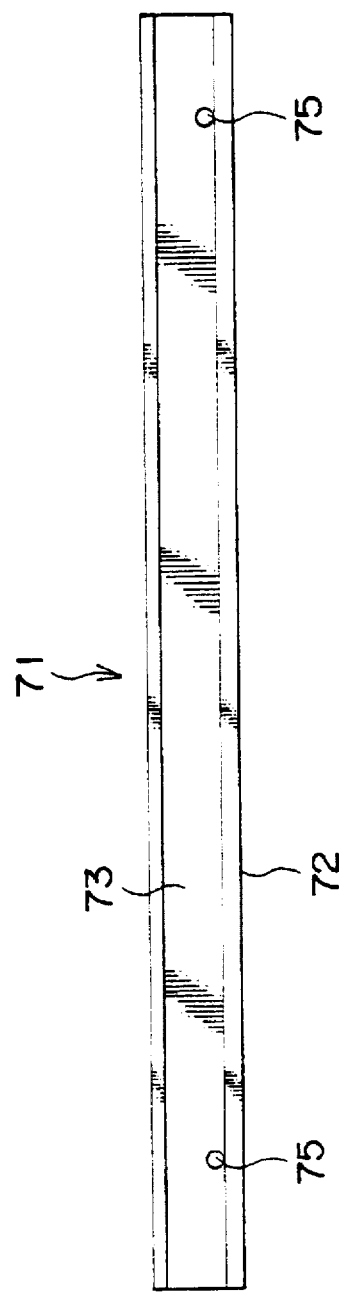
FIG. 11 is a side view of a composite assembly supporting jamb.
Figure 12:
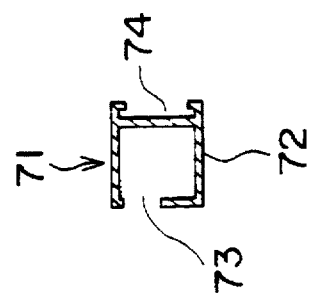
FIG. 12 is a sectional view of the composite assembly supporting jamb.

Each of the supporting jambs 71 comprises, as shown in FIGS. 11 and 12, a hollow lighting plate acceptance framework 72. A gap 73 is formed longitudinally in the inside upper portion of the lighting plate acceptance framework 72. The composite assembly 49 is inserted into the gap 73. A concave groove 74 is formed in the outer surface of the lighting plate acceptance framework 72 to avoid water from entering by capillary action. Fixing bores 75, 75 are formed in the respective ends, along the eaves/ridge direction, of the external wall of the lighting plate acceptance framework 72. The fixing bores 75, 75 correspond to fitting bores 54, 55, respectively.

Figure 13:
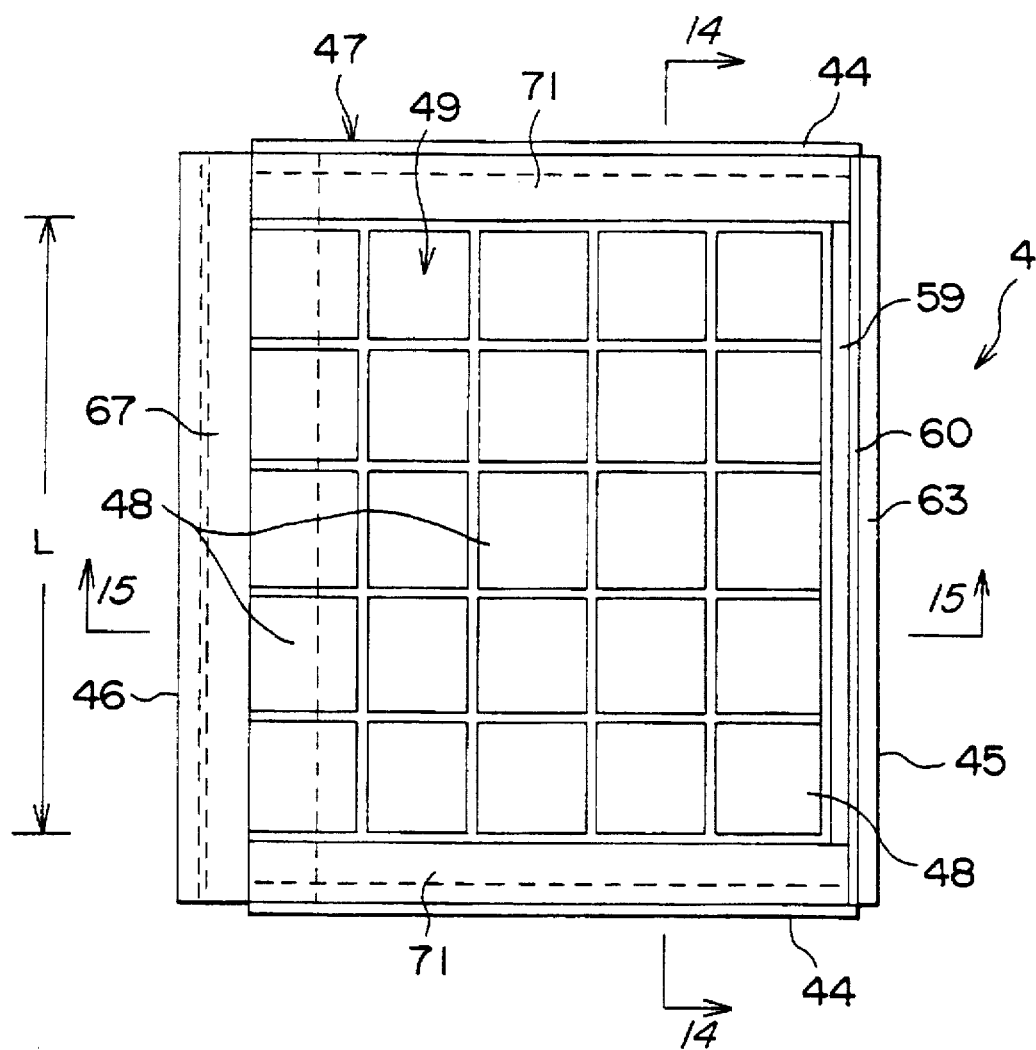
FIG. 13 is a plan view of the first modular roof member according tot he first embodiment of the present invention.
Figure 14:
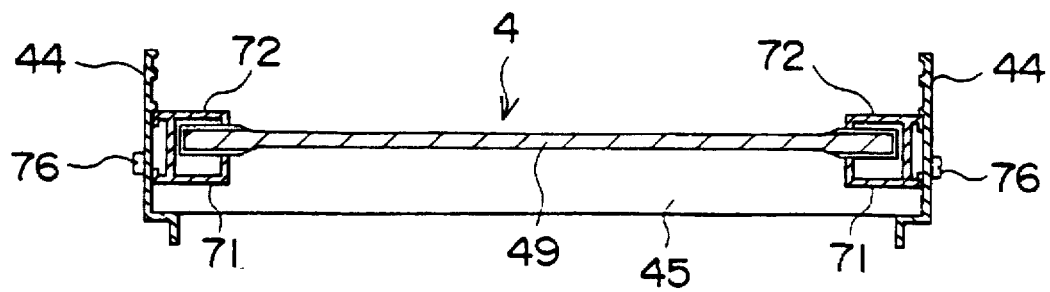
FIG. 14 is a sectional view taken on line a—a in FIG. 13.
Figure 15:
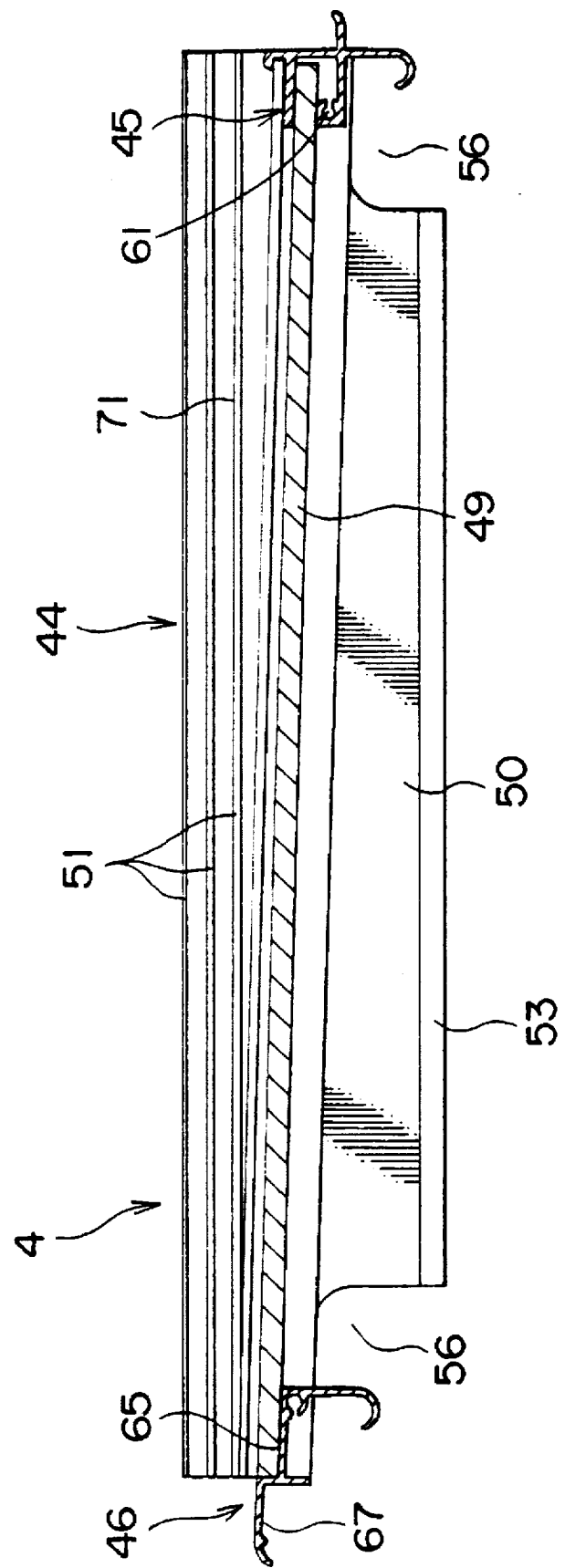
FIG. 15 is a sectional view taken on line b—b in FIG. 13.

Next, description is made in conjunction with a method of assembling the first modular roof member 4. As shown in FIGS. 13 through 15, the end portion of the composite assembly 49 closer to the eaves is mounted on the upper surface of the transparent plate mounting piece 65 of the sill beam 46. The end of the composite assembly 49 closer to the caves is inserted into the lighting plate supporting groove 61 formed in the head beam 45. The two lateral ends of the composite assembly 49 are inserted into the respective lighting plate acceptance framework 72 of the supporting jambs 71. The four sides of the composite assembly 49 are supported by the above mentioned jambs and beams through a packing in such a manner that the upper surface of the composite assembly 49 is located at a higher position than the covering piece 67 of the sill beam 46 at the end portion closer to the caves.

In this state, the sill beam 46 is lowered than the upper surface of the composite assembly 49. This means that rainwater running on the composite assembly 49 is immediately drained towards the caves and thus no dust and trash are trapped.

Subsequently, the outer surface of each supporting jamb 71 is abutted to the corresponding inner surface of the vertical wall 50 of the end jamb 44. Each of the supporting jambs 71 is inclined or pitched to the end jambs 44 such that one end of the supporting jamb 71 closer to the caves is located at the higher position than the other end closer to the ridge. Screws 76 are inserted into the fitting bore 54 of the end jamb 44 formed at the position closer to the caves, the fixing bore 75 of the supporting jamb 71 formed at a position closer to the eaves and the hollow curved groove 70 of the sill beam 46. Screws 77 are inserted through the fitting bore 55 of the end jamb 44 formed at the position closer to the ridge, the fixing bore 75 of the supporting jamb 71 formed at the position closer to tile ridge and the hollow curved groove 62 of the head beam 45. In this way, the first modular roof member 4 can be assembled.

Figure 16:
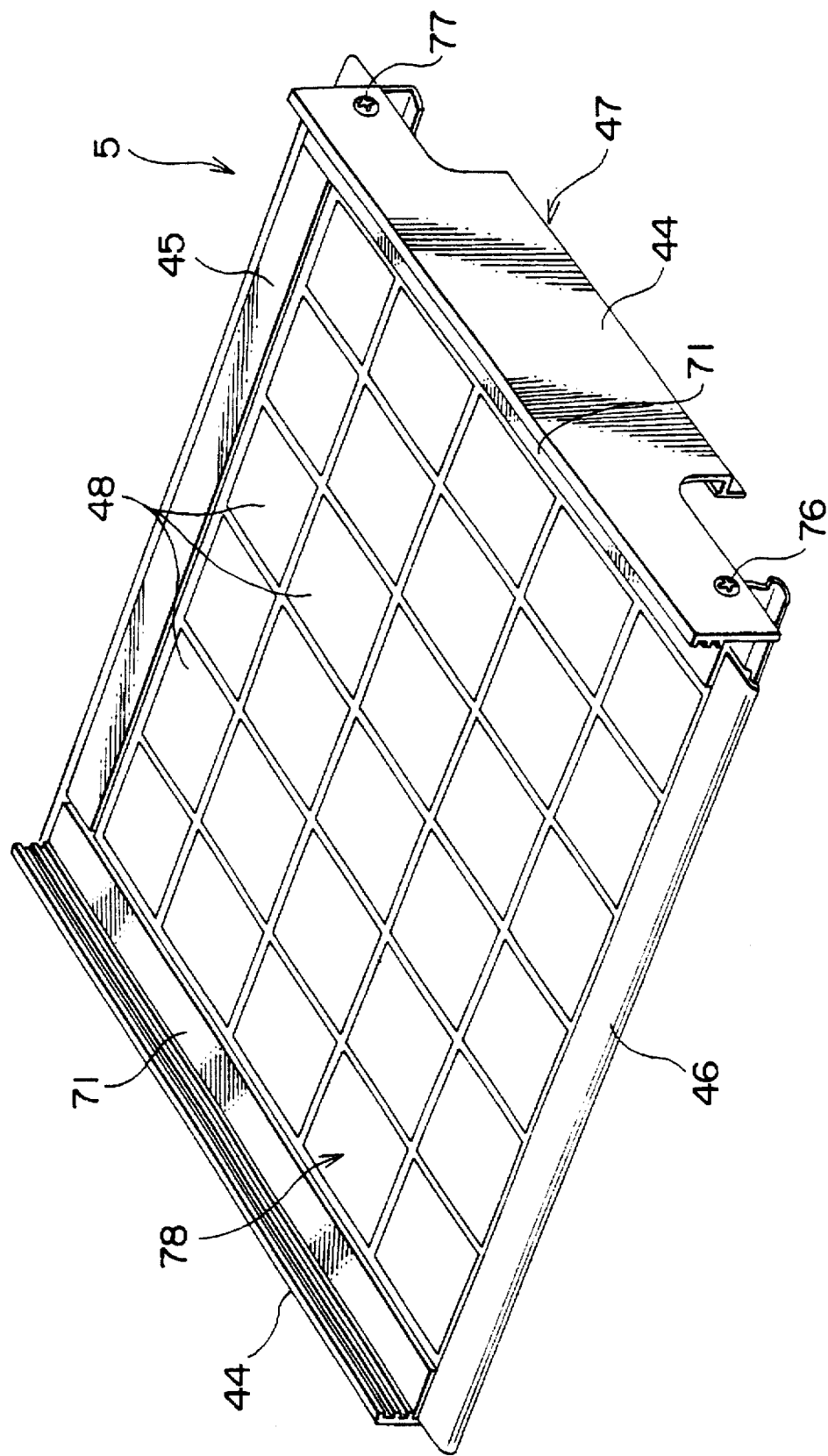
FIG. 16 is a perspective view of a second modular roof member according to the first embodiment of the present invention.
Figure 17:
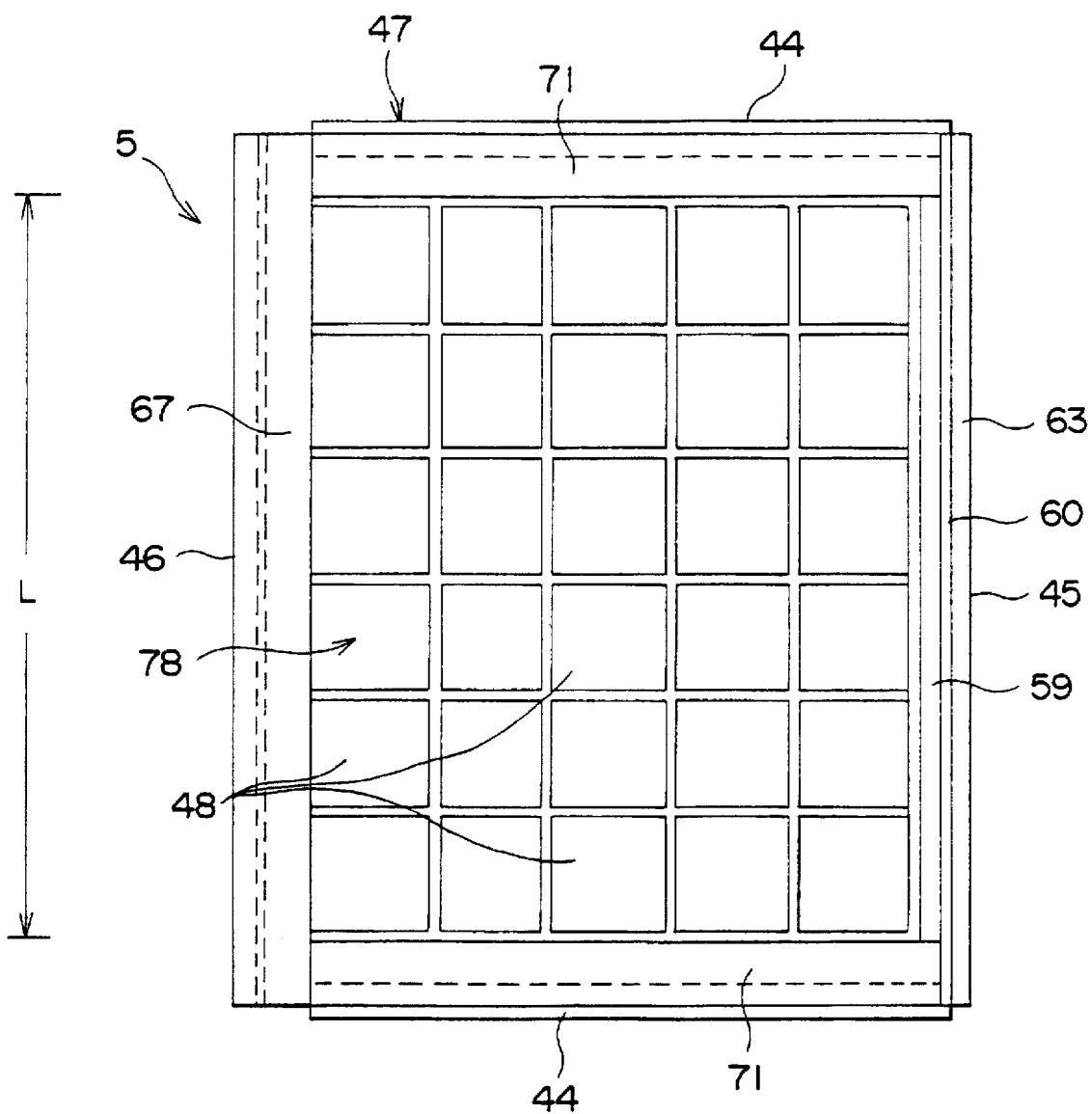
FIG. 17 is a plan view of a second modular roof member according to the first embodiment of the present invention.

The second modular roof member 5 is similar in structure to the first modular roof member 4 other than some exceptions. More particularly, the second modular roof member 5 comprises, as shown in FIGS. 16 and 17, second light collecting plate segments 48 each of which is equal in size to the first light collecting plate segment 48 of the first modular roof member 4. The second light collecting plate segments 48 are arranged into an array as a composite assembly 78 with six rows and five columns. In other words, each row has six light collecting plate segments 48 aligned in the roof lateral direction while each column has five light collecting plate segments 48 aligned in the slope direction perpendicular to the lateral direction. The composite assembly 78 is interfitted to the inner periphery of the framework body 47 in a manner similar to that described above. The width of the composite assembly 78 of the second modular roof member 5 is approximately equal to 655 mm and the execution length L is approximately equal to 635 mm. Other components and parts of the second modular roof member 5 is similar to those of the first modular roof member 4, so that similar components are denoted by like reference numerals and description thereof will be omitted.

In order to install the first and the second modular roof members 4 and 5, the lower connecting member 8 and the lateral lower connecting member 33 are arranged on the roof deck in the slope direction with being away from each other. The water-proof plate 7 is laid on the roof deck and the water-proof wall 16 formed at the end thereof is inserted into the lower width adjusting portion 14. The upper connecting member 9 and the lateral upper connecting member 34 are attached to the upper surfaces of the lower connecting member 8 and the lateral lower connecting member 33, respectively, through the connecting bolts 17.

Subsequently, the first and the second modular roof members 4 and 5 are disposed on the upper portion of the water-proof plate 7 with being away from each other. The lower end of the vertical supporting leg 53 of each end jamb 44 is inserted into the intermediate width adjusting portion 24 of the upper connecting member 9 and the lateral upper connecting member 34. The connecting member cover 10 and the lateral connecting member cover 35 are attached over the upper connecting member 9 and the lateral upper connecting member 34, respectively. The upper end of the vertical wall 50 of each end jamb 44 is inserted into the upper width adjusting portion 32.

Figure 18:
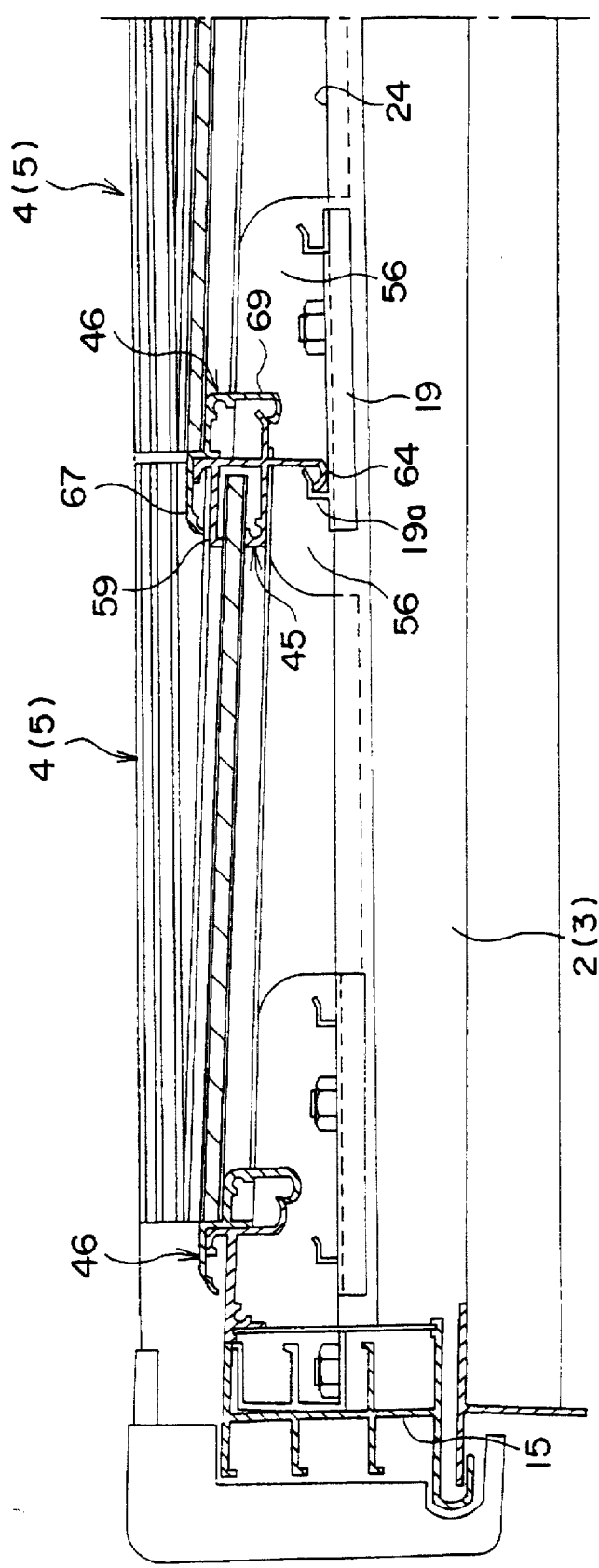
FIG. 18 is a longitudinal sectional view of an eaves's portion of the roof system utilizing a solar cell according to the first embodiment of the present invention.
Figure 19:
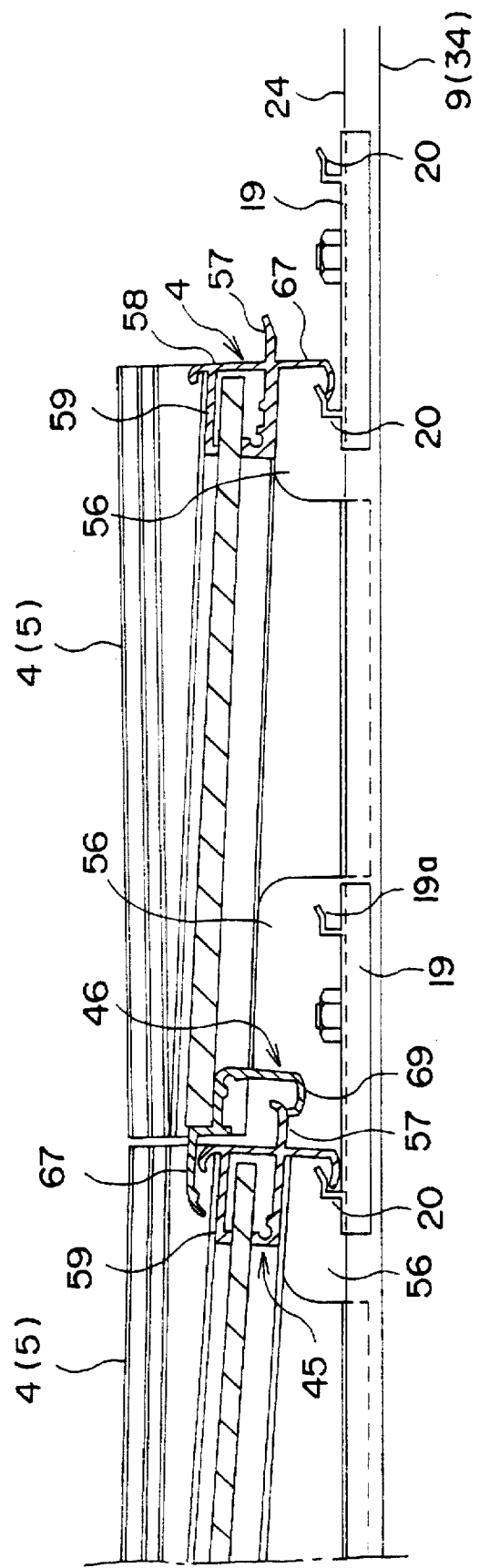
FIG. 19 is a longitudinal sectional view of the roof system utilizing a solar cell according to the first embodiment of the present invention.

In addition, to connect the first and the second modular roof members 4 and 5 in the slope direction, the eaves's member 15 is attached to the eaves's portion of the roof as shown in FIG. 18. Thereafter, the first and the second modular roof members 4 and 5 at the closest position to the eaves are attached to the upper connecting member 9 and the lateral upper connecting member 34. Fixtures 19 are attached to the intermediate width adjusting portions 24 in the ventilation notches 56, at the position closer to the eaves and the ridge, of the first and the second modular roof members 4 and 5. The fixture engaging piece 64 of the head beam 45 is engaged with and secured to an engaging hook 19a having an inverse L-shaped formed on the upper surface of the fixture 19.

Subsequently, the covering pieces 67 of the sill beams 46 of the first and tile second modular roof members 4 and 5 located at a position closer to the ridge and are laid over the horizontal upper surfaces 59 of the head beams 45 of the modular roof members 4 and 5 at a position closer to the eaves. The curved water-proof gutter 69 of the sill beam 46 is engaged with the lower surface of the horizontal plane 57 of the sill beam 45.

Power of 3 KW can be generated with approximately 25 m2 of light-collecting area under the efficiency of the solar cell currently available. This means that the shearing width of at least 3,636 mm is required to cover the power consumption of an ordinary dwelling. It is preferable to construct the sheating width of 1,818 mm with two or three roof members by the execution safety and economical considerations.

However, the sheating width of a roof depends on the size and the design of a house. It is impossible to separate the modular roof members 4 and 5 with a solar cell embedded therein, so that the number of the first and the second modular roof members 4 and 5 in row and in column should be selected according to the sheating width by using the difference of 105 mm generated between the width of an individual light collecting plate segment 48 of the first modular roof member 4 and that of the second modular roof member 5.

Figure 20:
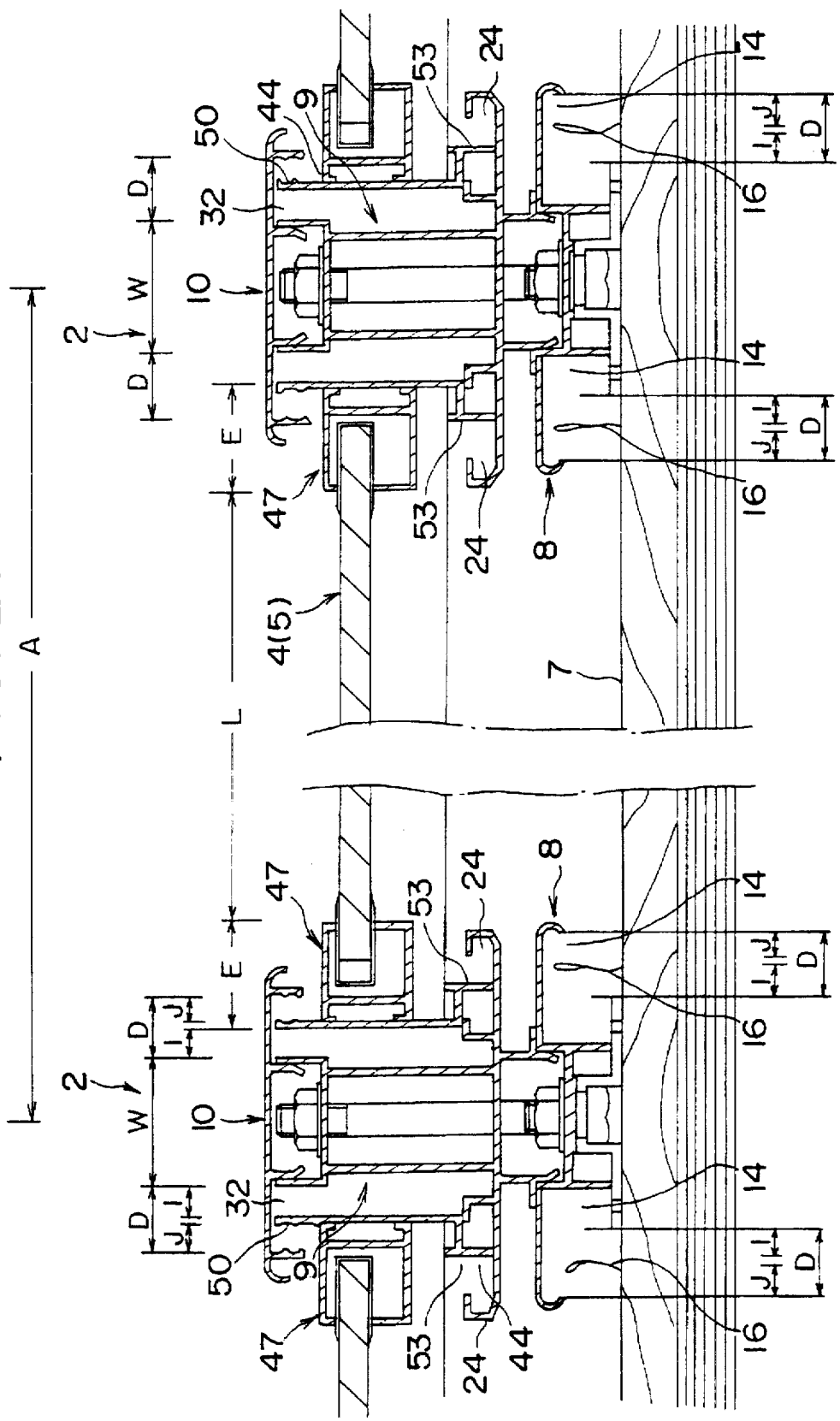
FIG. 20 is a transversal sectional view of a central portion of the roof system utilizing a solar cell according to the first embodiment of the present invention, in which being illustrated is a zero adjustment state thereof.
Figure 21:
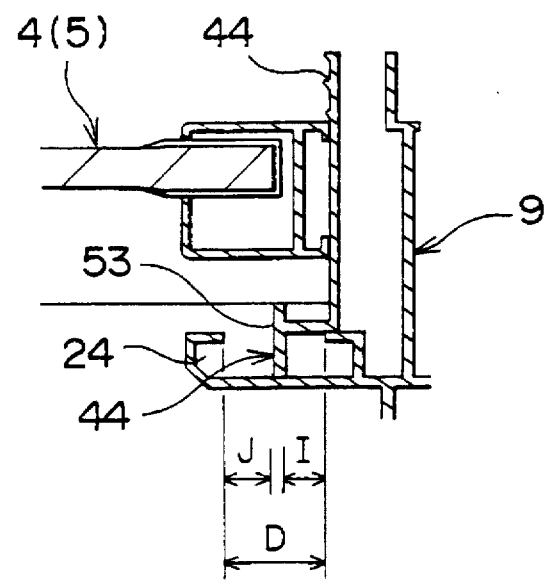
FIG. 21 is a sectional view of an essential part of the roof system utilizing a solar cell according to the first embodiment of the present invention.
Figure 22:
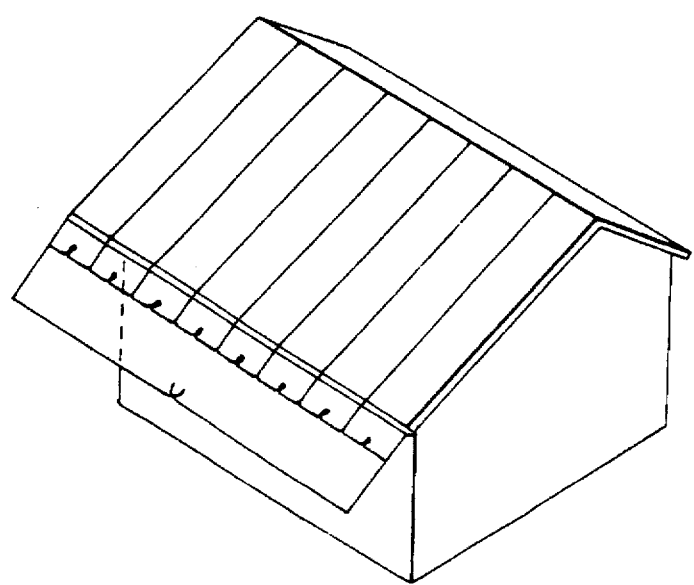
FIG. 22 shows diagramatically the roof system utilizing a solar cell for use in representing the relation between the execution width and the sheating width.

More particularly, as shown in FIGS. 20 and 21, it is assumed that the water-proof wall 16 of the water-proof plate 7 and the vertical supporting legs 53 and the vertical walls 50 of the first and the second modular roof members 4 and 5 are positioned at the center of the lower width adjusting portion 14, the intermediate width adjusting portion 24 and the upper width adjusting portion 32, respectively, and that a width D of each lower width adjusting portion is equal to 11.5 mm, a minimum distance W between the left and right upper width adjusting portions 32 is equal to 29 mm, and a width E of the framework body 47 is equal to 18.5 mm, then the distance between the center of the connecting members 2 and 3, i.e., a standard execution distance A for one row is equal to 606 mm for the first modular roof member 4 of which execution width L is equal to 530 mm, and is equal to 711 mm for the second modular roof member 5 of which execution width L is equal to 635 mm.

Parallel arrangement or juxtaposition of six first modular roof members 4 having the standard execution width A of 606 mm results in an applicable sheating width U of 3,636 mm. That of five first modular roof members 4 and one second modular roof member 5 having the standard execution width A of 635 mm results in the applicable sheating width U of 3,741 mm. That of four first modular roof members 4 and two second modular roof members 5 results in the applicable shearing width U of 3,846 mm.

Each of the water-proof wall 16 of the water-proof plate 7, the vertical supporting leg 53 and the vertical wall 50 of the end jamb 44 is equal in thickness to about 1.5 mm. The width I of 5 mm is available for moving within the lower width adjusting portion 14, the intermediate width adjusting portion 24 and the upper width adjusting portion 32 in the central direction while the width J of 5 mm is available for movement towards the outer edge. Thus, a fine adjustment can be made as large as 10 mm in plus or in minus for every one row of the module. When the error in plus or in minus direction between the actual roof sheating width U and the total finishing width is equal to or less than the half of the difference of 105 mm in width between the first modular roof member 4 and the second roof module member 5, i.e., equal to or less than 52.5 mm, the fine adjustment can be made by means of adjusting an overlapped width of the engaging members of the modular roof members 4 and 5 and the connecting members 2 and 3.

Figure 23:
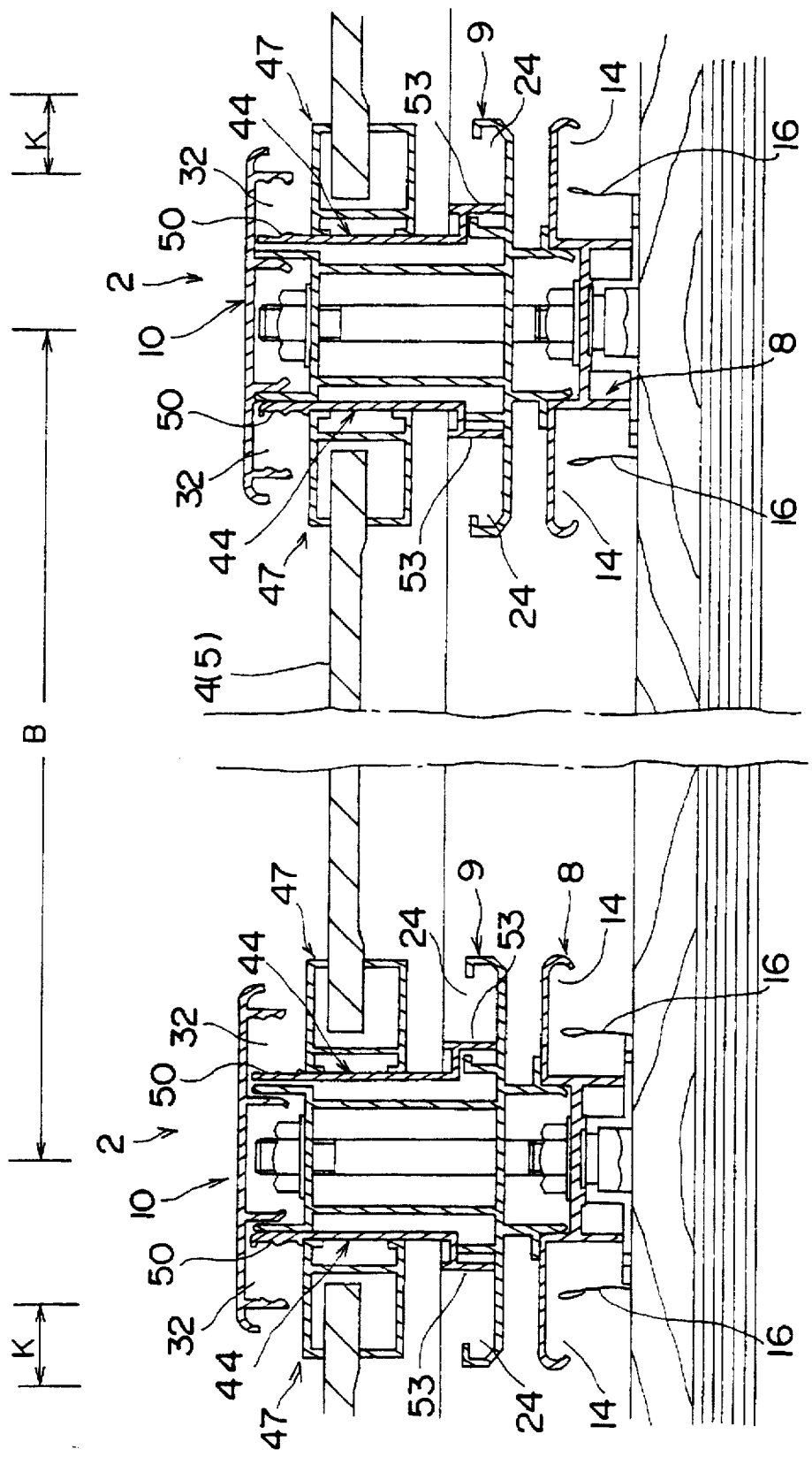
FIG. 23 is a transversal sectional view of a central portion of the roof system utilizing a solar cell according to the first embodiment of the present invention, in which being illustrated is a minus adjustment state thereof.

When the total finishing width is smaller than the shearing width U, as shown in FIG. 23, the vertical supporting leg 53 and the vertical wall 50 of the end jamb 44 are located at a position closer to the center of the connecting members 2 and 3 to achieve a width adjustment in a minus direction. A minus execution width B is equal to 596 mm for the first modular roof member 4 and is equal to 701 mm for the second modular roof member 5.

Figure 24:
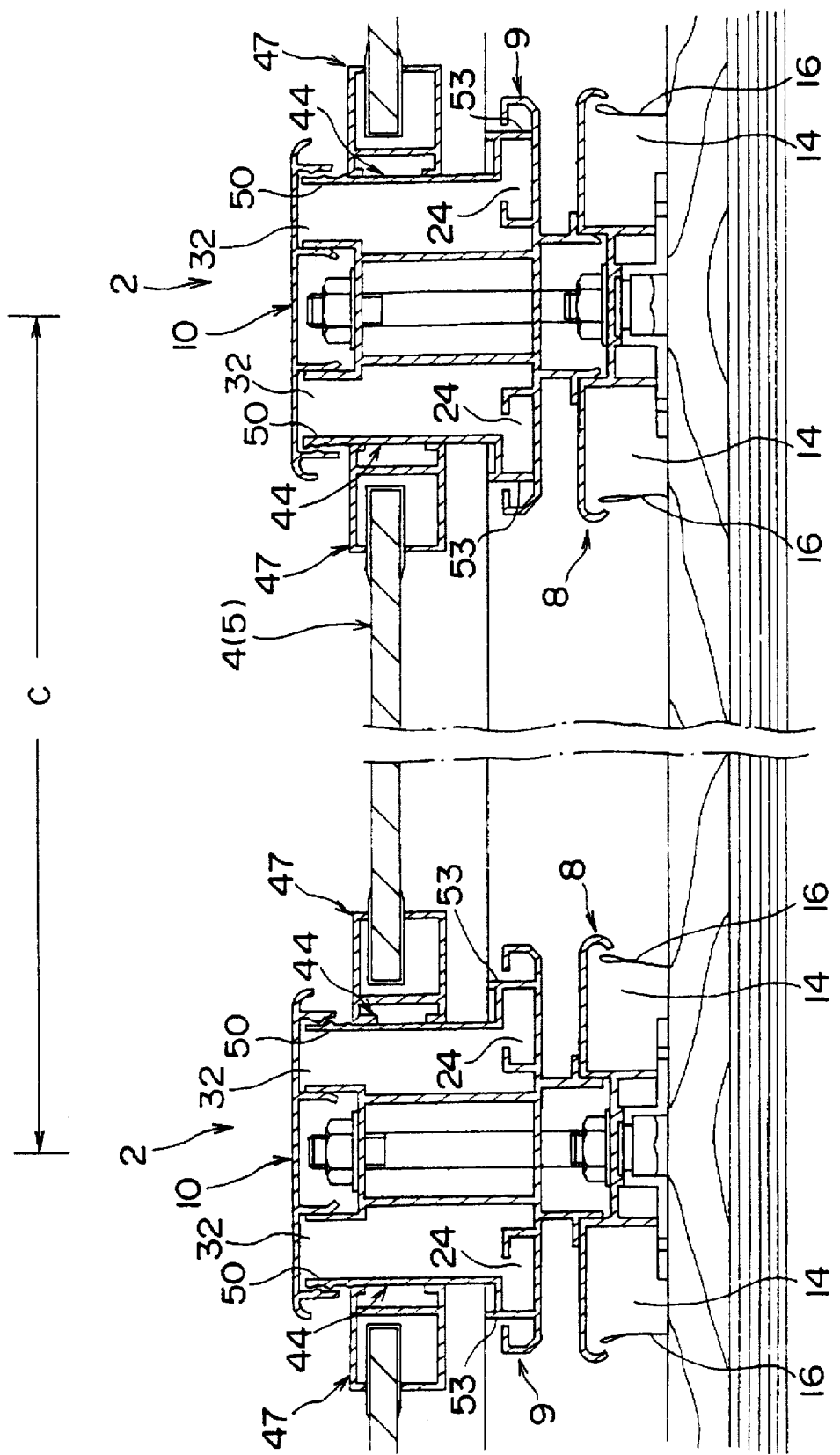
FIG. 24 is a transversal sectional view of a central portion of the roof system utilizing a solar cell according to the first embodiment of the present invention, in which being illustrated is a plus adjustment state thereof.

When the total finishing width is larger than the sheating width U, as shown in FIG. 24, the vertical supporting leg 53 and the vertical wall 50 of the end jamb 44 are located at a position closer to the external flange of the connecting members 2 and 3 to achieve a width adjustment in a plus direction. A plus execution width C is equal to 616 mm for tile first modular roof member 4 and is equal to 721 mm for the second modular roof member 5.

Accordingly, when the modular roof members 4 and 5 are equal in number to six, the fine adjustment of 10 mm in plus and 10 mm in minus can be made for every one row. The length available for the fine adjustment in the entire roof structure is equal to 60 mm. This length is larger than 52.5 mm, the half of the difference of 105 mm between the width of the first modular roof member 4 and that of the second roof module member 5. As a result, it becomes possible to apply the present invention to any one of suitable shearing width by means of selecting an adequate number of first and second modular roof members 4 and 5 and performing fine adjustment in the width adjusting portions of the connecting members 2 and 3.

For example, when the shearing width U is equal to 3,981 mm, then the parallel arrangement of three first modular roof members 4 and three second modular roof members 5 results in the standard total finishing width of 3,951 mm that is smaller than the shearing width U by 30 mm.

The amount of 5 mm, obtained by dividing the width of 30 mm by the number of modular roof members, i.e., six, is used as an amount of plus adjustment in each row. Then, the execution width of the first modular roof member 4 is adjusted to be equal to 611 mm and that of the second modular roof member 5 is adjusted to be equal to 716 mm to assign the connecting members 2 and 3.

When the sheating width is equal to 3,786 mm, then the parallel arrangement of four first modular roof members 4 and tow second modular roof members 5 results in the standard total finishing width of 3,846 mm that is larger than the sheating width U by 60 mm. The amount of 10 mm, obtained by dividing the width of 60 mm by the number of modular roof members, i.e., six, is used as an amount of minus adjustment in each row. Then, the execution width of the first modular roof member 4 is adjusted to be equal to 596 mm and that of the second modular roof member 5 is adjusted to be equal to 701 mm to assign the connecting members 2 and 3.

Combinations of the first and the second modular roof members 4 and 5 and the corresponding roof shearing widths are set forth in Table 1 through Table 5.

TABLE 1

| THE NUMBER OF MODULAR ROOF MEMBERS JUXTAPOSED: P | THE NUMBER OF FIRST MODULAR ROOF MEMBERS JUXTAPOSED: N | 606 × N = R | THE NUMBER OF SECOND MODULAR ROOF MEMBERS JUXTAPOSED: S | 711 × S = T | TOTAL FINISHING WIDTH: R + T = G |
|---|---|---|---|---|---|
| 6 | 6 | 3636 | 0 | 0 | 3636 |
| 6 | 5 | 3030 | 1 | 711 | 3741 |
| 6 | 4 | 2424 | 2 | 1422 | 3846 |
| 6 | 3 | 1818 | 3 | 2133 | 3951 |
| 6 | 2 | 1212 | 4 | 2844 | 4056 |
| 6 | 1 | 606 | 5 | 3555 | 4161 |
| 7 | 7 | 4242 | 0 | 0 | 4242 |
| 7 | 6 | 3636 | 1 | 711 | 4347 |
| 7 | 5 | 3030 | 2 | 1422 | 4452 |
| 7 | 4 | 2424 | 3 | 2133 | 4557 |
| 7 | 3 | 1818 | 4 | 2844 | 4662 |
| 7 | 2 | 1212 | 5 | 3555 | 4767 |

| THE NUMBER OF MODULAR ROOF MEMBERS JUXTAPOSED: P | MINUS ADJUSTING WIDTH: P × (−10) = Z | PLUS ADJUSTING WIDTH: P × 10 = V | MINUS ADJUSTED SHEATHING WIDTH: G + Z | STANDARD SHEATHING WIDTH: G | PLUS ADJUSTED SHEATHING WIDTH: G + V |
|---|---|---|---|---|---|
| 6 | −60 | | 3576 | | |
| | | 0 | | 3636 | |
| | | +60 | | | 3696 |
| 6 | −60 | | 3681 | | |
| | | 0 | | 3741 | |

TABLE 1-continued

| | | | | | | |
|---|---|---|---|---|---|---|
| | | | +60 | | | 3801 |
| | 6 | −60 | | 3786 | | |
| | | | 0 | | 3846 | |
| | | | +60 | | | 3906 |
| | 6 | −60 | | 3891 | | |
| | | | 0 | | 3951 | |
| | | | +60 | | | 4011 |
| | 6 | −60 | | 3996 | | |
| | | | 0 | | 4056 | |
| | | | +60 | | | 4116 |
| | 6 | −60 | | 4101 | | |
| | | | 0 | | 4161 | |
| | | | +60 | | | 4221 |
| | 7 | −70 | | 4172 | | |
| | | | 0 | | 4242 | |
| | | | +70 | | | 4312 |
| | 7 | −70 | | 4277 | | |
| | | | 0 | | 4347 | |
| | | | +70 | | | 4417 |
| | 7 | −70 | | 4382 | | |
| | | | 0 | | 4452 | |
| | | | +70 | | | 4522 |
| | 7 | −70 | | 4487 | | |
| | | | 0 | | 4557 | |
| | | | +70 | | | 4627 |
| | 7 | −70 | | 4592 | | |
| | | | 0 | | 4662 | |
| | | | +70 | | | 4732 |
| | 7 | −70 | | 4697 | | |
| | | | 0 | | 4767 | |
| | | | +70 | | | 4837 |

TABLE 2

| P | N | 606 × N = R | S | 711 × S = T | R + T = G | P × (−10) = Z | P × 10 = V | G + Z | G | G + V |
|---|---|---|---|---|---|---|---|---|---|---|
| 8 | 8 | 4848 | 0 | 0 | 4848 | −80 | | 4768 | | |
| | | | | | | | 0 | | 4848 | |
| | | | | | | | +80 | | | 4928 |
| 8 | 7 | 4242 | 1 | 711 | 4953 | −80 | | 4873 | | |
| | | | | | | | 0 | | 4953 | |
| | | | | | | | +80 | | | 5033 |
| 8 | 6 | 3636 | 2 | 1422 | 5058 | −80 | | 4978 | | |
| | | | | | | | 0 | | 5058 | |
| | | | | | | | +80 | | | 5138 |
| 8 | 5 | 3030 | 3 | 2133 | 5163 | −80 | | 5083 | | |
| | | | | | | | 0 | | 5163 | |
| | | | | | | | +80 | | | 5243 |
| 8 | 4 | 2424 | 4 | 2844 | 5268 | −80 | | 5188 | | |
| | | | | | | | 0 | | 5268 | |
| | | | | | | | +80 | | | 5348 |
| 8 | 3 | 1818 | 5 | 3555 | 5373 | −80 | | 5293 | | |
| | | | | | | | 0 | | 5373 | |
| | | | | | | | +80 | | | 5453 |
| 9 | 9 | 5454 | 0 | 0 | 5454 | −90 | | 5364 | | |
| | | | | | | | 0 | | 5454 | |
| | | | | | | | +90 | | | 5544 |
| 9 | 8 | 4848 | 1 | 711 | 5559 | −90 | | 5469 | | |
| | | | | | | | 0 | | 5559 | |
| | | | | | | | +90 | | | 5649 |
| 9 | 7 | 4242 | 2 | 1422 | 5664 | −90 | | 5574 | | |
| | | | | | | | 0 | | 5664 | |
| | | | | | | | +90 | | | 5754 |
| 9 | 6 | 3636 | 3 | 2133 | 5769 | −90 | | 5679 | | |
| | | | | | | | 0 | | 5769 | |
| | | | | | | | +90 | | | 5859 |
| 9 | 5 | 3030 | 4 | 2844 | 5874 | −90 | | 5784 | | |
| | | | | | | | 0 | | 5874 | |
| | | | | | | | +90 | | | 5964 |
| 9 | 4 | 2424 | 5 | 3555 | 5979 | −90 | | 5889 | | |
| | | | | | | | 0 | | 5979 | |
| | | | | | | | +90 | | | 6069 |

TABLE 3

| P | N | 606 × N = R | S | 711 × S = T | R + T = G | P × (−10) = Z | P × 10 = V | G + Z | G | G + V |
|---|---|---|---|---|---|---|---|---|---|---|
| 10 | 10 | 6060 | 0 | 0 | 6060 | −100 |  | 5960 |  |  |
|  |  |  |  |  |  |  | 0 |  | 6060 |  |
|  |  |  |  |  |  |  | +100 |  |  | 6160 |
| 10 | 9 | 5454 | 1 | 711 | 6165 | −100 |  | 6065 |  |  |
|  |  |  |  |  |  |  | 0 |  | 6165 |  |
|  |  |  |  |  |  |  | +100 |  |  | 6265 |
| 10 | 8 | 4848 | 2 | 1422 | 6270 | −100 |  | 6170 |  |  |
|  |  |  |  |  |  |  | 0 |  | 6270 |  |
|  |  |  |  |  |  |  | +100 |  |  | 6370 |
| 10 | 7 | 4242 | 3 | 2133 | 6375 | −100 |  | 6275 |  |  |
|  |  |  |  |  |  |  | 0 |  | 6375 |  |
|  |  |  |  |  |  |  | +100 |  |  | 6475 |
| 10 | 6 | 3636 | 4 | 2844 | 6480 | −100 |  | 6380 |  |  |
|  |  |  |  |  |  |  | 0 |  | 6480 |  |
|  |  |  |  |  |  |  | +100 |  |  | 6580 |
| 10 | 5 | 3030 | 5 | 3555 | 6585 | −100 |  | 6485 |  |  |
|  |  |  |  |  |  |  | 0 |  | 6585 |  |
|  |  |  |  |  |  |  | +100 |  |  | 6685 |
| 11 | 11 | 6666 | 0 | 0 | 6666 | −110 |  | 6556 |  |  |
|  |  |  |  |  |  |  | 0 |  | 6666 |  |
|  |  |  |  |  |  |  | +110 |  |  | 6776 |
| 11 | 10 | 6060 | 1 | 711 | 6771 | −110 |  | 6661 |  |  |
|  |  |  |  |  |  |  | 0 |  | 6771 |  |
|  |  |  |  |  |  |  | +110 |  |  | 6881 |
| 11 | 9 | 5454 | 2 | 1422 | 6876 | −110 |  | 6766 |  |  |
|  |  |  |  |  |  |  | 0 |  | 6876 |  |
|  |  |  |  |  |  |  | +110 |  |  | 6986 |
| 11 | 8 | 4848 | 3 | 2133 | 6981 | −110 |  | 6871 |  |  |
|  |  |  |  |  |  |  | 0 |  | 6981 |  |
|  |  |  |  |  |  |  | +110 |  |  | 7091 |
| 11 | 7 | 4242 | 4 | 2844 | 7086 | −110 |  | 6976 |  |  |
|  |  |  |  |  |  |  | 0 |  | 7086 |  |
|  |  |  |  |  |  |  | +110 |  |  | 7196 |
| 11 | 6 | 3636 | 5 | 3555 | 7191 | −110 |  | 7081 |  |  |
|  |  |  |  |  |  |  | 0 |  | 7191 |  |
|  |  |  |  |  |  |  | +110 |  |  | 7301 |

TABLE 4

| P | N | 606 × N = R | S | 711 × S = T | R + T = G | P × (−10) = Z | P × 10 = V | G + Z | G | G + V |
|---|---|---|---|---|---|---|---|---|---|---|
| 12 | 12 | 7272 | 0 | 0 | 7272 | −120 |  | 7152 |  |  |
|  |  |  |  |  |  |  | 0 |  | 7272 |  |
|  |  |  |  |  |  |  | +120 |  |  | 7392 |
| 12 | 11 | 6666 | 1 | 711 | 7377 | −120 |  | 7257 |  |  |
|  |  |  |  |  |  |  | 0 |  | 7377 |  |
|  |  |  |  |  |  |  | +120 |  |  | 7497 |
| 12 | 10 | 6060 | 2 | 1422 | 7482 | −120 |  | 7362 |  |  |
|  |  |  |  |  |  |  | 0 |  | 7482 |  |
|  |  |  |  |  |  |  | +120 |  |  | 7602 |
| 12 | 9 | 5454 | 3 | 2133 | 7587 | −120 |  | 7467 |  |  |
|  |  |  |  |  |  |  | 0 |  | 7587 |  |
|  |  |  |  |  |  |  | +120 |  |  | 7707 |
| 12 | 8 | 4848 | 4 | 2844 | 7692 | −120 |  | 7572 |  |  |
|  |  |  |  |  |  |  | 0 |  | 7692 |  |
|  |  |  |  |  |  |  | +120 |  |  | 7812 |
| 12 | 7 | 4242 | 5 | 3555 | 7797 | −120 |  | 7677 |  |  |
|  |  |  |  |  |  |  | 0 |  | 7797 |  |
|  |  |  |  |  |  |  | +120 |  |  | 7917 |
| 13 | 13 | 7878 | 0 | 0 | 7878 | −130 |  | 7748 |  |  |
|  |  |  |  |  |  |  | 0 |  | 7878 |  |
|  |  |  |  |  |  |  | +130 |  |  | 8008 |
| 13 | 12 | 7272 | 1 | 711 | 7983 | −130 |  | 7853 |  |  |
|  |  |  |  |  |  |  | 0 |  | 7983 |  |
|  |  |  |  |  |  |  | +130 |  |  | 8113 |
| 13 | 11 | 6666 | 2 | 1422 | 8083 | −130 |  | 7958 |  |  |
|  |  |  |  |  |  |  | 0 |  | 8088 |  |
|  |  |  |  |  |  |  | +130 |  |  | 8218 |
| 13 | 10 | 6060 | 3 | 2133 | 8193 | −130 |  | 8063 |  |  |
|  |  |  |  |  |  |  | 0 |  | 8193 |  |
|  |  |  |  |  |  |  | +130 |  |  | 8323 |
| 13 | 9 | 5454 | 4 | 2844 | 8298 | −130 |  | 8168 |  |  |
|  |  |  |  |  |  |  | 0 |  | 8298 |  |
|  |  |  |  |  |  |  | +130 |  |  | 8428 |

TABLE 4-continued

| P | N | 606 × N = R | S | 711 × S = T | R + T = G | P × (−10) = Z | P × 10 = V | G + Z | G | G + V |
|---|---|---|---|---|---|---|---|---|---|---|
| 13 | 8 | 4848 | 5 | 3555 | 8403 | −130 | | 8273 | | |
| | | | | | | | 0 | | 8403 | |
| | | | | | | +130 | | | | 8533 |

TABLE 5

| P | N | 606 × N = R | S | 711 × S = T | R + T = G | P × (−10) = Z | P × 10 = V | G + Z | G | G + V |
|---|---|---|---|---|---|---|---|---|---|---|
| 14 | 14 | 8484 | 0 | 0 | 8484 | −140 | | 8344 | | |
| | | | | | | | 0 | | 8484 | |
| | | | | | | +140 | | | | 8624 |
| 14 | 13 | 7878 | 1 | 711 | 8589 | −140 | | 8449 | | |
| | | | | | | | 0 | | 8589 | |
| | | | | | | +140 | | | | 8729 |
| 14 | 12 | 7272 | 2 | 1422 | 8694 | −140 | | 8554 | | |
| | | | | | | | 0 | | 8694 | |
| | | | | | | +140 | | | | 8834 |
| 14 | 11 | 6666 | 3 | 2133 | 8799 | −140 | | 8659 | | |
| | | | | | | | 0 | | 8799 | |
| | | | | | | +140 | | | | 8939 |
| 14 | 10 | 6060 | 4 | 2844 | 8904 | −140 | | 8764 | | |
| | | | | | | | 0 | | 8904 | |
| | | | | | | +140 | | | | 9044 |
| 14 | 9 | 5454 | 5 | 3555 | 9009 | −140 | | 8869 | | |
| | | | | | | | 0 | | 9009 | |
| | | | | | | +140 | | | | 9149 |
| 15 | 15 | 9090 | 0 | 0 | 9090 | −150 | | 8940 | | |
| | | | | | | | 0 | | 9090 | |
| | | | | | | +150 | | | | 9240 |
| 15 | 14 | 8484 | 1 | 711 | 9195 | −150 | | 9045 | | |
| | | | | | | | 0 | | 9195 | |
| | | | | | | +150 | | | | 9345 |
| 15 | 13 | 7878 | 2 | 1422 | 9300 | −150 | | 9150 | | |
| | | | | | | | 0 | | 9300 | |
| | | | | | | +150 | | | | 9450 |
| 15 | 12 | 7272 | 3 | 2133 | 9405 | −150 | | 9255 | | |
| | | | | | | | 0 | | 9405 | |
| | | | | | | +150 | | | | 9555 |
| 15 | 11 | 6666 | 4 | 2844 | 9510 | −150 | | 9360 | | |
| | | | | | | | 0 | | 9510 | |
| | | | | | | +150 | | | | 9660 |
| 15 | 10 | 6060 | 5 | 3555 | 9615 | −150 | | 9465 | | |
| | | | | | | | 0 | | 9615 | |
| | | | | | | +150 | | | | 9765 |

As apparent from the above Table 1 through Table 5, an allowable sheating width for the combination of the first and the second modular roof members 4 and 5 is same as its corresponding adjusted sheating widths shown in the upper and lower columns in the tables. This means that a combination of the first and the second modular roof members 4 and 5 can be applied to a roof having any shearing width. In this event, increased number of rows of the light collecting plate segments 48 results in more improved efficiency of lighting with respect to the roof area.

For example, a roof having the sheating width U of 9,400 mm can be constructed as a combination of thirteen first modular roof members 4 and two second modular roof members 5, or of twelve first modular roof members 4 and three second modular roof members 5, or of eleven first modular roof members 4 and four second modular roof members 5. However, the number of rows of the light collecting plate segments 48 is increased with the increased number of second modular roof members 5, which yields higher efficiency of power generation.

The wider range of choice can be provided with the larger width of the shearing and the number of rows of the light collecting plate segments 48 can thus be increased. As a result, it becomes possible to increase a ratio of the lighting area to the execution area.

Figure 25:
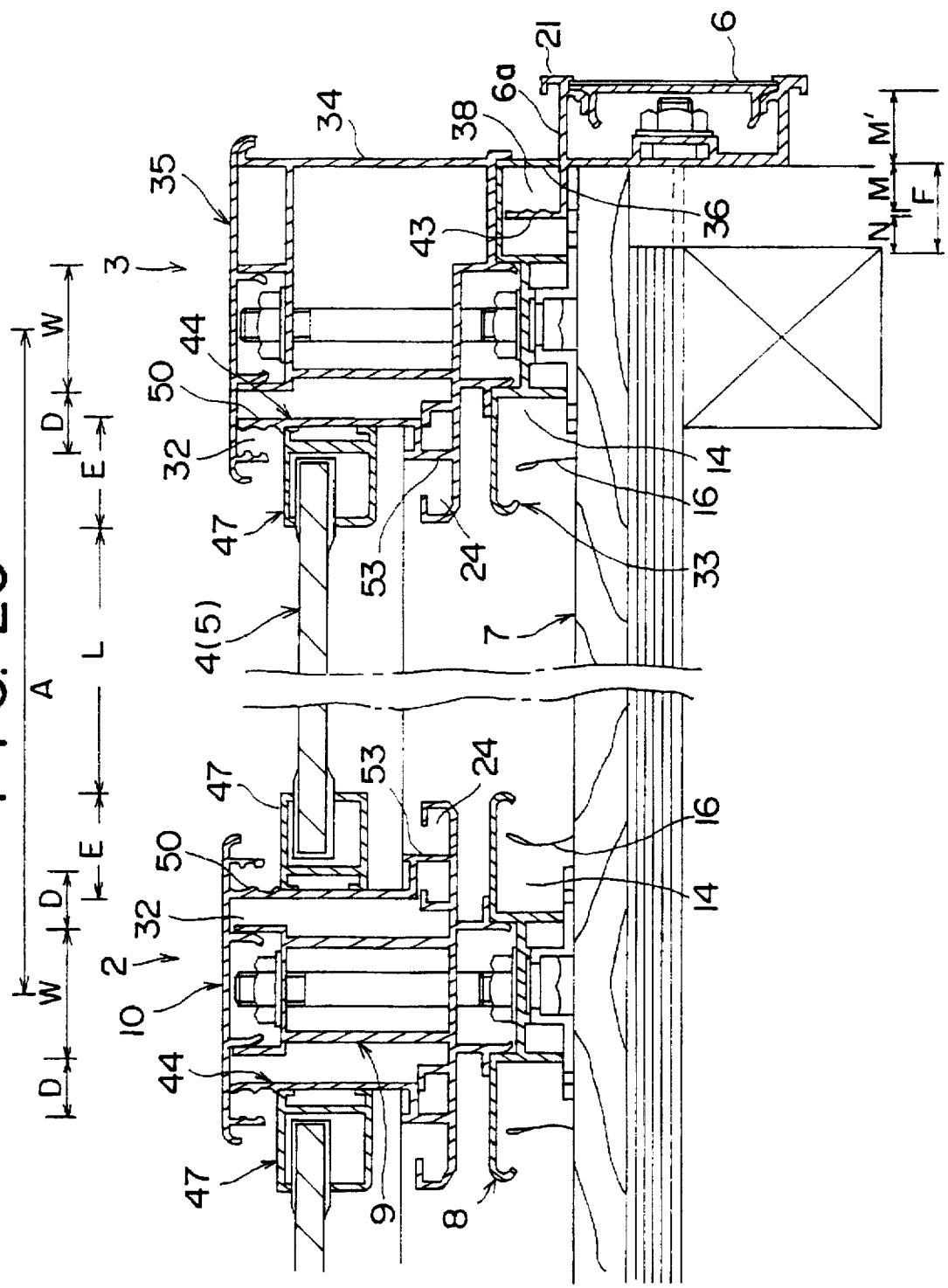
FIG. 25 is a transversal sectional view of a lateral portion of the roof system with a solar cell according to the first embodiment of the present invention.

In addition, the verge portion can be subjected to the fine adjustment in the same manner as described in conjunction with the intermediate width adjusting portion 24 and the upper width adjusting portion 32. The riser wall 43 of the verge member 6 is laterally slidable within the lateral width adjusting portion 38 of the lateral connecting member 3. As shown in FIG. 25, if the width F of the lateral width adjusting portion 38 is equal to 31.8 mm, each of the plus adjusting width M and a minus adjusting width N is equal to 15 mm because the riser wall 43 is 1.5 mm in thick. Accordingly, fine adjustment can be made at an amount of 30 mm in both plus and minus directions when the verges at both sides are taken into consideration.

Further, a width M' between a reference position of the verge member presser piece 36 of the lateral lower connecting member 33 and the flashing projection 21 of the verge member 6 is approximately equal to or slightly larger than the plus adjusting width M.

Figure 26:
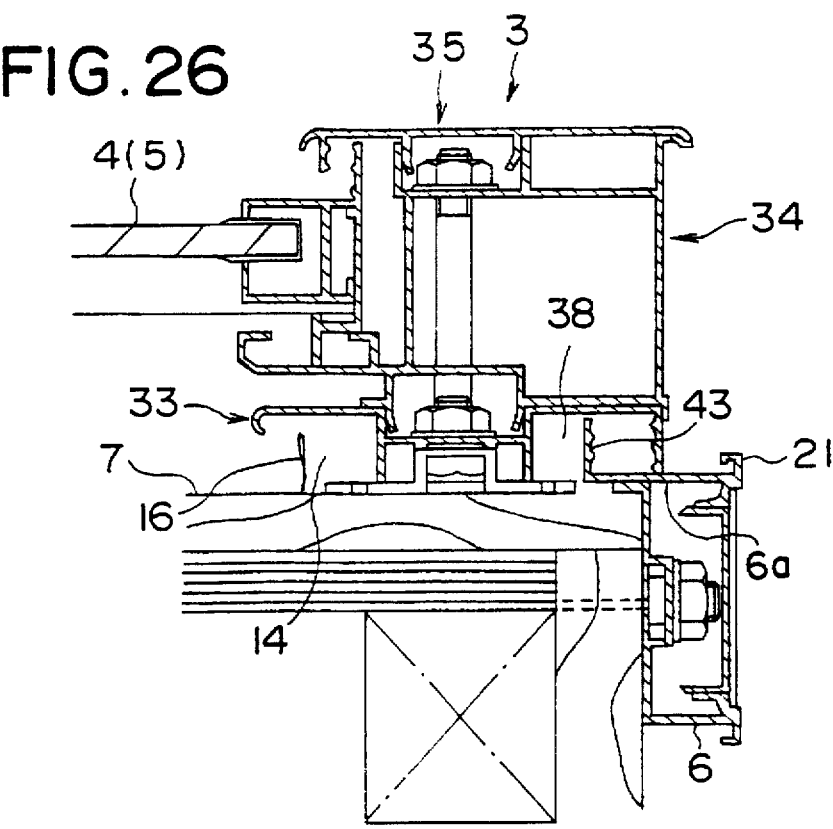
FIG. 26 is a transversal sectional view of a lateral portion of the roof system utilizing a solar cell according to the first embodiment of the present invention, in which being illustrated is a zero adjustment state thereof.
Figure 27:
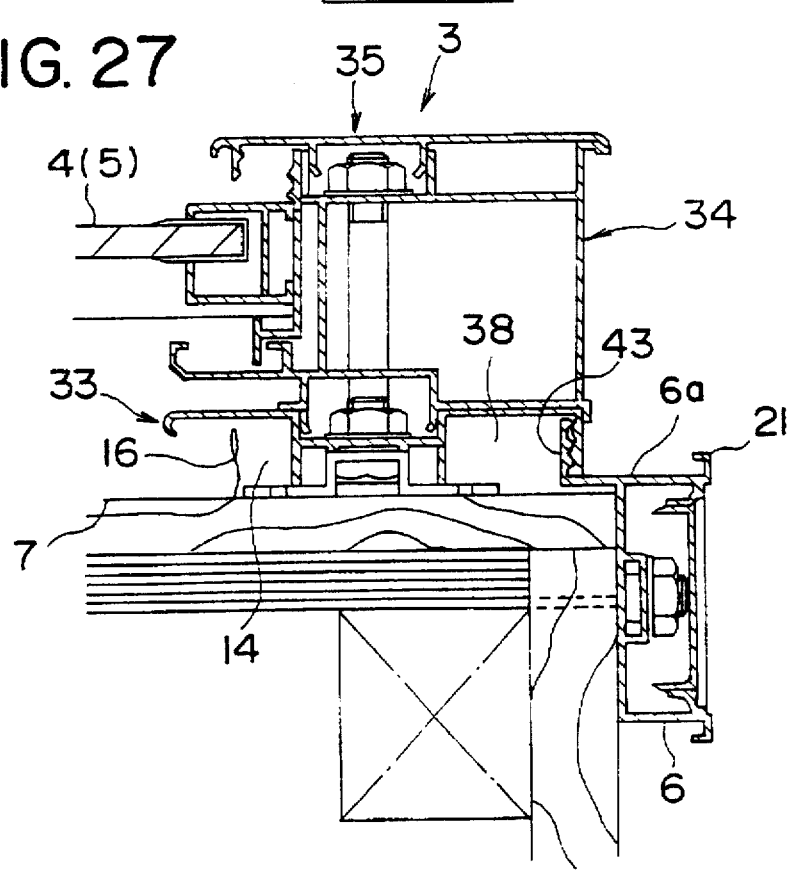
FIG. 27 is a transversal sectional view of a lateral portion of the roof system utilizing a solar cell according to the first embodiment of the present invention, in which being illustrated is a minus adjustment state thereof.
Figure 28:
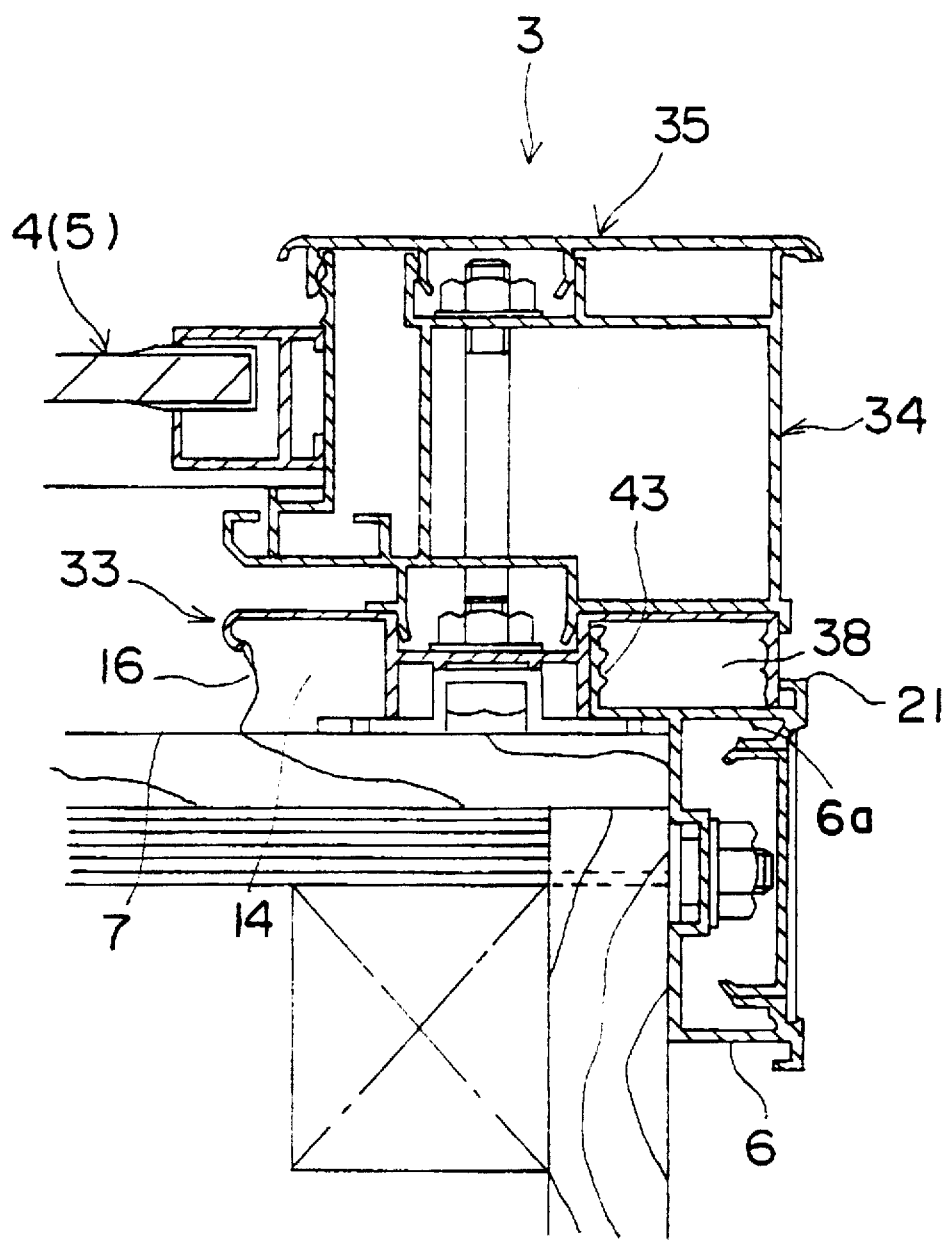
FIG. 28 is a transversal sectional view of a lateral portion of the roof system utilizing a solar cell according to the first embodiment of the present invention, in which being illustrated is a plus adjustment state thereof.

When no fine adjustment is required at the lateral portion, the riser wall 43 of the verge member 6 is located at the central position of the lateral width adjusting portion 38 of the lateral connection member 3 as shown in FIG. 26. When the total finishing width is smaller than the shearing width U, fine adjustment is made by means of, as shown in FIG. 27, sliding the riser wall 43 towards the external of the lateral connecting member 3 to achieve the minus adjustment. When the total finishing width is larger than the sheating width U, fine adjustment is made by means of, as shown in FIG. 28, sliding the riser wall 43 towards the internal flange of the lateral connecting member 3 to achieve the plus adjustment.

Thus, the allowable range of the plus and minus adjusted sheating widths as set forth in Table 1 through Table 5 is increased by 30 mm after lateral width adjustment. This lateral width adjustment can be used to increase the number of rows of the light collecting plate segments 48.

In addition, if the roof width U of the eaves's portion is different from that of the ridge portion, or if any execution error is caused, these error can be canceled at the verge portions within the range of the width F of the lateral width adjusting portion 38, which contributes to facilitating the final execution.

Further, as mentioned above, the connection space of 5 mm is formed between the framework body 47 and the light collecting plate segment 48. As a result, a distance K of 12 mm is formed between the upper width adjusting portion 32 and the light collecting plate segment 48 even when the modular roof members 4 and 5 are laid after being subjected to the maximum minus adjustment, so that the light collecting plate segments 48 will not be masked by the connecting members 2 and 3 and effective lighting can be achieved.

Figure 29:
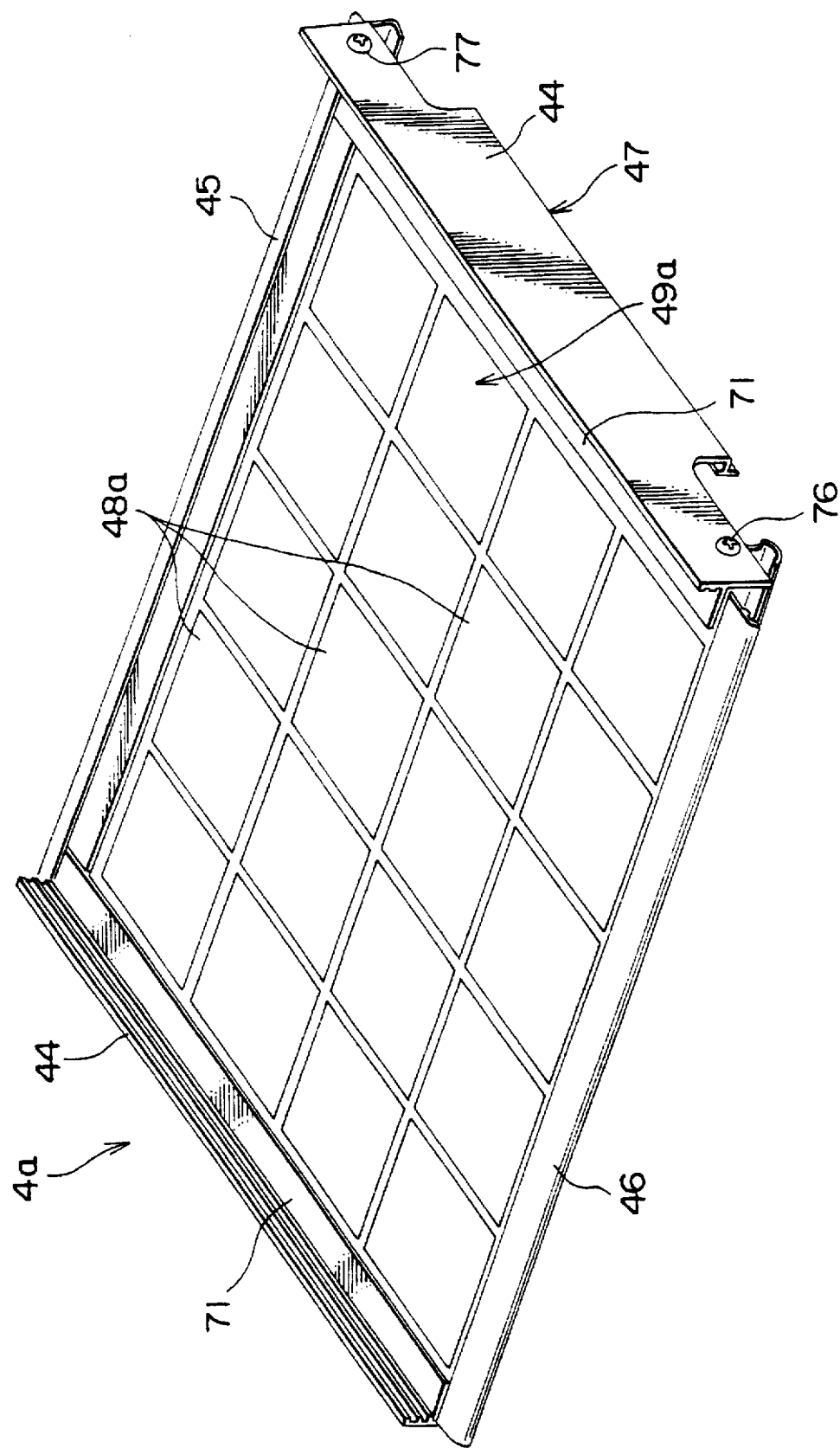
FIG. 29 is a perspective view of a first modular roof member according to a second embodiment of the present invention.

FIG. 29 shows a first modular roof member 4a according to a second embodiment of the present invention. An individual light collecting plate segment 48a in this embodiment has a square shape with sides of 150 mm in length. The light collecting plate segments 48a are arranged into an array as a composite assembly 49a with five rows and four columns and engaged in the framework body 47. To restrict the weight of the assembly, the number of column of light collecting plate segments is reduced by one as compared with the case of the first embodiment.

The light collecting plate segments 48a are apart from each other at a connection distance of about 5 mm. Likewise, the framework body 47 is apart from the composite assembly 49a at the connection distance of about 5 mm. In addition, a length of about 10 mm is required at both sides for installing the light collecting plate segment 48a to the framework body 47 as described in conjunction with the first embodiment. Consequently, the width of the composite assembly 49a of the first modular roof member 4a is approximately equal to 800 mm. The execution length L except for the installation space is approximately equal to 780 mm.

Other components and parts are similar to those described in conjunction with the first modular roof member 4 shown in FIG. 4. Such parts are denoted by like reference numerals and description thereof will be omitted.

Figure 30:
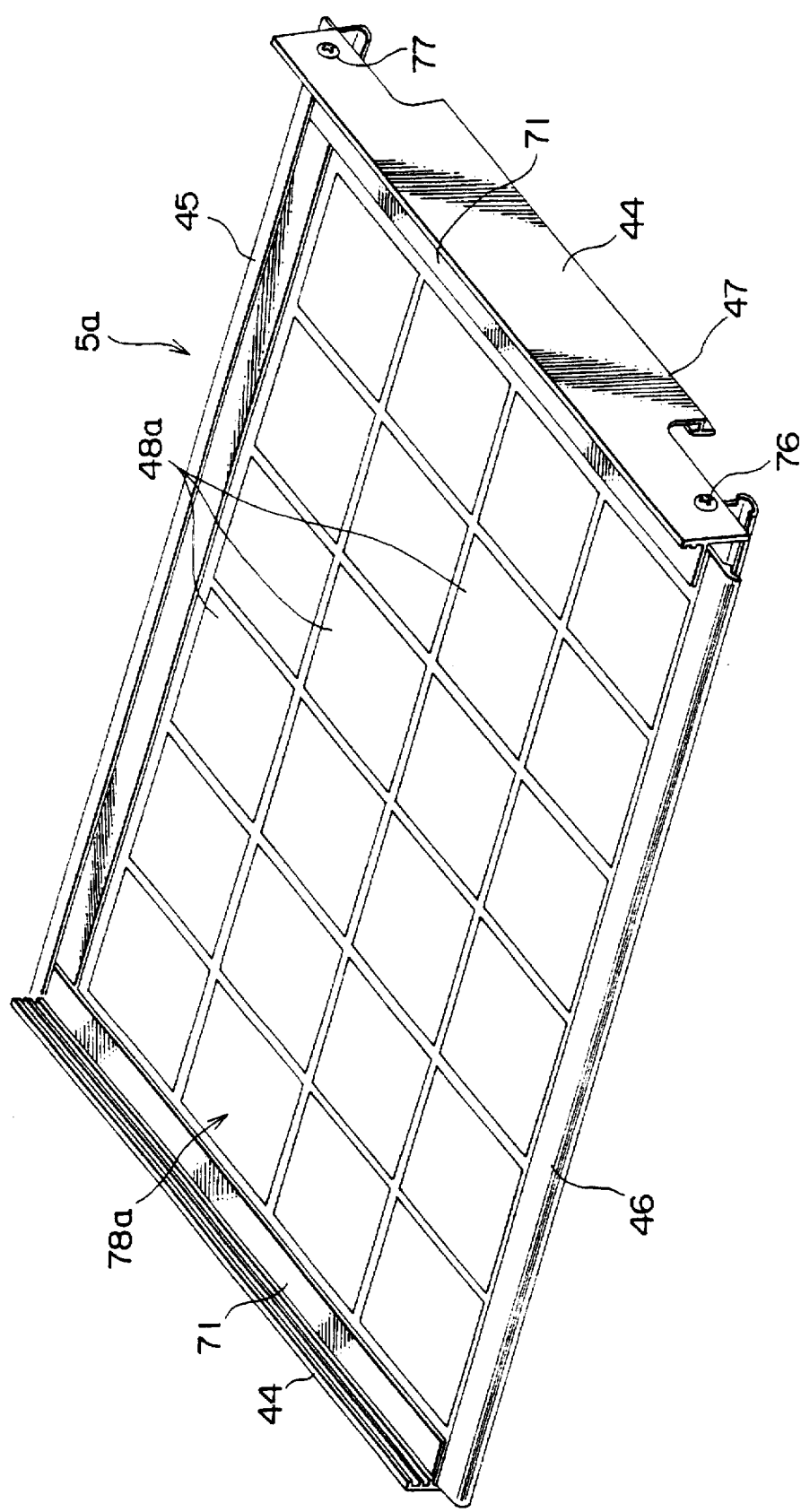
FIG. 30 is a perspective view of a second modular roof member according to the second embodiment of the present invention.

FIG. 30 shows a second modular roof member 5a according to the second embodiment of the present invention, in which a composite assembly 78a consists of six rows of the light collecting plate segments 48 aligned in the lateral direction and four columns thereof aligned in the slope direction. The width of the composite assembly 78a is approximately equal to 955 mm and the execution length L is approximately equal to 935 mm without considering the installation space.

Other components and parts are similar to those described in conjunction with the second modular roof member 5 shown in FIG. 18. Such parts are denoted by like reference numerals and description thereof will be omitted.

Figure 31:
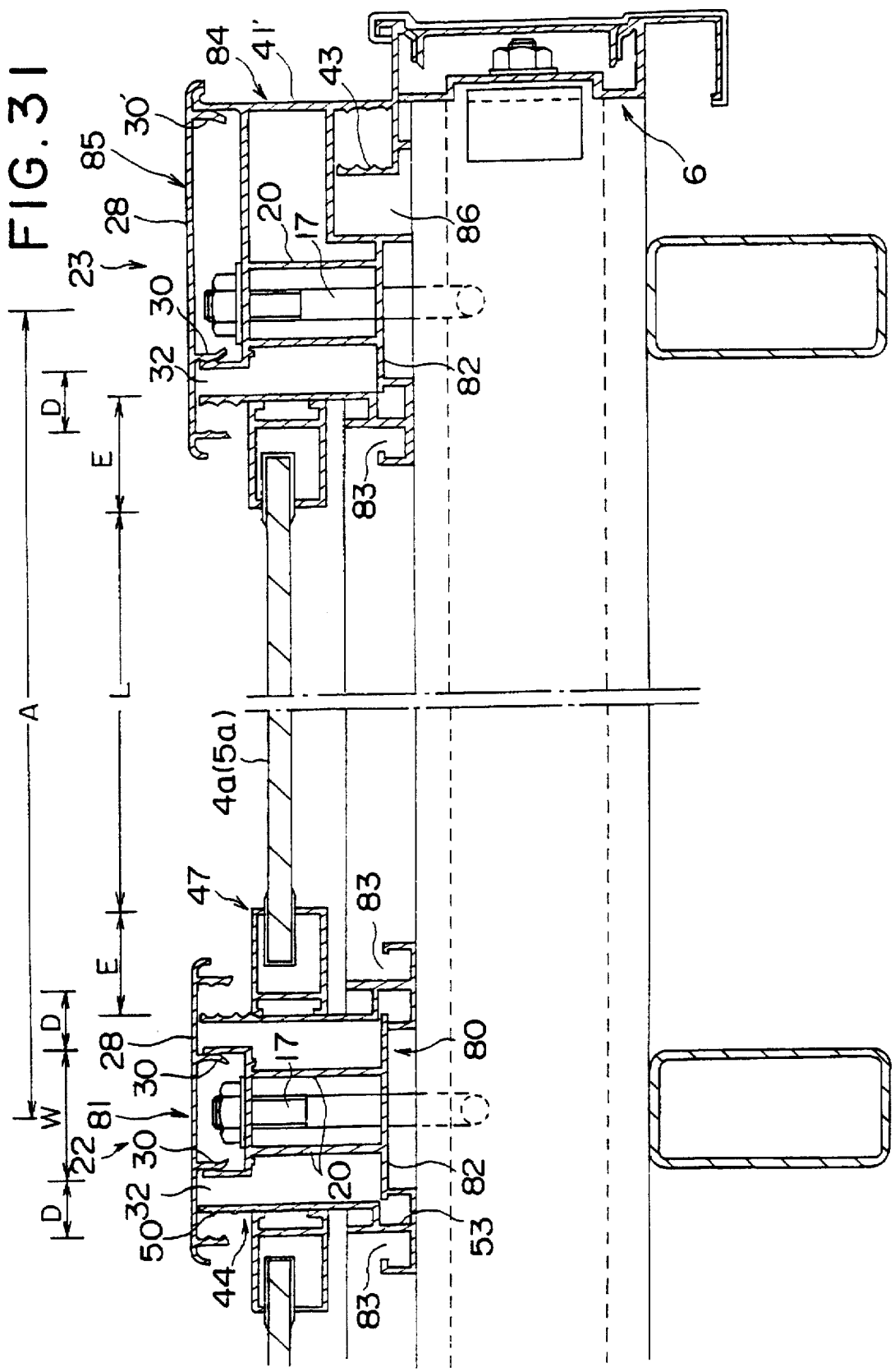
FIG. 31 is a transversal sectional view of the roof system utilizing a solar cell according to the second embodiment of the present invention, in which being illustrated is a zero adjustment state thereof.

FIGS. 31 through 30 show a connecting member according to the second embodiment of the present invention. The intermediate connecting member 22 has no lower connecting member and it comprises, as shown in FIG. 31, a connecting member body 80 and a connecting member cover 81. The connecting member body 80 is provided with an intermediate width adjusting portion 83. The intermediate width adjusting portion 83 has a wide groove-like shape and is opened upward at both ends of a horizontal fitting surface 82.

The other components of the connecting member body 80 and the connecting member cover 81 are similar to those described in conjunction with the upper connecting member 9 and the connecting member cover 10, respectively, illustrated in FIG. 2. Such components are denoted by like reference numerals and description thereof will be omitted.

The lateral connecting member 23 has no lateral lower connecting member and it comprises a lateral connecting member body 84 and a lateral connecting member cover 85. The lateral connecting member body 84 is provided with the intermediate width adjusting portion 83 at the inner low end of the horizontal fitting surface 82. A wide groove-like lateral width adjusting portion 86, opened downward, is formed in the outer end of the horizontal fitting surface 82. A side edge vertical wall 41' stands on the upper surface of an outer end of the lateral width adjusting portion 86. The lower surface of the lateral connecting member cover 85 at a position closer to the verge is provided with locking legs 30' for locking with the inner surface of the upper end of the side edge vertical wall 41'.

The other components and parts of the lateral connecting member body 84 and the lateral connecting member cover 85 are similar to those described in conjunction with the lateral upper connecting member 34 and the lateral connecting member cover 35 shown in FIG. 3. Such parts are denoted by like reference numerals and description thereof will be omitted. To install the modular roof members 4a and 5a with the intermediate connecting member 22 and the lateral connecting member 23, the intermediate width adjusting portion 83 is abutted to the upper surface of the roof deck. In addition, the connecting member body 80 and the lateral connecting member body 84 are arranged along the slope direction and are secured through the corresponding bolts 17. The lower ends of the vertical supporting legs 53 of the first and the second modular roof members 4a and 5a are inserted into the intermediate width adjusting portion 83. The connecting member cover 81 and the lateral connecting member cover 85 are attached over the connecting member body 80 and the lateral connecting member body 84, respectively, and following which the upper end of the vertical wall 50 of the end jamb 44 is inserted into the upper width adjusting portion 32.

The riser wall 43 of the verge member 6 is inserted into the lateral width adjusting portion 86 of the lateral connecting member body 84. The verge member 6 is thus attached to the outward of the lateral connecting member 3.

The widths of the modular roof members 4a and 5a in this embodiment are larger than that of the modular roof members 4 and 5, respectively, in the first embodiment. Accordingly, the width of the intermediate width adjusting portion 83 and that of the upper width adjusting portion 82 are determined as 15.5 mm and the width E of the framework body 47 is determined as 23.5 mm. The distance between the centers of the connecting members 22 and 23, i.e., the reference execution width A for one row is equal to 870 mm for the first modular roof member 4a having the execution width L of 780 mm and is equal to 1,025 mm for the second modular roof member 5a having the execution width L of 935 mm.

Examples are given on the correspondence between a combination of the first and the second modular roof members 4a and 5a and the shearing width U. The total finish width becomes equal to 5,220 mm when six first modular roof members 4 are aligned. The total finish width becomes equal to 6,245 mm when six first modular roof members 4a and one second modular roof member 5a are aligned. If this total finish width corresponds to the actual shearing width U, then the vertical supporting leg 53 and the vertical wall 50 of the end jamb 44 are located at the central position of the intermediate width adjusting portion 83 and the upper width adjusting portion 32, respectively. Accordingly, no fine adjustment is required.

Figure 32:
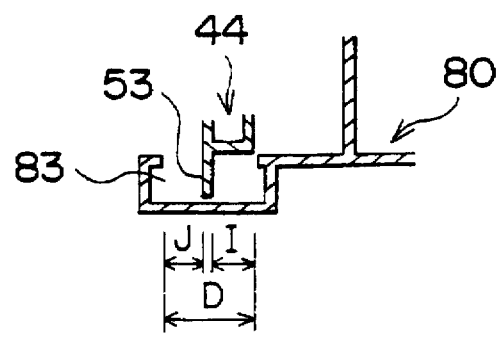
FIG. 32 is a sectional view around an intermediate width adjusting portion of the roof system utilizing a solar cell according to the second embodiment of the present invention.
Figure 33:
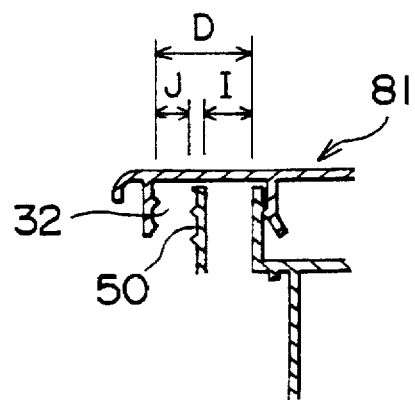
FIG. 33 is a sectional view around an upper width adjusting portion of the roof system utilizing a solar cell according to the second embodiment of the present invention.

As shown in FIGS. 32 and 33, each of the vertical supporting leg 53 and the vertical wall 50 of the end jamb 44 is 1.5 mm in thick while each of the intermediate width adjusting portion 83 and the upper width adjusting portion 32 is 15.5 mm in thick. Thus, the width I available for movement towards the center of the connecting members 22 and 23 is equal to 7 mm and the width J available for movement towards the external flange is also equal to 7 mm. Thus, a fine adjustment can be made as large as 14 mm plus or minus for every one row of the module. When there is an error between the actual roof sheating width U and the total finishing width, the fine adjustment can be made by means of adjusting an overlapped width of the engaging members of the modular roof members 4a and 5a and the connecting members 2 and 3.

Figure 34:
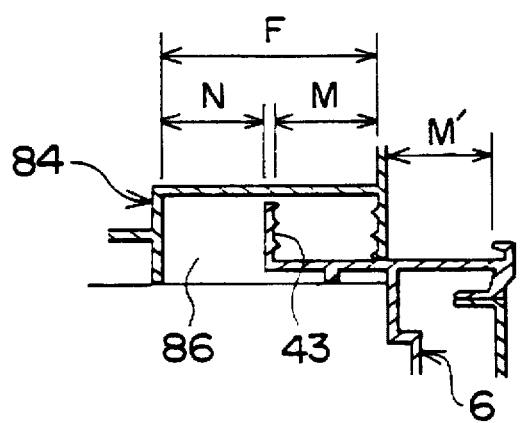
FIG. 34 is a sectional view around a lateral width adjusting portion of the roof system utilizing a solar cell according to the second embodiment of the present invention.

In addition, as shown in FIG. 34, the width F of the lateral width adjusting portion 86 is equal to 31.5 mm that is as same as the width of the lateral width adjusting portion 38 shown in FIG. 25. Each of the plus adjusting width M and the minus adjusting width N in the verge is equal to 15 mm, so that the fine adjustment can be made as large as 30 mm in both plus and minus direction.

Figure 35:
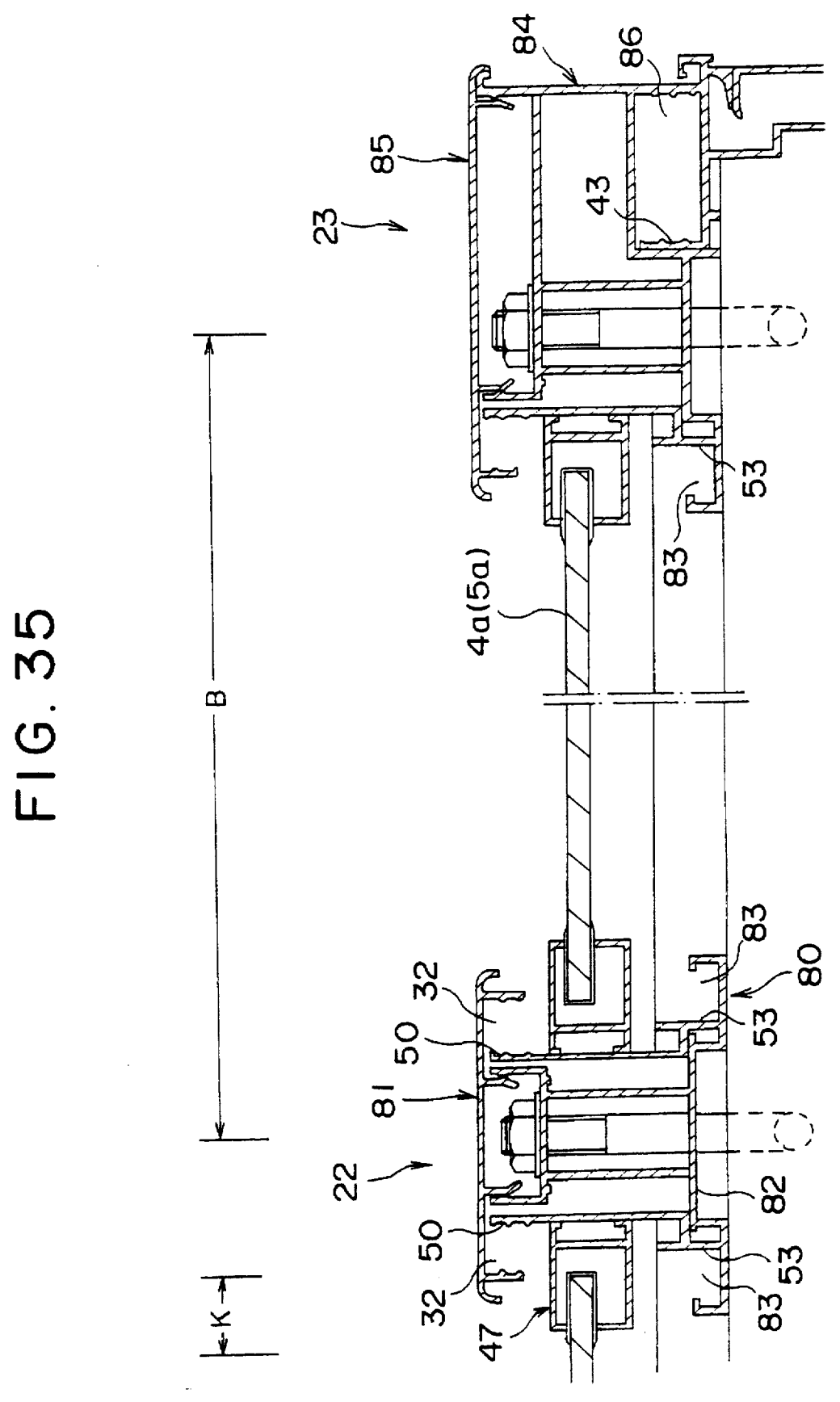

When the total finishing width is smaller than the shearing width U, fine adjustment is made as in the case of the intermediate width adjusting portion 83 and the upper width adjusting portion 32. As shown in FIG. 35, the vertical supporting leg 53 and the vertical wall 50 of the end jamb 44 are located at a position closer to the center of the connecting members 22 and 23 to achieve a width adjustment in a minus direction. The minus execution width B for the first modular roof member 4a is equal to 856 mm. This is obtained by means of subtracting 14 mm from 870 mm. The minus execution width B for the second modular roof member 5a is equal to 1,001 mm. This is obtained also by means of subtracting 14 mm from 1,025 mm.

Figure 36:
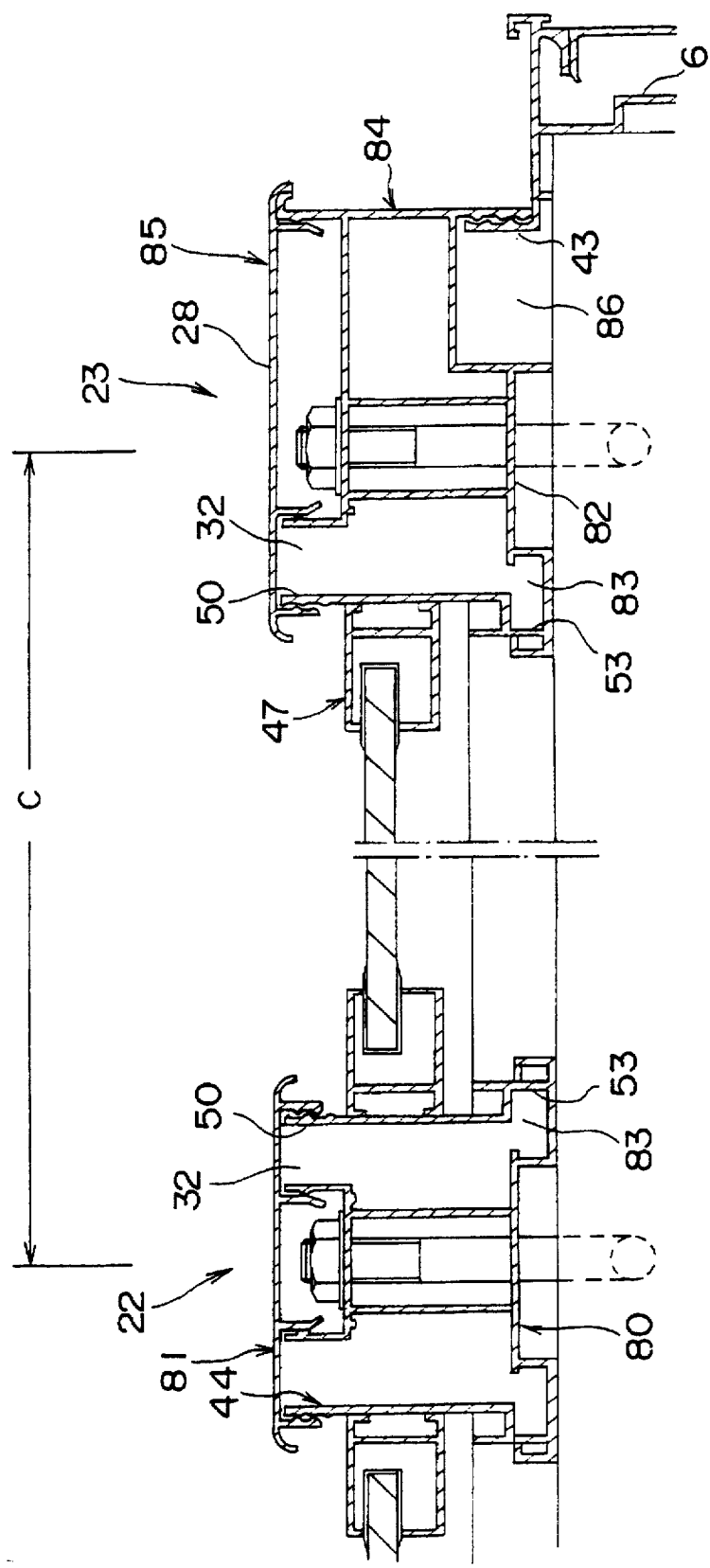
FIG. 36 is a transversal sectional view of a lateral portion of the roof system utilizing a solar cell according to the second embodiment of the present invention, in which being illustrated is a plus adjustment state thereof.

When the total finishing width is larger than the sheating width U, as shown in FIG. 36, the vertical supporting leg 53 and the vertical wall 50 of the end jamb 44 are located at a position closer to the external flange of the connecting members 22 and 23 to achieve a width adjustment in a plus direction. The plus execution width C for the first modular roof member 4a is equal to 884 mm. This value is obtained by means of adding 14 mm to 870 mm. In addition, the plus execution width C for the second modular roof member 5a is equal to 1,039 mm that is obtained by means of adding 14 mm to 1,025 mm. For example, when the shearing width U is equal to 5,447 mm, then the parallel arrangement of four first modular roof members 4a and one second modular roof members 5a results in the standard total finishing width of 5,375 mm that is larger than the shearing width U by 72 mm.

Hence, the amount of 12 mm, obtained by dividing the width of 72 mm by the number of modular roof members, i.e., six, is used as an amount of plus adjustment in each row. As a result, the execution width of the first modular roof member 4a is adjusted to be equal to 882 mm and that of the second modular roof member 5a is adjusted to be equal to 1,037 mm to assign the connecting members 22 and 23.

When the shearing width U is equal to 5,488 mm, then the parallel arrangement of four first modular roof members 4a and tow second modular roof members 5a results in the standard total finishing width of 5,530 mm that is larger than the sheating width U by 42 mm. The amount of 7 mm, obtained by dividing the width of 42 mm by the number of modular roof members, i.e., six, is used as an amount of minus adjustment in each row. As a result, the execution width of the first modular roof member 4a is adjusted to be equal to 863 mm and that of the second modular roof member 5a is adjusted to be equal to 1,081 mm to assign the connecting members 22 and 23.

Combinations of the first and the second modular roof members 4a and 5a and the corresponding roof sheating widths are set forth in Table 6 through Table 9.

TABLE 6

| P | N | 870 × N = R | S | 1025 × S = T | R + T = G | P × (−14) = Z | P × 10 = V | G + Z | G | G + V |
|---|---|---|---|---|---|---|---|---|---|---|
| 6 | 6 | 5220 | 0 | 0 | 5220 | −84 | | 5136 | | |
| | | | | | | | 0 | | 5220 | |
| | | | | | | | +84 | | | 5304 |
| 6 | 5 | 4350 | 1 | 1025 | 5375 | −84 | | 5291 | | |
| | | | | | | | 0 | | 5375 | |
| | | | | | | | +84 | | | 5459 |
| 6 | 4 | 3480 | 2 | 2050 | 5530 | −84 | | 5446 | | |
| | | | | | | | 0 | | 5530 | |
| | | | | | | | +84 | | | 5614 |
| 6 | 3 | 2610 | 3 | 3075 | 5685 | −84 | | 5601 | | |
| | | | | | | | 0 | | 5685 | |
| | | | | | | | +84 | | | 5769 |
| 6 | 2 | 1740 | 4 | 4100 | 5840 | −84 | | 5756 | | |
| | | | | | | | 0 | | 5840 | |
| | | | | | | | +84 | | | 5924 |
| 6 | 1 | 870 | 5 | 5125 | 5995 | −84 | | 5911 | | |
| | | | | | | | 0 | | 5995 | |
| | | | | | | | +84 | | | 6079 |
| 7 | 7 | 6090 | 0 | 0 | 6090 | −98 | | 5992 | | |

TABLE 6-continued

| P | N | 870 × N = R | S | 1025 × S = T | R + T = G | P × (−14) = Z | P × 10 = V | G + Z | G | G + V |
|---|---|---|---|---|---|---|---|---|---|---|
| | | | | | | | 0 | | 6090 | |
| | | | | | | | +98 | | | 6188 |
| 7 | 6 | 5220 | 1 | 1025 | 6245 | −98 | | 6147 | | |
| | | | | | | | 0 | | 6245 | |
| | | | | | | | +98 | | | 6343 |
| 7 | 5 | 4350 | 2 | 2050 | 6400 | −98 | | 6302 | | |
| | | | | | | | 0 | | 6400 | |
| | | | | | | | +98 | | | 6498 |
| 7 | 4 | 3480 | 3 | 3075 | 6555 | −98 | | 6457 | | |
| | | | | | | | 0 | | 6555 | |
| | | | | | | | +98 | | | 6653 |
| 7 | 3 | 2610 | 4 | 4100 | 6710 | −98 | | 6612 | | |
| | | | | | | | 0 | | 6710 | |
| | | | | | | | +98 | | | 6808 |
| 7 | 2 | 1740 | 5 | 5125 | 6865 | −98 | | 6767 | | |
| | | | | | | | 0 | | 6865 | |
| | | | | | | | +98 | | | 6963 |

TABLE 7

| P | N | 870 × N = R | S | 1025 × S = T | R + T = G | P × (−14) = Z | P × 10 = V | G + Z | G | G + V |
|---|---|---|---|---|---|---|---|---|---|---|
| 8 | 8 | 6960 | 0 | 0 | 6960 | −112 | | 6848 | | |
| | | | | | | | 0 | | 6960 | |
| | | | | | | | +112 | | | 7072 |
| 8 | 7 | 6090 | 1 | 1025 | 7115 | −112 | | 7003 | | |
| | | | | | | | 0 | | 7115 | |
| | | | | | | | +112 | | | 7227 |
| 8 | 6 | 5220 | 2 | 2050 | 7270 | −112 | | 7158 | | |
| | | | | | | | 0 | | 7270 | |
| | | | | | | | +112 | | | 7382 |
| 8 | 5 | 4350 | 3 | 3075 | 7425 | −112 | | 7313 | | |
| | | | | | | | 0 | | 7425 | |
| | | | | | | | +112 | | | 7537 |
| 8 | 4 | 3480 | 4 | 4100 | 7580 | −112 | | 7468 | | |
| | | | | | | | 0 | | 7580 | |
| | | | | | | | +112 | | | 7692 |
| 8 | 3 | 2610 | 5 | 5125 | 7735 | −112 | | 7623 | | |
| | | | | | | | 0 | | 7735 | |
| | | | | | | | +112 | | | 7847 |
| 9 | 9 | 7830 | 0 | 0 | 7830 | −126 | | 7704 | | |
| | | | | | | | 0 | | 7830 | |
| | | | | | | | +126 | | | 7956 |
| 9 | 8 | 6960 | 1 | 1025 | 7985 | −126 | | 7859 | | |
| | | | | | | | 0 | | 7985 | |
| | | | | | | | +126 | | | 8111 |
| 9 | 7 | 6090 | 2 | 2050 | 8140 | −126 | | 8014 | | |
| | | | | | | | 0 | | 8140 | |
| | | | | | | | +126 | | | 8266 |
| 9 | 6 | 5220 | 3 | 3075 | 8295 | −126 | | 8169 | | |
| | | | | | | | 0 | | 8295 | |
| | | | | | | | +126 | | | 8421 |
| 9 | 5 | 4350 | 4 | 4100 | 8450 | −126 | | 8324 | | |
| | | | | | | | 0 | | 8450 | |
| | | | | | | | +126 | | | 8576 |
| 9 | 4 | 3480 | 5 | 5125 | 8605 | −126 | | 8479 | | |
| | | | | | | | 0 | | 8605 | |
| | | | | | | | +126 | | | 8731 |

TABLE 8

| P | N | 870 × N = R | S | 1025 × S = T | R + T = G | P × (−14) = Z | P × 10 = V | G + Z | G | G + V |
|---|---|---|---|---|---|---|---|---|---|---|
| 10 | 10 | 8700 | 0 | 0 | 8700 | −140 | | 8560 | | |
| | | | | | | | 0 | | 8700 | |
| | | | | | | | +140 | | | 8840 |
| 10 | 9 | 7830 | 1 | 1025 | 8855 | −140 | | 8715 | | |
| | | | | | | | 0 | | 8855 | |
| | | | | | | | +140 | | | 8995 |
| 10 | 8 | 6960 | 2 | 2050 | 9010 | −140 | | 8870 | | |
| | | | | | | | 0 | | 9010 | |
| | | | | | | | +140 | | | 9150 |

TABLE 8-continued

| P | N | 870 × N = R | S | 1025 × S = T | R + T = G | P × (−14) = Z | P × 10 = V | G + Z | G | G + V |
|---|---|---|---|---|---|---|---|---|---|---|
| 10 | 7 | 6090 | 3 | 3075 | 9165 | −140 | | 9025 | | |
| | | | | | | | 0 | | 9165 | |
| | | | | | | | +140 | | | 9305 |
| 10 | 6 | 5220 | 4 | 4100 | 9320 | −140 | | 9180 | | |
| | | | | | | | 0 | | 9320 | |
| | | | | | | | +140 | | | 9460 |
| 11 | 11 | 9570 | 0 | 0 | 9570 | −154 | | 9416 | | |
| | | | | | | | 0 | | 9570 | |
| | | | | | | | +154 | | | 9724 |
| 11 | 10 | 8700 | 1 | 1025 | 9725 | −154 | | 9571 | | |
| | | | | | | | 0 | | 9725 | |
| | | | | | | | +154 | | | 9879 |
| 11 | 9 | 7830 | 2 | 2050 | 9880 | −154 | | 9726 | | |
| | | | | | | | 0 | | 9880 | |
| | | | | | | | +154 | | | 10034 |
| 11 | 8 | 6960 | 3 | 3075 | 10035 | −154 | | 9881 | | |
| | | | | | | | 0 | | 10035 | |
| | | | | | | | +154 | | | 10189 |
| 11 | 7 | 6090 | 4 | 4100 | 10190 | −154 | | 10036 | | |
| | | | | | | | 0 | | 10190 | |
| | | | | | | | +154 | | | 10344 |
| 12 | 12 | 10440 | 0 | 0 | 10440 | −168 | | 10272 | | |
| | | | | | | | 0 | | 10440 | |
| | | | | | | | +168 | | | 10608 |
| 12 | 10 | 8770 | 2 | 2050 | 10750 | −168 | | 10582 | | |
| | | | | | | | 0 | | 10750 | |
| | | | | | | | +168 | | | 10918 |

TABLE 9

| P | N | 870 × N = R | S | 1025 × S = T | R + T = G | P × (−14) = Z | P × 10 = V | G + Z | G | G + V |
|---|---|---|---|---|---|---|---|---|---|---|
| 12 | 8 | 6960 | 4 | 4100 | 11060 | −168 | | 10892 | | |
| | | | | | | | 0 | | 11060 | |
| | | | | | | | +168 | | | 11228 |
| 13 | 13 | 11310 | 0 | 0 | 11310 | −182 | | 11128 | | |
| | | | | | | | 0 | | 11310 | |
| | | | | | | | +182 | | | 11492 |
| 13 | 11 | 9570 | 2 | 2050 | 11620 | −182 | | 11438 | | |
| | | | | | | | 0 | | 11620 | |
| | | | | | | | +182 | | | 11802 |
| 13 | 9 | 7830 | 4 | 4100 | 11930 | −182 | | 11748 | | |
| | | | | | | | 0 | | 11930 | |
| | | | | | | | +182 | | | 12112 |
| 14 | 14 | 12180 | 0 | 0 | 12180 | −196 | | 11984 | | |
| | | | | | | | 0 | | 12180 | |
| | | | | | | | +196 | | | 12376 |
| 14 | 12 | 10440 | 2 | 2050 | 12490 | −196 | | 12294 | | |
| | | | | | | | 0 | | 12490 | |
| | | | | | | | +196 | | | 12686 |
| 14 | 10 | 8700 | 4 | 4100 | 12800 | −196 | | 12604 | | |
| | | | | | | | 0 | | 12800 | |
| | | | | | | | +196 | | | 12996 |

In Table 6 through Table 9, various combinations can be selected for. the first and the second modular roof members 4a and 5a with respect to a given sheating width. In this event, as in the case of the first embodiment described above, the light collecting plate segments 48 is so selected that the number of rows is as large as possible to improve the efficiency of lighting.

The wider range of choice can be provided with the larger width of the shearing and the number of rows of the light collecting plate segments 48 can thus be increased. As a result, it becomes possible to increase a ratio of the lighting area to the execution area.

Further, attachment of the modular roof members 4a and 5a after maximum minus adjustment, the distance K between external end of the upper width adjusting portion 32 and the light collecting plate segment 48 becomes equal to 13 mm. As a result, the light collecting plate segments 48 will not be masked by the connecting members 22 and 23 and effective lighting can be achieved.

In addition, the width F of the lateral width adjusting portion 86 of the lateral connecting member body 84 is as same as the width of the lateral width adjusting portion 38 of the lateral lower connecting member 33, i.e., 31.5 mm and the riser wall 43 is 1.5 mm in thick. Accordingly, each of the plus adjusting width M and the minus adjusting width N at the verge portion is equal to 15 mm, so that the fine adjustment can be made as large as 30 mm in both plus and minus direction. When no fine adjustment is required at the lateral portions, the riser wall 43 of the verge member 6 is located, as shown in FIG. 31, at the central position of the lateral width adjusting portion 86. When the total finishing width is larger than the sheating width U, the riser wall 43 is slid towards the center of the lateral connecting member 23 to achieve the minus adjustment as shown in FIG. 35. Then the total finishing width is smaller than the shearing width U, the riser wall 43 is slid towards the external flange of the lateral connecting member 23 to achieve the plus adjustment as shown in FIG. 36.

It is noted that the size of the light collecting plate segment 48, the number of rows of the light collecting plate segments 48 on the modular roof member and the width of the width adjusting portions of the connecting members can be adequately modified and varied depending on the applications.

The width adjustment can more readily be made if one room of roof width is laid with two modular roof members using narrower light collecting plate segments 48 of 100 mm in dimension, in which one modular roof member is composed of eight light collecting plate segments laterally aligned and the other modular roof member is composed of nine light collecting plate segments aligned in the same direction.

Figure 37:
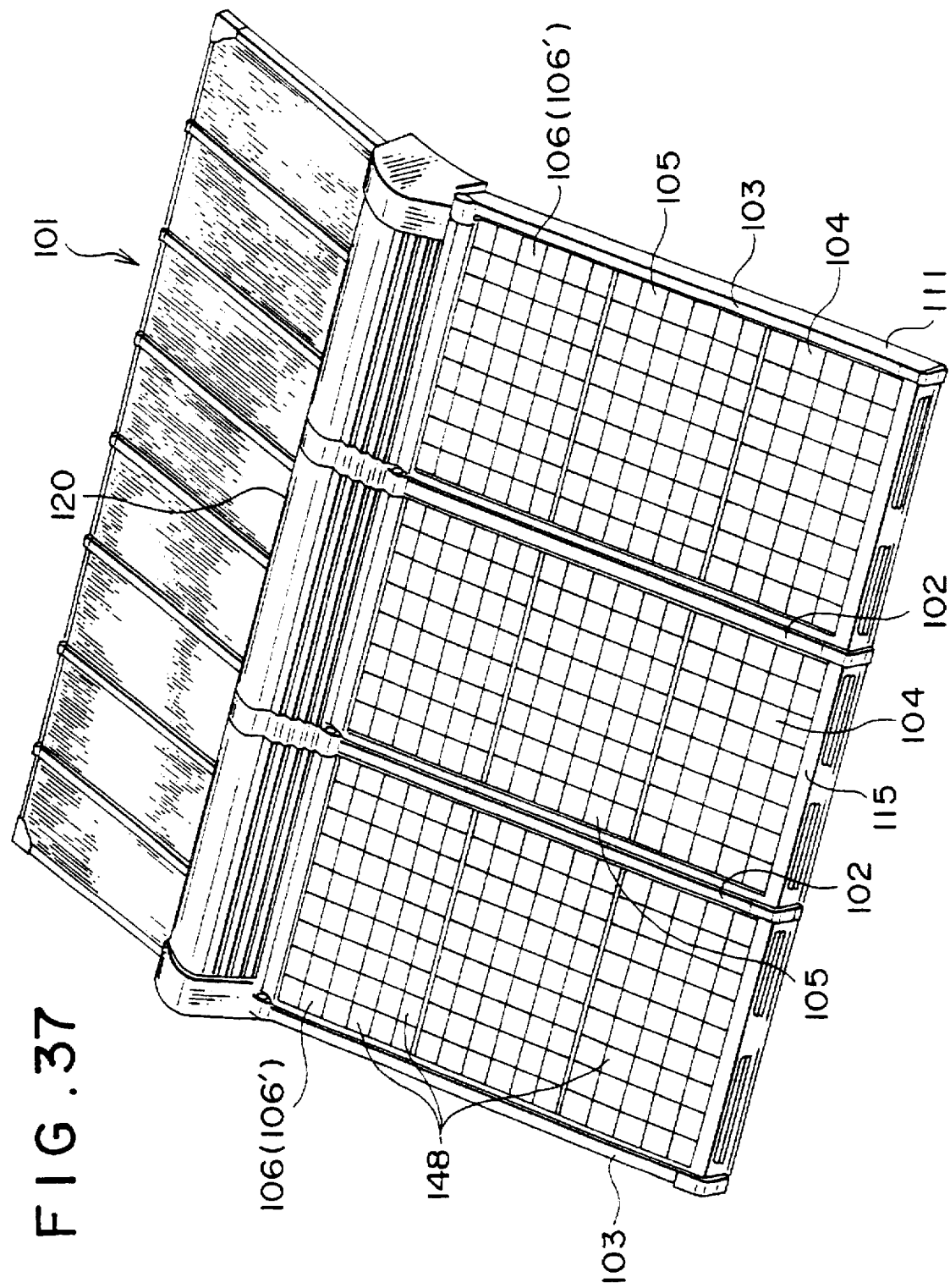
FIG. 37 is a perspective view of a roof system utilizing a solar cell according to a third embodiment of the present invention.

FIG. 37 shows a third embodiment of the present invention.

A roof system 101 utilizing a solar cell comprises a plurality of intermediate connecting members 102 arranged with being away from each other in the slope direction on the upper surface of the roof deck in, at least, one side beside the ridge line. A lateral connecting member 103 is arranged in parallel to the intermediate connecting members 102 at a position closer to the verge on the upper surface of the roof deck. A first modular roof member 104 and a second roof module member 105, serving as a roof membrane, are mounted on between the intermediate connecting members 102 and the lateral connecting member 103. A ridge roof member 108 or another ridge roof member 106' is laid at the position closest to the edge. An eaves's member 115 and an edge member 120 are mounted along the eaves and the ridge, respectively.

Figure 38:
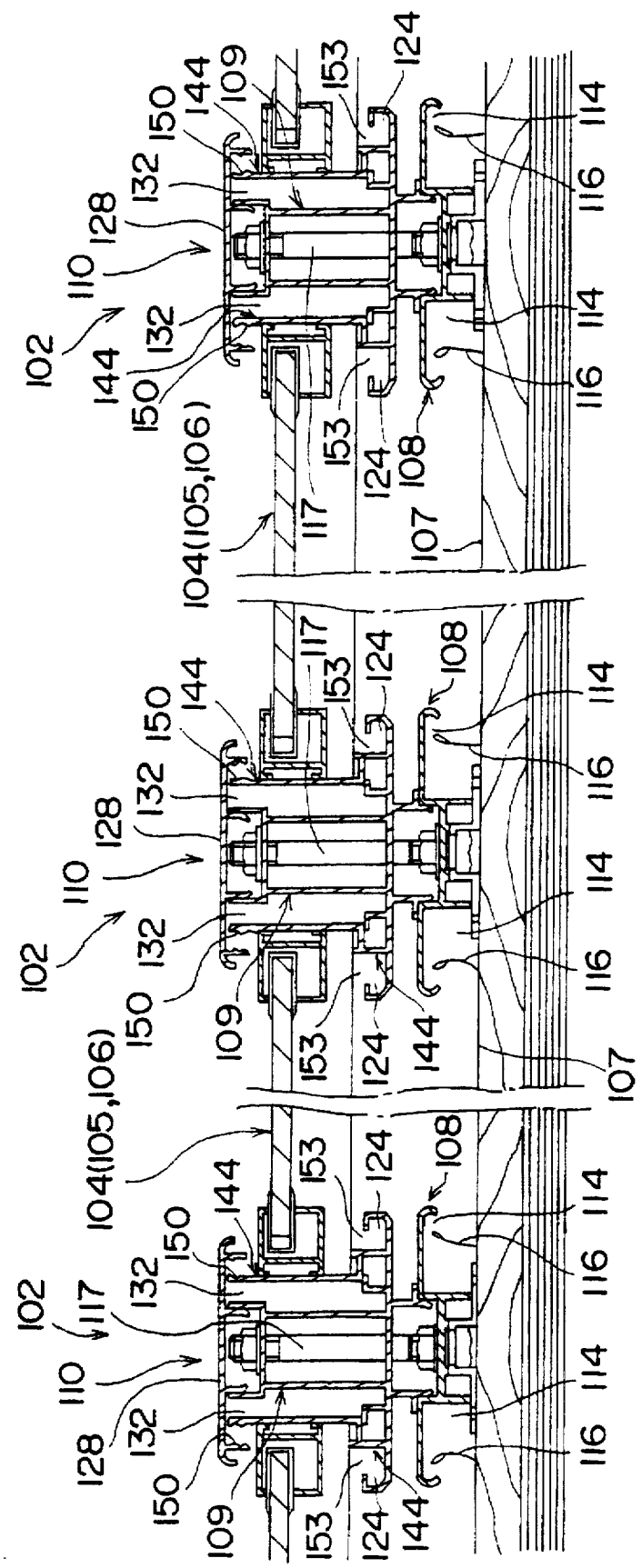
FIG. 38 is a transversal sectional view of a central portion of the roof system utilizing a solar cell according to the third embodiment of the present invention.
Figure 39:
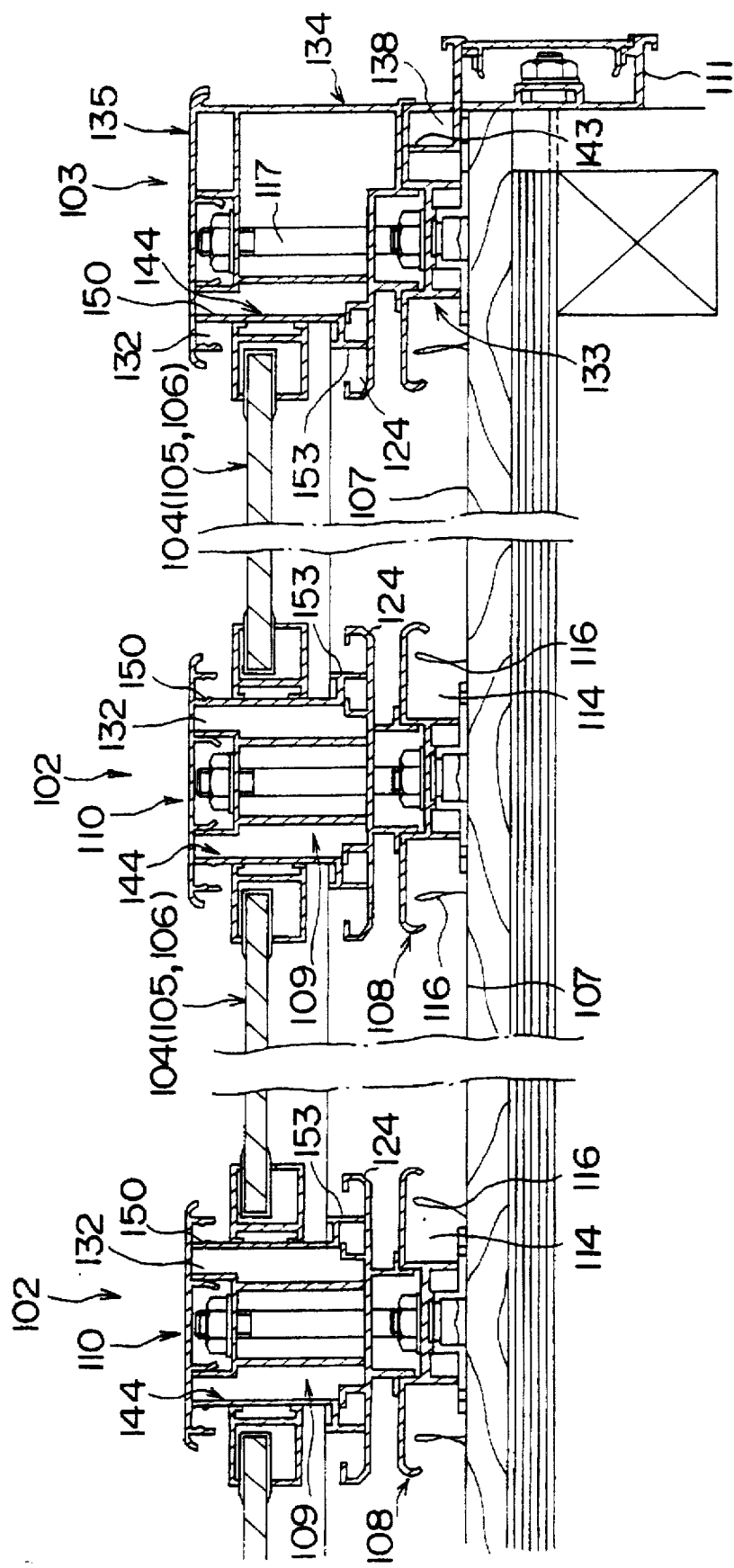
FIG. 39 is a transversal sectional view of a lateral portion of the roof system utilizing a solar cell according to the third embodiment of the present invention.

On the roof deck, as shown in FIGS. 38 and 39, a water-proof plate 107 is laid with being away from the modular roof members 104 and 105. The intermediate connecting member 102 comprises a lower connecting member 108, an upper connecting member 109 and a connecting member cover 110. The lower connecting member 108 is for connecting the water-proof plate 107. The upper connecting member 109 is for connecting the first and the second modular roof members 104 and 105 and the edge roof members 106, 106' in the roof lateral direction. The connecting member cover 110 covers the upper portion of the upper connecting member 109. A wide lower width adjusting portion 114 is formed along both edge of the lower connecting member 108. The lower width adjusting portion 114 is for engaging a water-proof wall 116 formed at the lateral edge of the water-proof plate 107. Connecting bolts 117 are disposed upward.

An intermediate width adjusting portion 124 is overhung at both edge of the lower portion of the upper connecting member 109. The intermediate width adjusting portion 124 has a wide groove-like shape and opened upward. The connecting member cover 110 is provided with an upper width adjusting portion 132 at both edge of the lower portion of a horizontal cap 128. The upper width adjusting portion 132 has a wide groove-like shape and opened downward.

For assembling the intermediate connecting member 102, the lower connecting member 108 is first secured to the roof deck along the slope direction. Subsequently, the upper connecting member 109 is longitudinally disposed on the upper surface of the lower connecting member 108. The connecting bolts 117 of the lower connecting member 108 is penetrated through the upper connecting member 109. Each nut of the corresponding connecting bolt 117 is tightened to fix the lower connecting member 108 to the upper connecting member 109. Finally the connecting member cover 110 is covered on the upper portion of the upper connecting member 109.

The lateral connecting member comprises, as shown in FIG. 39, a lateral lower connecting member 133, a lateral upper connecting member 134 and a lateral connecting member cover 135. The half of these members closer to the inner side of the roof is similar in structure to that of the lower connecting member 108, the upper connecting member 109 and the connecting member cover 110. Accordingly, similar components are represented by like reference numerals and description of such parts will be omitted.

A wide lateral width adjusting portion 138 opened downward is formed at the end of the lateral lower connecting member 133 at a position closer to the verge. A riser wall 143 is formed at the inner end of a verge member 111 and is inserted into the lateral width adjusting portion 138 of the lateral lower connecting member 133. The verge member 111 is attached at the external portion of the lateral connecting member 103.

Figure 40:
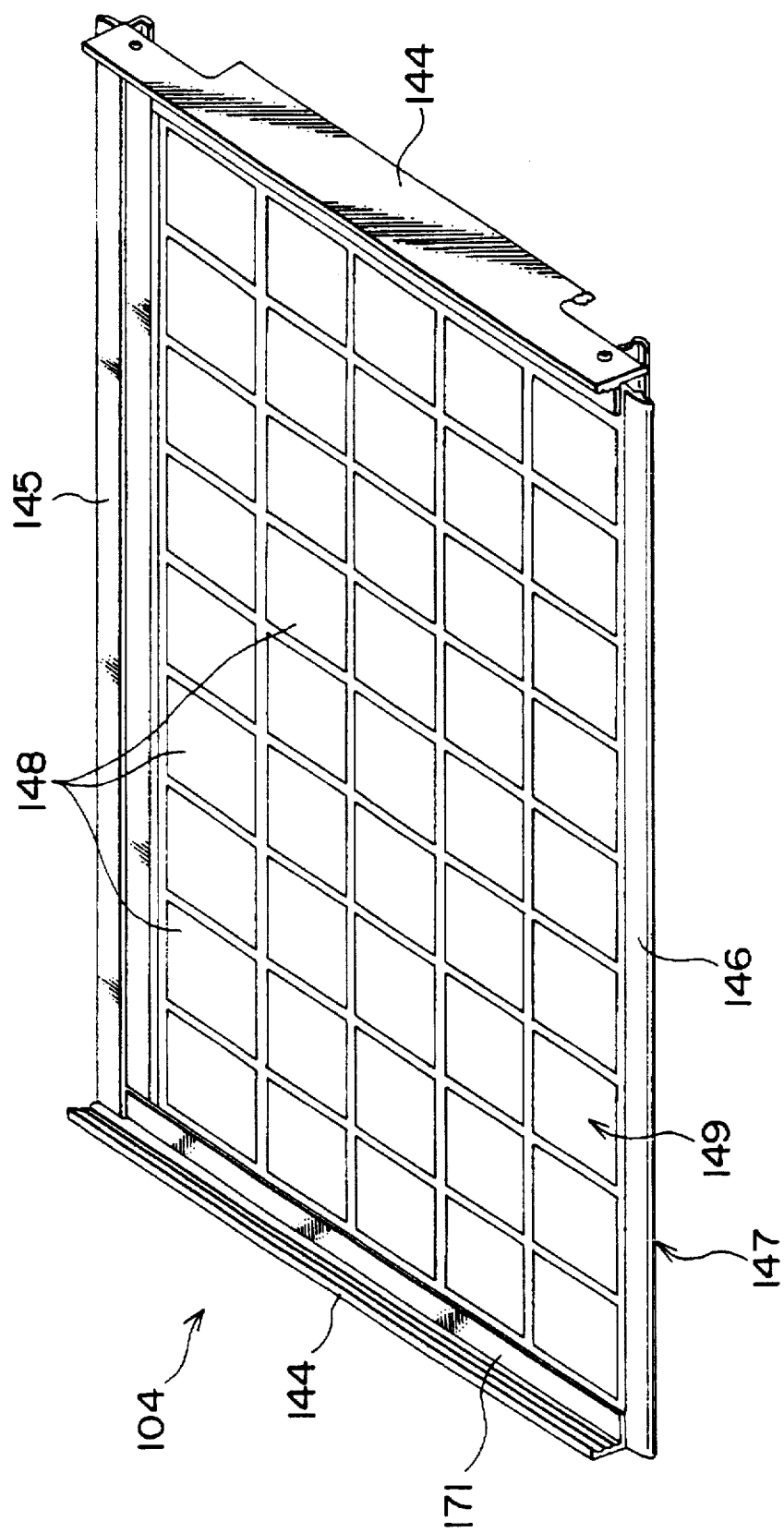
FIG. 40 is a perspective view of a first modular roof member according to the third embodiment of the present invention.

The first modular roof member 104 comprises, as shown in FIG. 40, end jambs 144 on both sides, head beam 145 and sill beam 146 assembled into a rectangular shape in plane. A supporting jamb 171 is mounted along the inner surface of the end jambs 144 to form a framework body 147. A first light collecting plate segment 148 of square shape having sides of 100 mm in each is formed with a transparent substrate and a solar cell built inside the substrate. The solar cell may be a polycrystalline silicone solar cell or the like and the light collecting plate segments 148 are arranged into a composite assembly 149 of nine rows and five columns. In other words, each row has nine light collecting plate segments 148 aligned in the roof lateral direction while each column has five light collecting plate segments 148 aligned in the slope direction perpendicular to the lateral direction.

The light collecting plate segments 148 are apart from each other at a connection distance of about 5 mm. Likewise, the framework body 147 is apart from the corresponding light collecting plate segment 148 at a connection distance of about 5 mm. In addition, the head beam 145 and the sill beam 146 are overlapped upon being laid on a width of about 20 mm is required for overlapping. Consequently, a valid length L in the slope direction of the first modular roof member 104 is approximately equal to 550 mm when considering the overlapped width of 20 mm.

Figure 41:
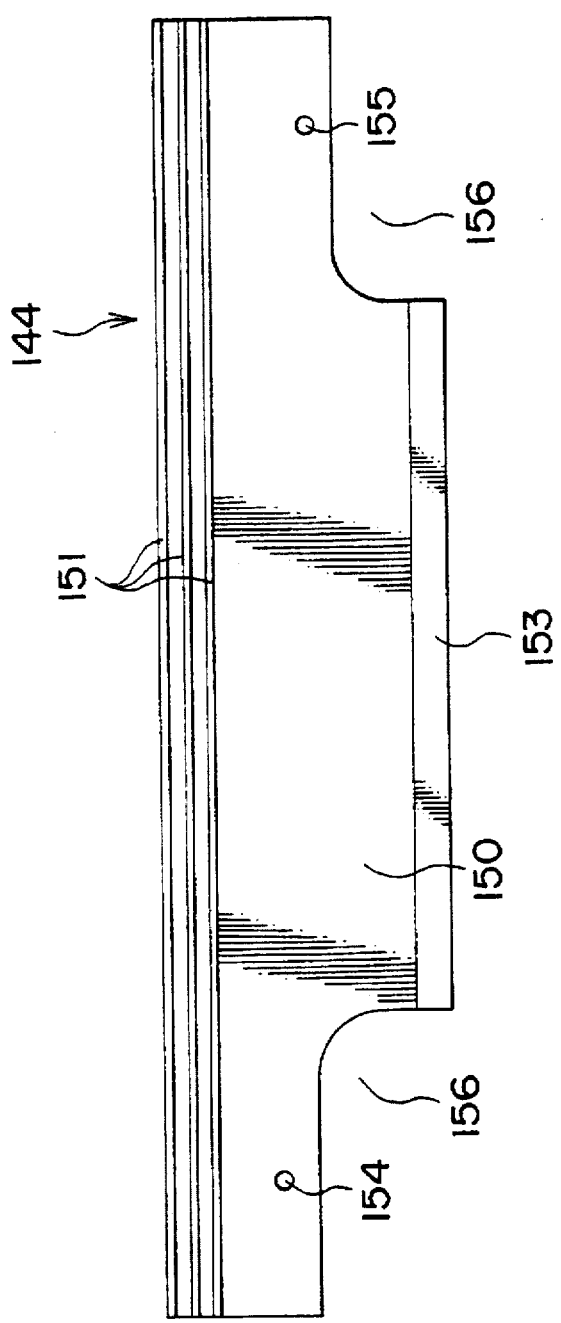
FIG. 41 is a side view of an end jamb.
Figure 42:
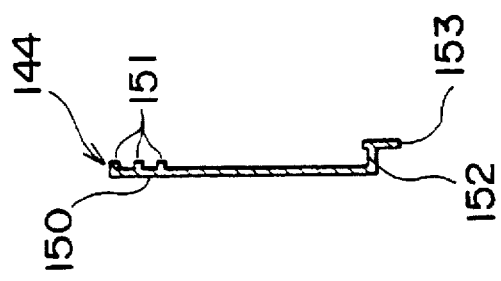
FIG. 42 is a sectional view of the end jamb.

Each end jamb 144 comprises, as shown in FIGS. 41 and 42, a vertical wall 150 provided with a plurality of flashing protrusions 151 longitudinally formed at the upper end of the inner surface thereof. The vertical wall 150 is also provided with a horizontal overhanging piece 152 at the lower end of the inner surface thereof.

In addition, the inner end of the horizontal overhanging piece 152 is provided with a vertical supporting leg 153 projected upward and downward.

In addition, a fitting bore 154 is formed in the end at a position closer to the eaves of the vertical wall 150. The other end of the vertical wall 150 at a position closer to the ridge is provided with a fitting bore 155 formed therein at a position slightly lower than that of the fitting bore 154. A ventilation notch 156 is formed in the lower end of the end portion of the vertical wall 150 and the vertical supporting leg 153 at a position closer to the eaves and the ridge.

Figure 43:
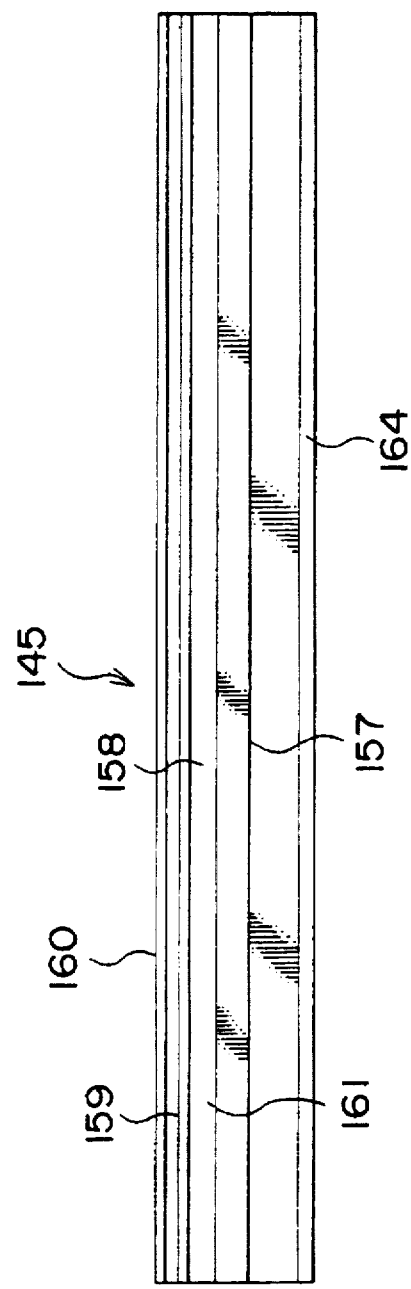
FIG. 43 is a side view of a head beam.
Figure 44:
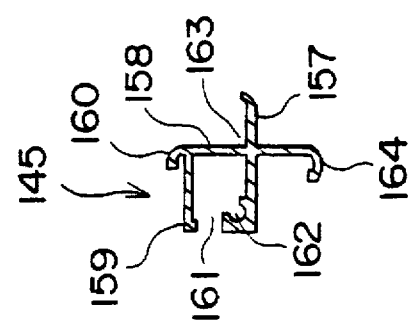
FIG. 44 is a sectional view of the head beam.

The head beam 145 comprises, as shown in FIGS. 43 and 44, a strip-shaped horizontal piece 157 extending in the direction orthogonal to the slope direction. An upright wall 158 is longitudinally disposed on the upper surface of the strip-shaped horizontal piece 157. A horizontal upper surface 159 is disposed on the upper portion of the upright wall 158 with being overhung towards the eaves in parallel to the horizontal piece 157. A flashing wall 160 is provided by means of bending the end of the horizontal upper surface 159 at a position closer to the ridge. A lighting plate supporting groove 161 is formed between the horizontal piece 157 and the horizontal upper surface 159. A hollow curved groove 162 is longitudinally formed in the end portion of the horizontal piece 157 at a position at a position closer to the eaves. A drain groove 163 is formed in the upper surface of the horizontal piece 157 at a position closer to the ridge. The lower surface of the horizontal piece 157 is downwardly extended and is bent towards the eaves and further bent upward to dispose a fixture engaging piece 164.

The sill beam 146 comprises, as shown in FIGS. 45 and 46, a lighting plate mounting piece 165 of a horizontal strip shape. The upper surface of the edge of the lighting plate mounting piece 165 at a position closer to the eaves is provided with a lighting plate abutting wall 166 having a thickness slightly smaller than that of the composite assembly 149. A covering piece 167 is projected in the eaves's direction from the upper end of the lighting plate abutting wall 166 to cover the upper portion of the horizontal upper surface 159 of the head beam 145. The ends of the covering piece 167 are curved downward and the lower surface thereof is provided with a flashing protrusions 168. An edge of the lighting plate mounting piece 165 at a position closer to the ridge is provided with a curved water-proof roof gutter 169 that is curved downwardly towards the eaves. A hollow curved groove 170 is formed in a connecting portion between the lighting plate mounting piece 65 and the curved water-proof roof gutter 169.

Figure 47:
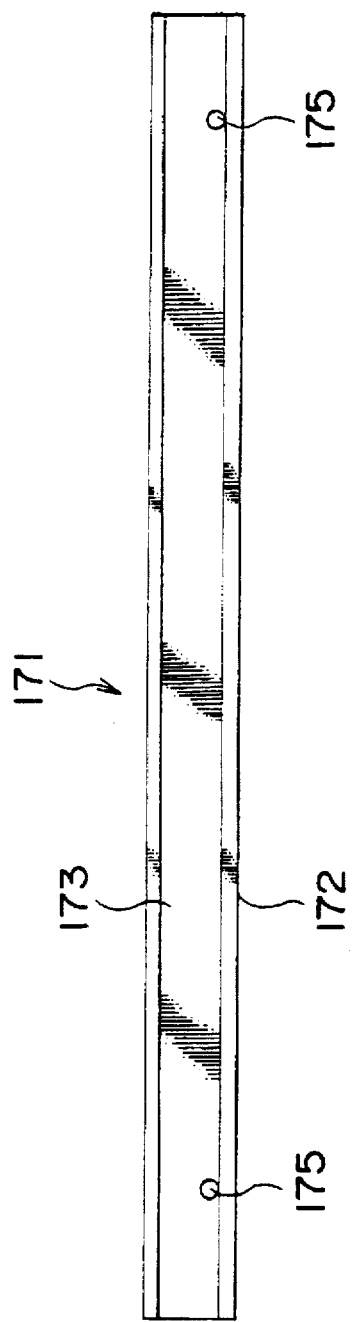
FIG. 47 is a side view of a composite assembly unit supporting jamb.
Figure 48:
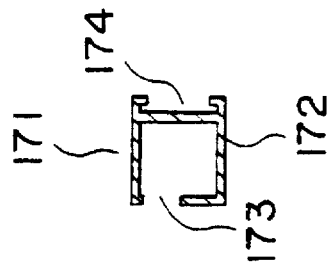
FIG. 48 is a sectional view of the composite assembly supporting jamb.
Figure 78:
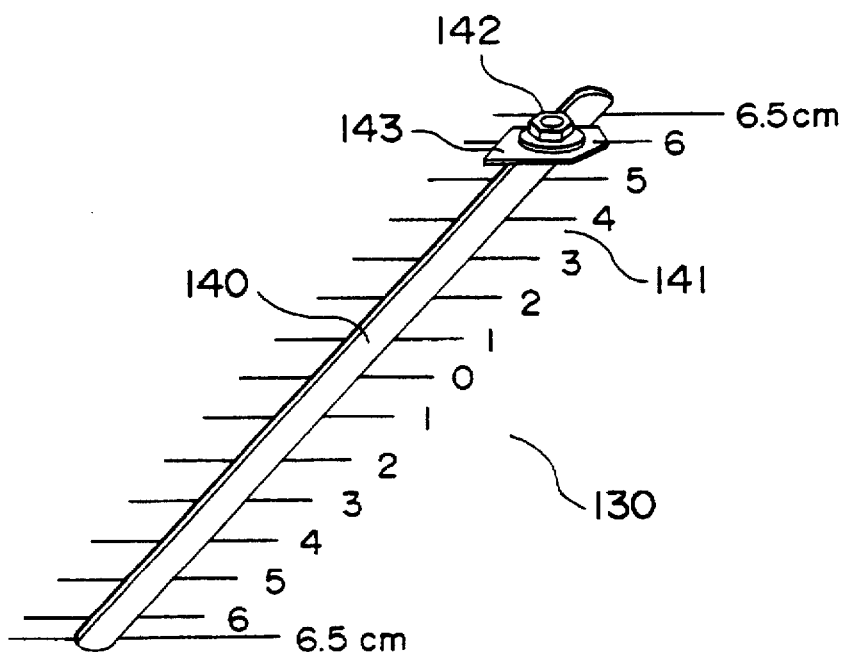
FIG. 78 is a perspective view of an essential part of a length adjusting piece, in which being illustrated is a state where an adjusted dimension is positive.

The supporting jamb 171 comprises, as shown in FIGS. 47 and 78, a hollow lighting plate insertion framework 172. A gap 173 is formed longitudinally in the upper portion of the inner wall of the lighting plate insertion framework 172. The composite assembly 149 is inserted into the gap 173. A concave groove 174 is formed in the outer surface of the lighting plate insertion framework 172 to avoid water from entering by capillary action. Fixing bores 175, 175 are formed in the respective ends, along the eaves/ridge direction, of the external wall of the lighting plate insertion framework 172. The fixing bores 175, 175 correspond to fitting bores 154, 155, respectively.

Figure 49:
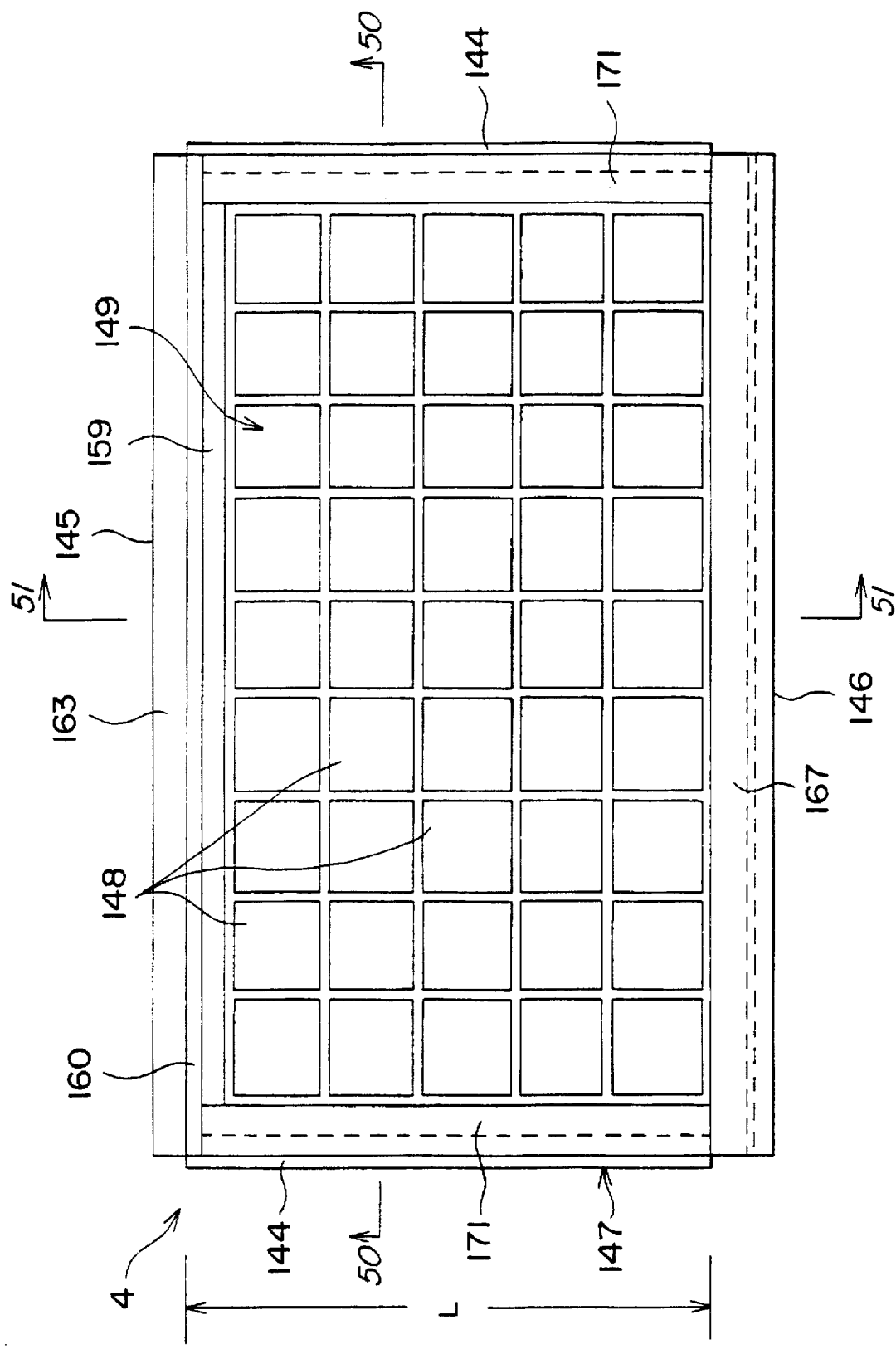
FIG. 49 is a plan view of the first modular roof member according to the third embodiment of the present invention.
Figure 50:
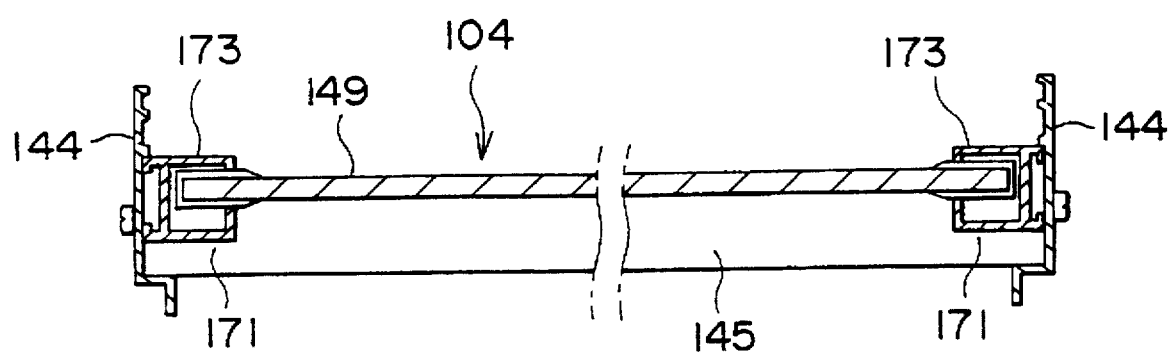
FIG. 50 is a sectional view taken on line b—b in FIG. 13.
Figure 51:
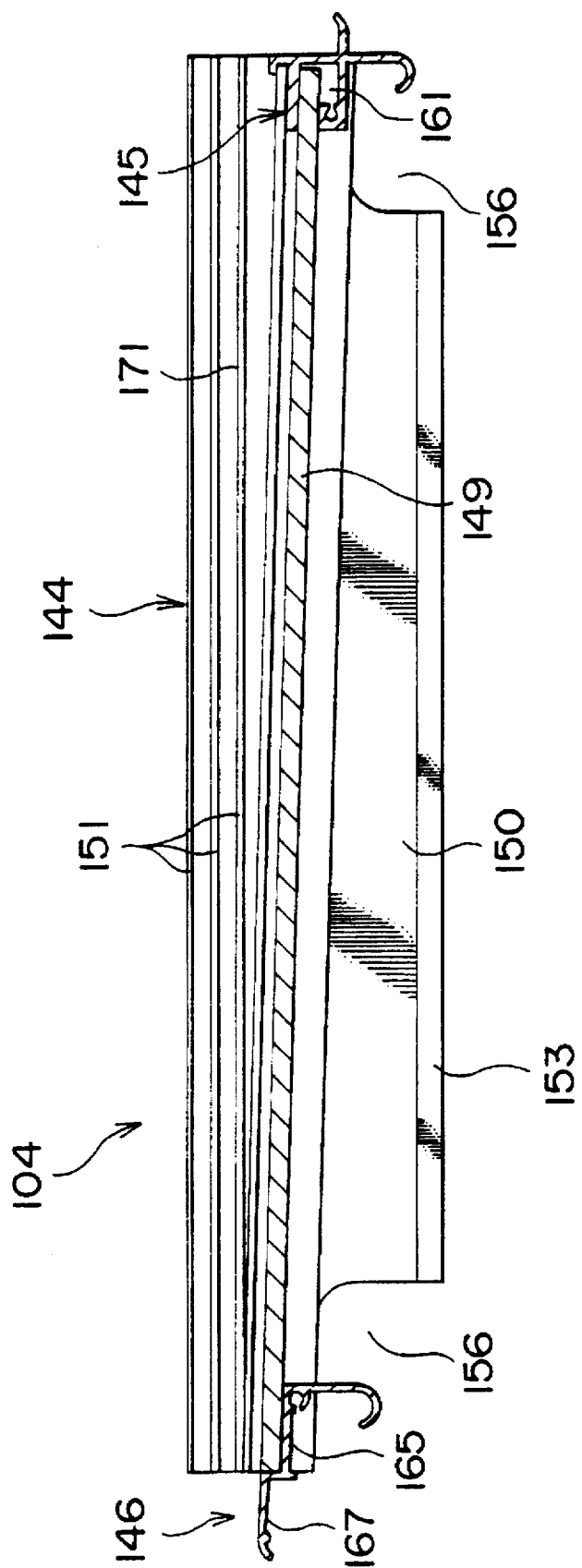
FIG. 51 is a sectional view taken on line a—a in FIG. 13.

Next, description is made in conjunction with a method of assembling the first modular roof member 104. As shown in FIGS. 49 through 51, the end portion of the composite assembly 149 at a position closer to the eaves is mounted on the upper surface of the transparent plate mounting piece 165 of the sill beam 146. The end of the composite assembly 149 at the closer position to the eaves is inserted into the lighting plate supporting groove 161 formed in the head beam 145. The ends of the composite assembly 149 at both sides are inserted into the lighting plate insertion framework 172 of the supporting jamb 171. The four sides of the composite assembly 149 are supported by the above mentioned beams through a packing in such a manner that the upper surface of the composite assembly 149 is located at a higher position than the covering piece 167 of the sill beam 146 at the end portion closer to the eaves.

In this state, the sill beam 146 is lowered than the upper surface of the composite assembly 149. This means that rainwater running on the composite assembly 149 is immediately drained towards the eaves and thus no dust and trash are trapped.

Subsequently, the outer surface of the supporting jamb 171 is abutted to the inner surface of the vertical wall 150 of the end jambs 144. The supporting jamb 171 is inclined or pitched to the end jambs 144 such that one end of the supporting jamb 171 at a position closer to the eaves is located at the higher position than the other end closer to the ridge. A screw 176 is inserted through the fitting bore 154 of the end jamb 144 at a position closer to the eaves, the fixing bore 175 of the supporting jamb 71 at a position closer to the eaves and the hollow curved groove 170 of the sill beam 146. A screw 177 is inserted through the fitting bore 155 of the end jamb 144 at a position closer to the ridge, the fixing bore 175 of the supporting jamb 171 at a position closer to the ridge and the hollow curved groove 162 of the head beam 145. In this way, the first modular roof member 104 can be assembled.

Figure 52:
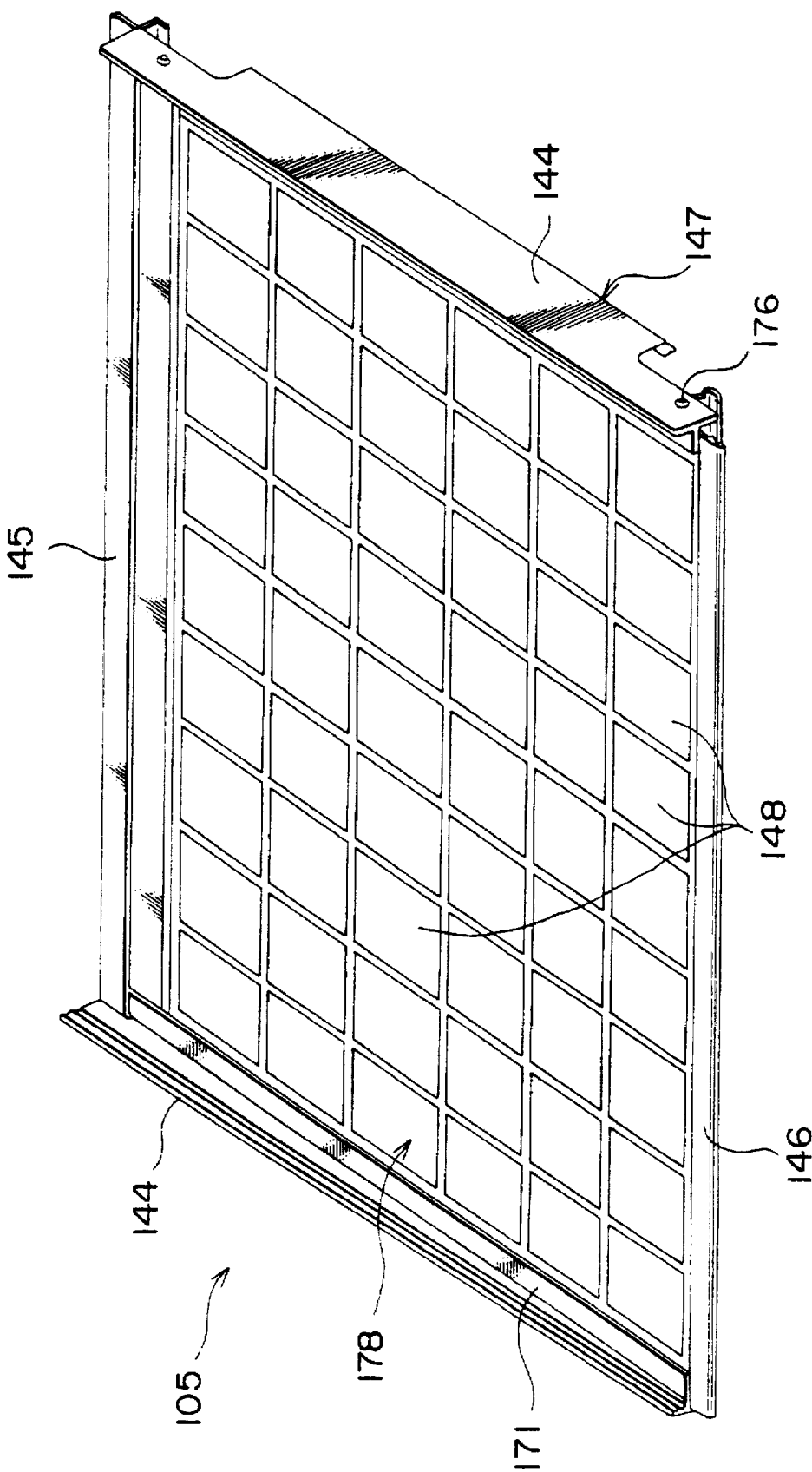
FIG. 52 is a perspective view of a second modular roof member according to the third embodiment of the present invention.
Figure 53:
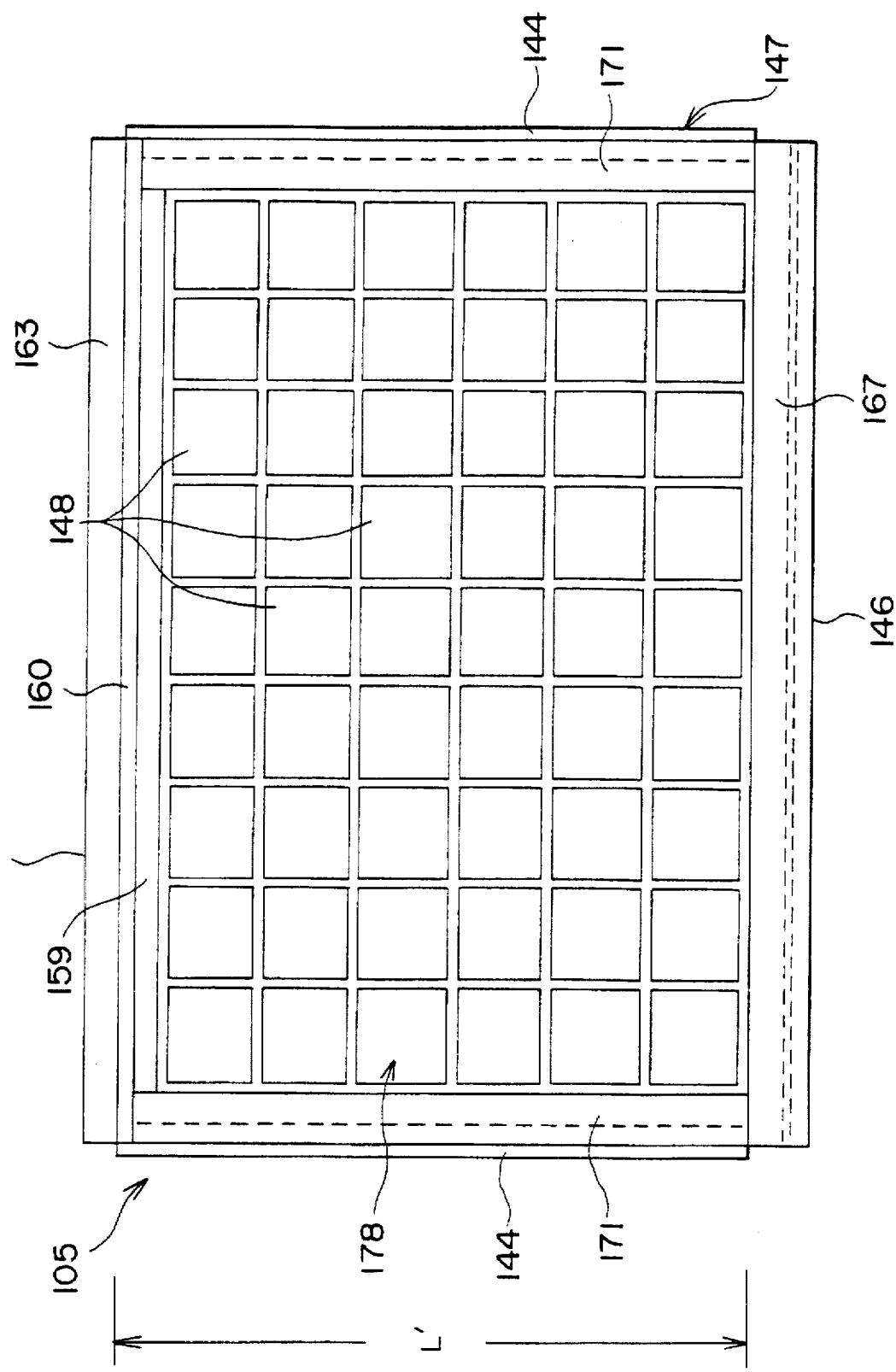
FIG. 53 is a plan view of the second modular roof member according to the third embodiment of the present invention.

The second modular roof member 105 is similar in structure to the first modular roof member 104 other than some exceptions. More particularly, the second modular roof member 105 comprises, as shown in FIGS. 52 and 53, a second light collecting plate segment 148 that is equal in size to the first light collecting plate segment 148 of the first modular roof member 104. The second light collecting plate segments 148 are arranged into a composite assembly 178 of nine rows and six columns. In other words, each row has nine light collecting plate segments 148 aligned in the roof lateral direction while each column has six light collecting plate segments 48 aligned in the slope direction perpendicular to the lateral direction. The composite assembly 178 is engaged in the inner periphery of the framework body 147. The valid length of the composite assembly 178 of the second modular roof member 105 is approximately equal to 655 mm. Other components and parts of the second modular roof member 105 is similar to those of the first modular roof member 104, so that similar components are denoted by like reference numerals and description thereof will be omitted.

Figure 54:
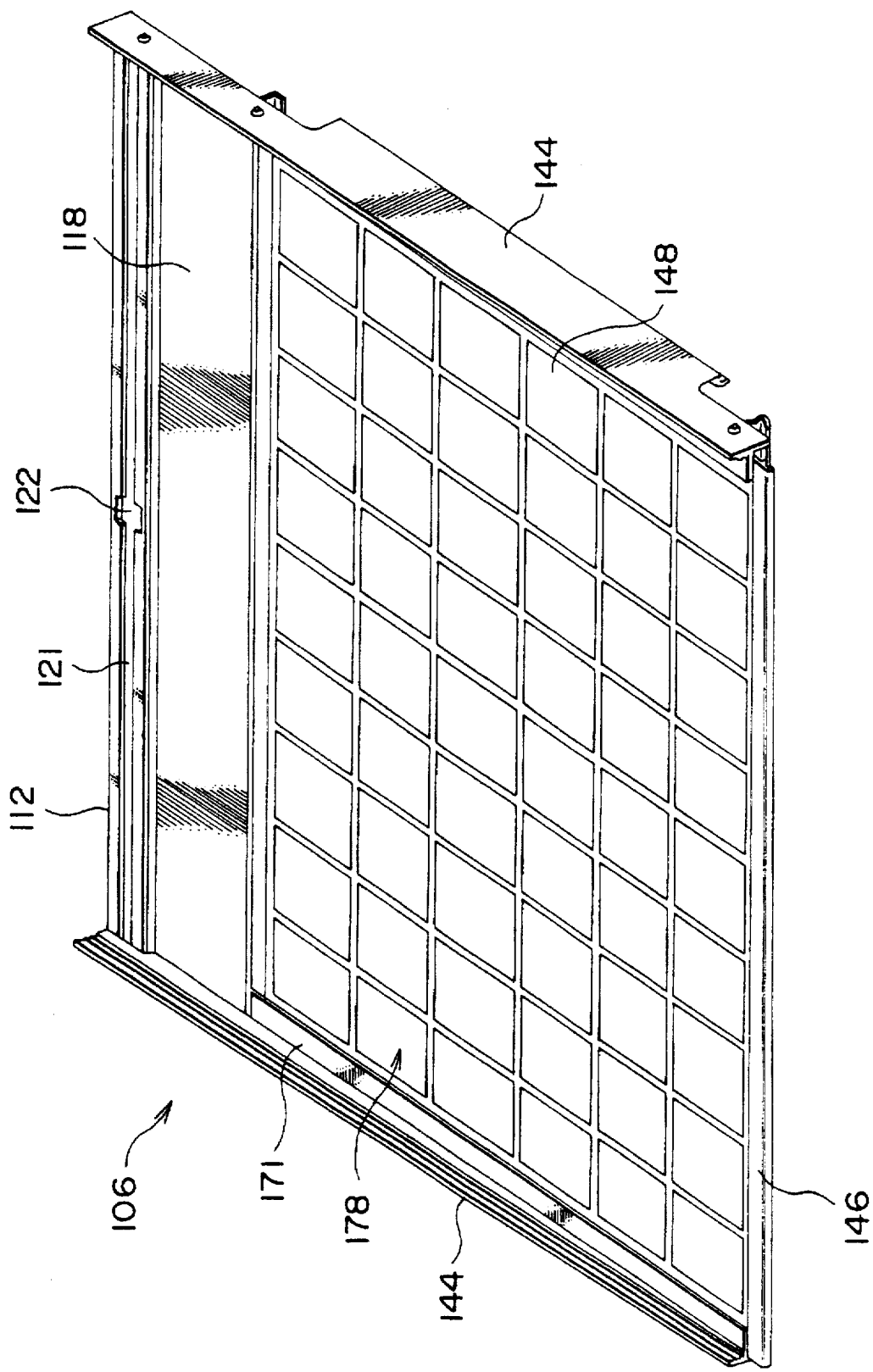
FIG. 54 is a perspective view of a roof member at a ridge portion according to the third embodiment of the present invention.
Figure 55:
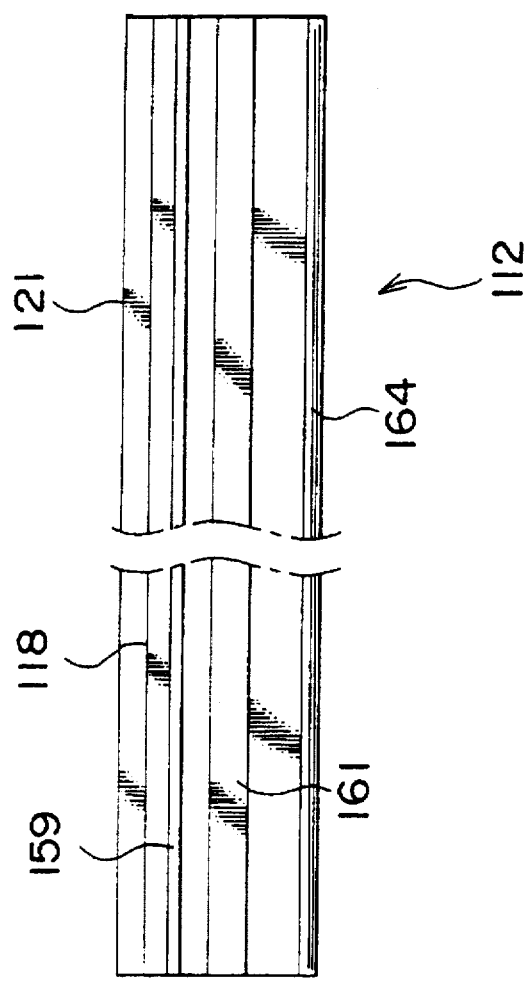
FIG. 55 is a side view of the head beam of the roof member at the ridge portion.
Figure 56:
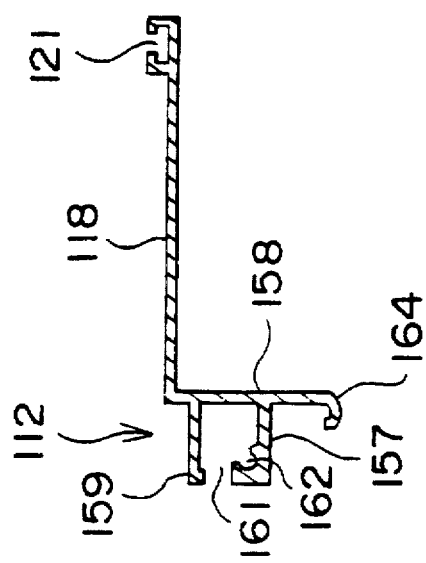
FIG. 56 is a sectional view of the head beam of the roof member at the ridge portion.
Figure 57:
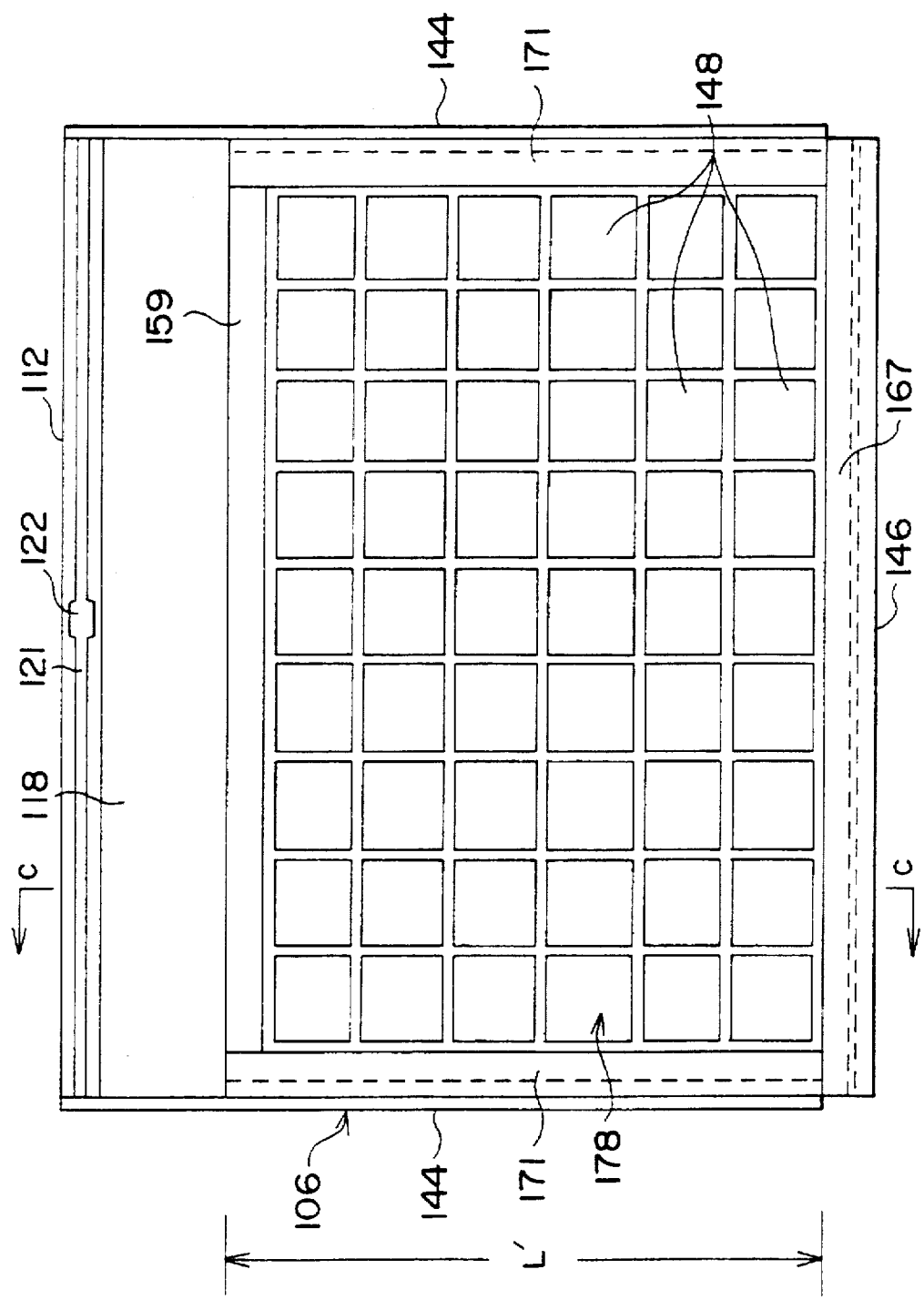
FIG. 57 is a plan view of the roof member at the ridge portion according to tile third embodiment of the present invention.
Figure 58:
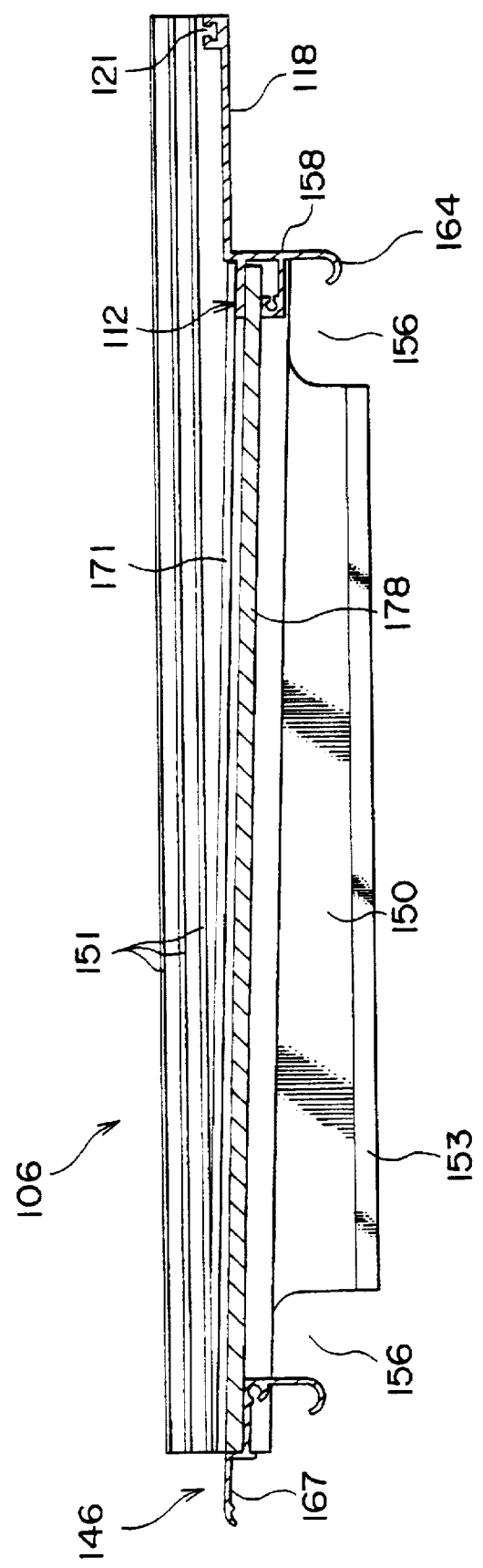
FIG. 58 is a sectional view taken on line c—c in FIG. 57.

The ridge roof member 106 comprises, as shown in FIG. 54, a third light collecting plate segment 148 that is equal in size to the first light collecting plate segment 148 of the first modular roof member 104. The third light collecting plate segments 148 are arranged into a composite assembly 178 of nine rows and six columns. The head beam 145 is replaced by a ridge beam 112 disposed along the edge of the composite assembly 178 at a position closer to the ridge. The ridge beam 112 is similar in structure to the head beam 145 except for the following. That is, as shown in FIGS. 55 and 58, a horizontal piece 157 is not projected from the riser wall 158 towards the ridge. The riser wall 158 is projected lightly upper the horizontal upper surface 159. A wide horizontal adjusting surface 118 is provided from the upper end of the riser wall 158 to the ridge. A bolt supporting groove 121 is formed in the top of the horizontal adjusting surface 118. The bolt supporting groove 121 is opened upward along the roof lateral direction and the opening portion thereof is smaller in width than the bottom portion. As shown in FIG. 57, a notch 122 is formed at a middle portion of the bolt supporting groove 121 to accept the head of the bolt. As shown in FIG. 58, the end surface of the supporting jamb 171 at a position closer to the ridge is abutted to the upper end portion of the riser wall 158 when the ridge roof member 106 is assembled.

Other components and parts of the ridge roof member 108 is similar to those of the second modular roof member 105. Such parts are dented by like reference numerals and description thereof will be omitted.

Figure 59:
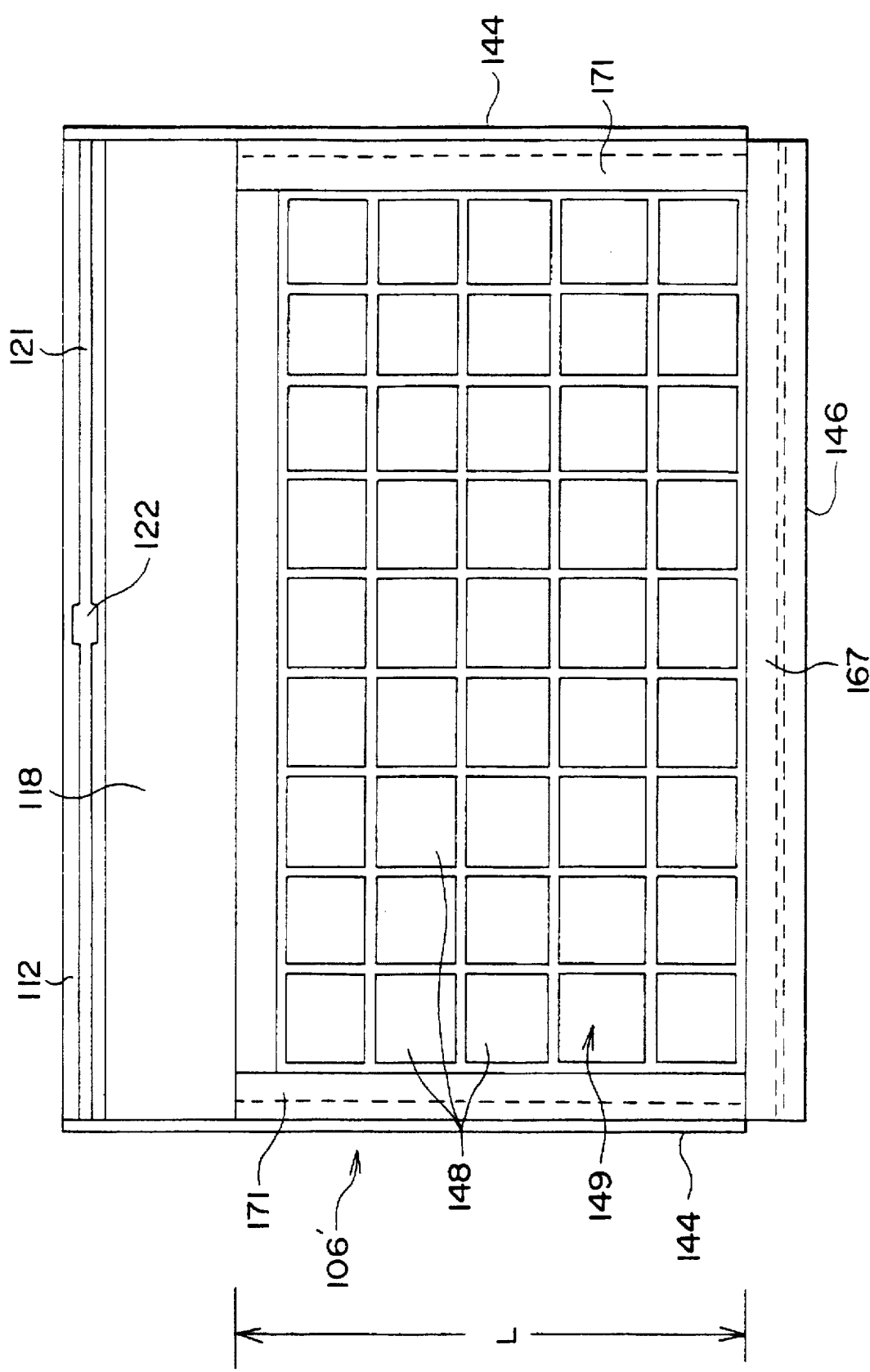
FIG. 59 is a plan view of another roof member at the ridge portion according to the third embodiment of the present invention.
Figure 60:
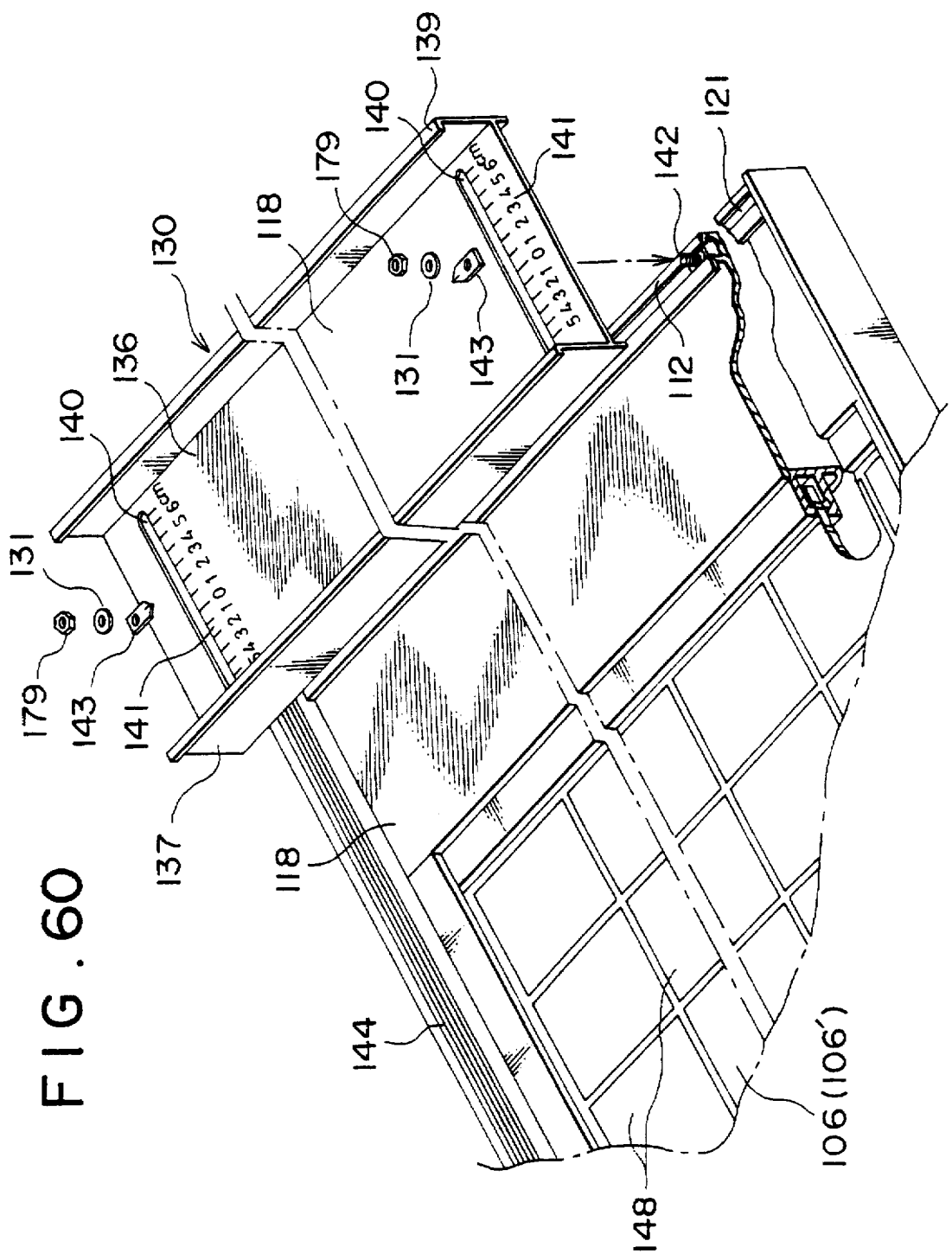
FIG. 60 is a perspective view of an essential portion of the roof member at the ridge portion.

The ridge roof member 106 and the other ridge roof member 106' are properly used depending on the length of the roof deck in the slope direction. The other ridge roof member 106' comprises, as shown in FIG. 59, a fourth light collecting plate segment 148 that is equal in size to the first light collecting plate segment 148 of the first modular roof member 104. The fourth light collecting plate segments 148 are arranged into a composite assembly 149 of nine rows and five columns. In other words, each row has nine light collecting plate segments 148 aligned in the roof lateral direction while each column has five light collecting plate segments 48 aligned in the slope direction perpendicular to the lateral direction. The slope directional length of the other ridge roof member 106' is smaller than that of the ridge roof member 106 by an amount equal to the size of one light collecting plate segment 148.

Figure 80:
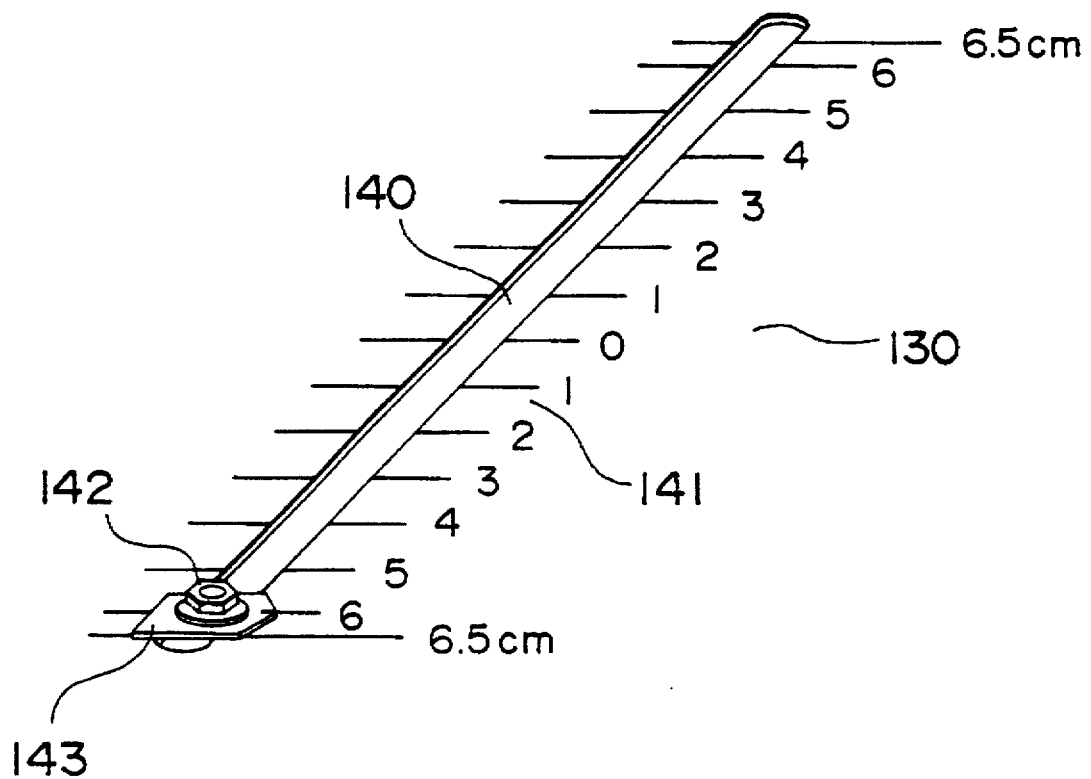
FIG. 80 is a perspective view of an essential part of a length adjusting piece, in which being illustrated is a state where an adjusted dimension is negative.

As shown in FIG. 80, a length adjusting piece 130 is slidable in the slope direction and is engaged with the upper surface of the horizontal adjusting surface 118 of each of the ridge roof members 106 and 106'.

The length adjusting piece 130 comprises a ridge door portion 137 upwardly disposed at the end of a horizontal slide surface 138 closer to the eaves. The horizontal slide surface 136 is approximately equal in width and in length to a horizontal adjusting surface 118. A flash portion 139 is upwardly disposed at the end of the horizontal slide surface 136 closer to the ridge. Elongated adjusting bores 140 extending along the slope direction are formed in both lateral sides of the horizontal slide surface 136. A scale 141 is applied on a side edge of each elongated adjusting bore 140. The scale is applied at an adequate distance from the center as a reference point or zero point.

For example, each of tile elongated adjusting bore 140 has a length of 65 mm in both sides from the central position along the slope direction and the scales are applied in correspondence with it.

For attaching the length adjusting piece 130 to the ridge roof members 106 and 106', the head of each of two bolts 142 is first inserted through the notch 122 formed in the bolt supporting groove 121 of the respective ridge roof members 106 and 106'. These bolts 142 are slid leftward and rightward and the bolts 142 are inserted through the corresponding elongated adjusting bores 140 to overlap the length adjusting piece 130 on the horizontal adjusting surface 118. An indication plate 143 and a washer 131 are passed through each bolt 142 and the tip of the indication plate 143 is set to an adequate scale 141. A nut 179 corresponding to each bolt is tightened to secure the length adjusting piece 130.

For laying the first and the second modular roof members 104 and 105, the lower connecting member 108 and the lateral lower connecting member 133 are first arranged on the roof deck with being away from each other along the slope direction. The water-proof plate 107 is laid on the upper surface of the roof deck and the water-proof wall 116 formed at the end of the water-proof plate 107 is contained in the lower width adjusting portion 114. The upper connecting member 109 and the lateral connecting member 134 are attached to the upper surface of the lower connecting member 108 and the lateral lower connecting member 133, respectively through the corresponding connecting bolt 117.

Subsequently, the first and the second modular roof members 104 and 105 are disposed on the upper portion of the water-proof plate 107. The lower end of the vertical supporting leg 153 of the end jamb 144 is inserted into the intermediate width adjusting portion 124 of the upper connecting member 109 and the lateral upper connecting member 134. The connecting member cover 110 and the lateral connecting member cover 135 are attached over the upper connecting member 109 and the lateral upper connecting member 134, respectively. The upper end of the vertical wall 150 of the end jamb 144 is inserted into the upper width adjusting portion 132.

Figure 61:
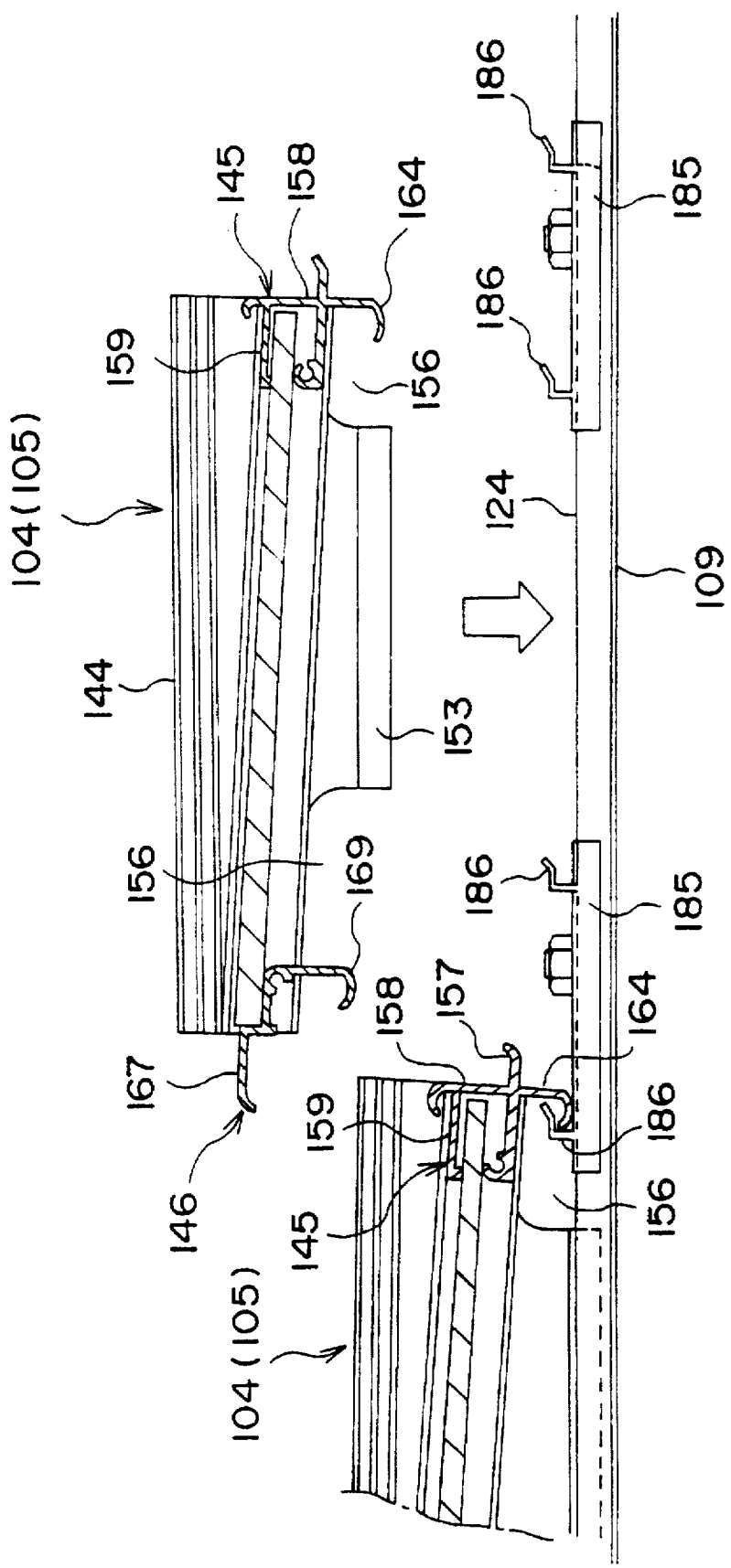
FIG. 61 is a sectional view showing a first step of laying a modular roof member.
Figure 62:
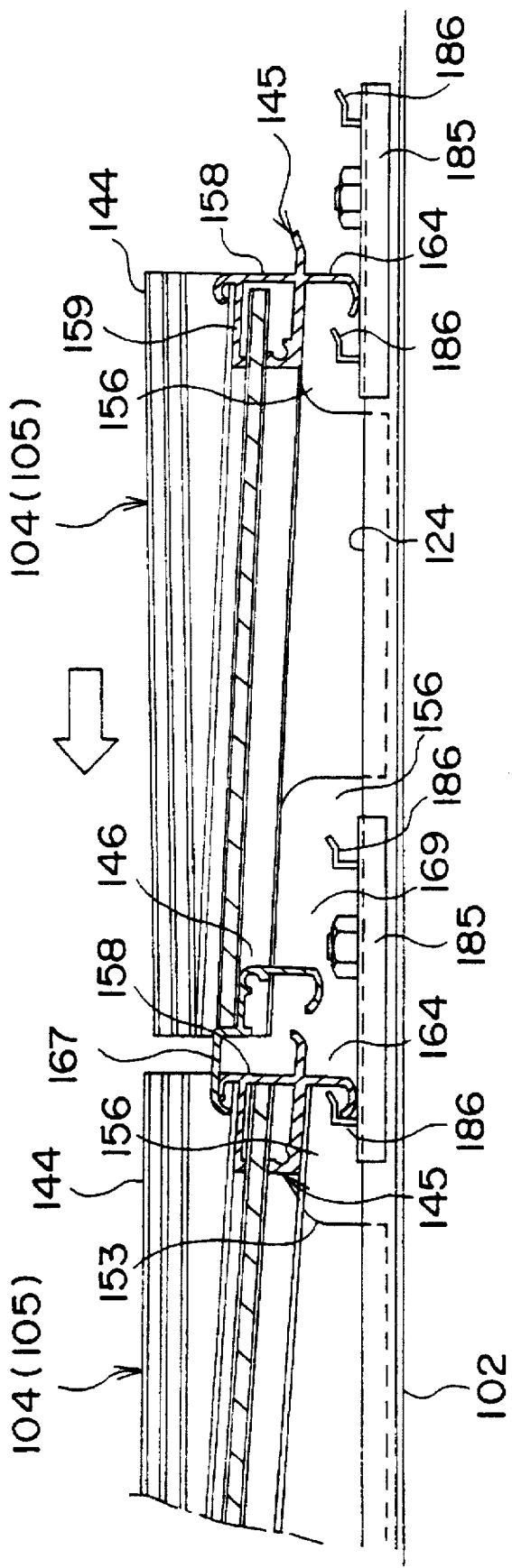
FIG. 62 is a sectional view showing a second step of laying the modular roof member.
Figure 63:
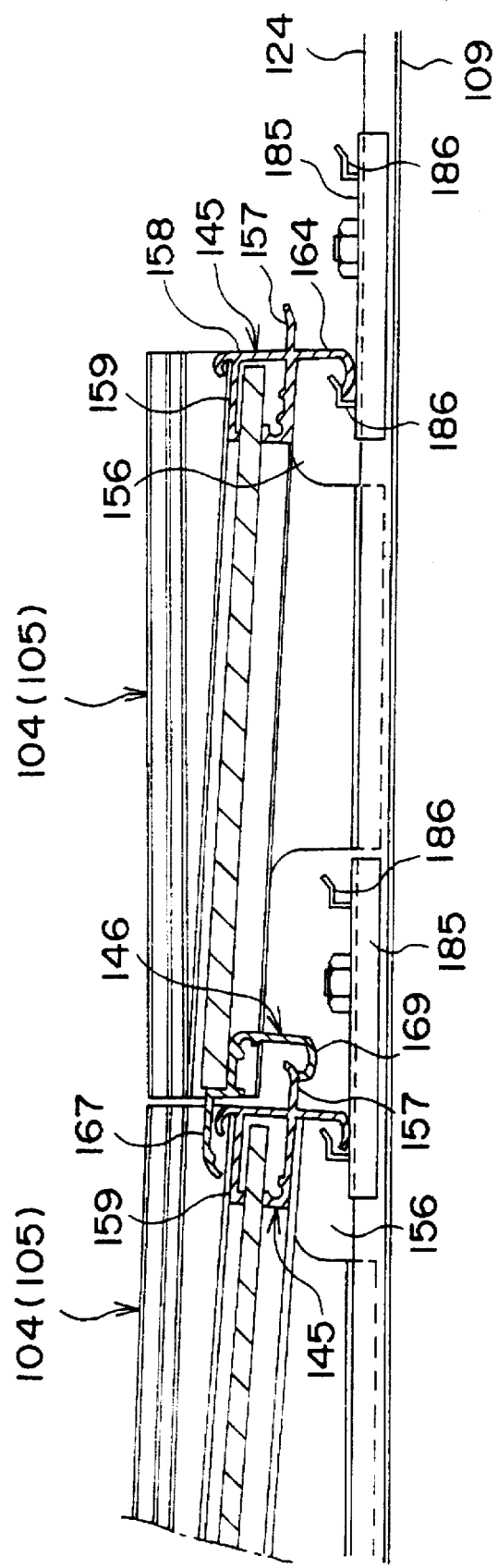
FIG. 63 is a sectional view showing a third step of laying the modular roof member.

Next, description is made in conjunction with an operation for connecting the first modular roof member 104 to the second modular roof member 105 along the slope direction. As shown in FIG. 61, a groove-shaped fitting 185 is stridden at the intermediate width adjusting portion 124 of the upper connecting member 109. The groove-shaped fitting 185 is opened downward and is provided with an engaging hook 186 of inverted L-shape at both longitudinal ends of the upper surface thereof. As shown in FIG. 62, the lower end of the vertical supporting leg 153 of each of the modular roof members 104 and 105 is inserted downward into the intermediate width adjusting portion 124 between lighting body fixture 185. The lower end of the fixture engaging piece 164 of the head beam is abutted to the upper surface of the fitting 185. A cover piece 167 of the sill beam 146 is covered on the riser wall 158 of each of the modular roof members 104 and 105 previously attached at the eaves's portion. Subsequently, the modular roof members 104 and 10 are slid towards the caves and the fixture engaging piece 164 of the head beam 145 is engaged with, as shown in FIG. 63, the engaging hook formed on the upper surface of the fitting 185. The horizontal upper surfaces 159 of the head beams 145 of the modular roof members 104 and 105 are covered with the cover pieces 167 of the sill beams 146. A curved water-proof roof gutter 169 of the sill beam 146 is engaged with the lower surface of the end portion, closer to the ridge, of the horizontal surface 157 of the head beam 145 of each of the modular roof members 104 and 105 located at a position closer to the eaves.

In this event, the fitting 185 is located within the ventilation notch 156 formed at the ends closer to the ridge and caves of each of the modular roof members 104 and 105.

Figure 64:
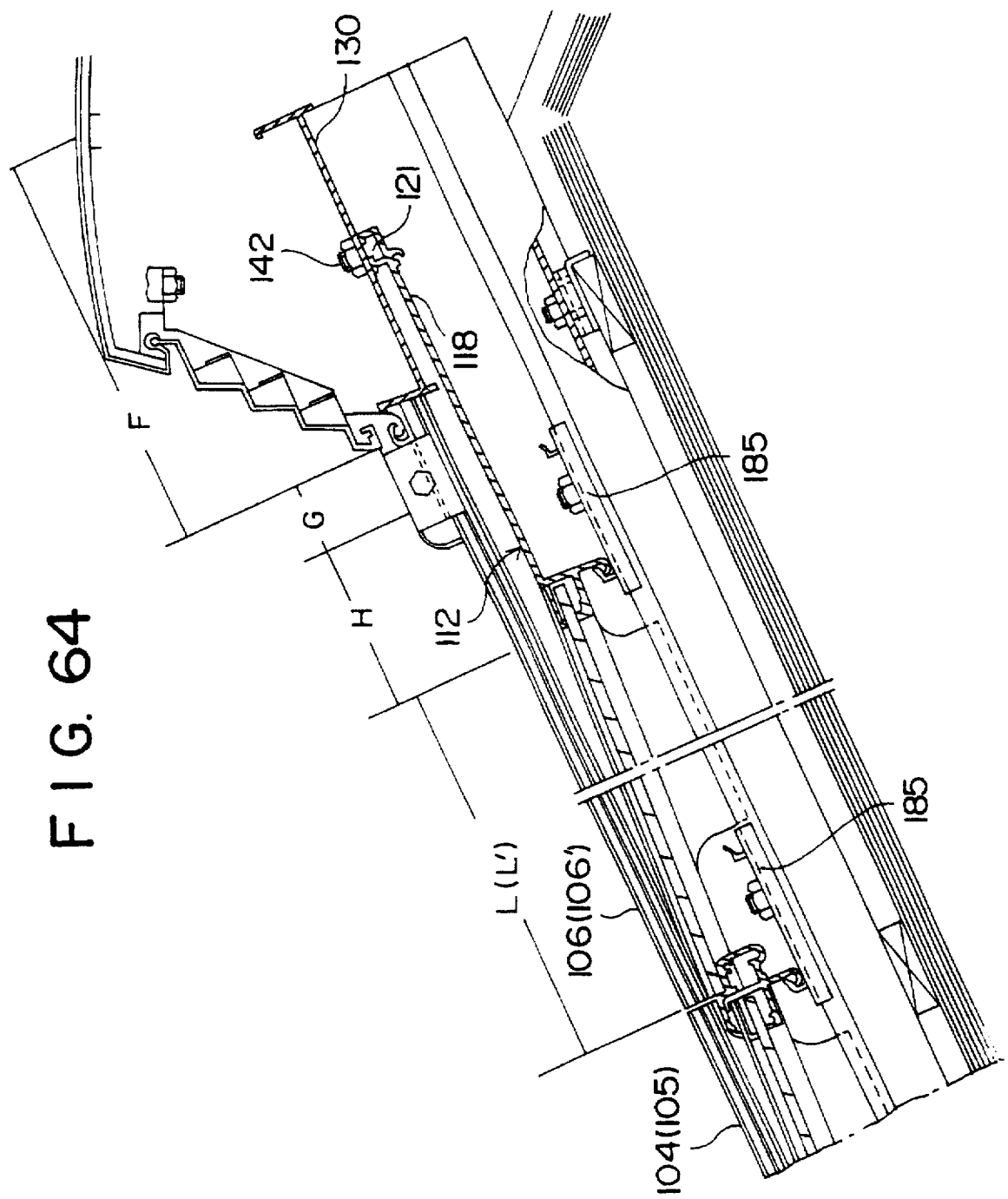
FIG. 64 is a sectional view of the ridge portion of the roof system utilizing a solar cell, in which being illustrated is a state where an adjusted dimension is equal to zero.
Figure 65:
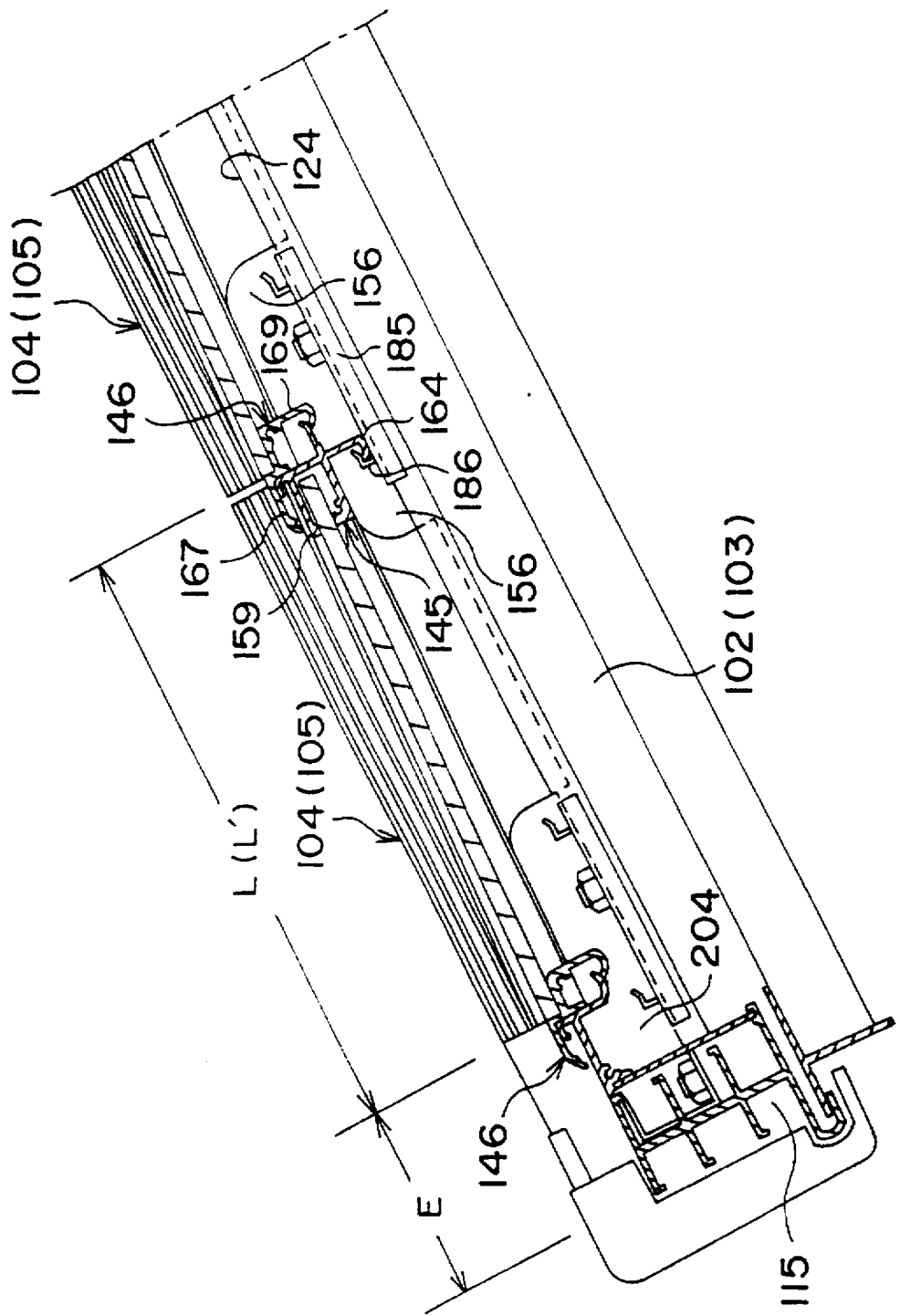
FIG. 65 is a sectional view of an eaves's portion of a roof with a solar energy collector.

Likewise, as shown in FIG. 64, the ridge roof members 106, 106' are laid and the upper surface of the length adjusting piece 130 attached at the end of the ridge roof members 106, 106' closer to the ridge is covered with the ridge member 120 of angled-shape in section. Subsequently, as shown in FIG. 65, the eaves's member 115 is mounted to the eaves's end of each of the modular roof members 104 and 105 laid at the closest position to the eaves.

Figure 66:
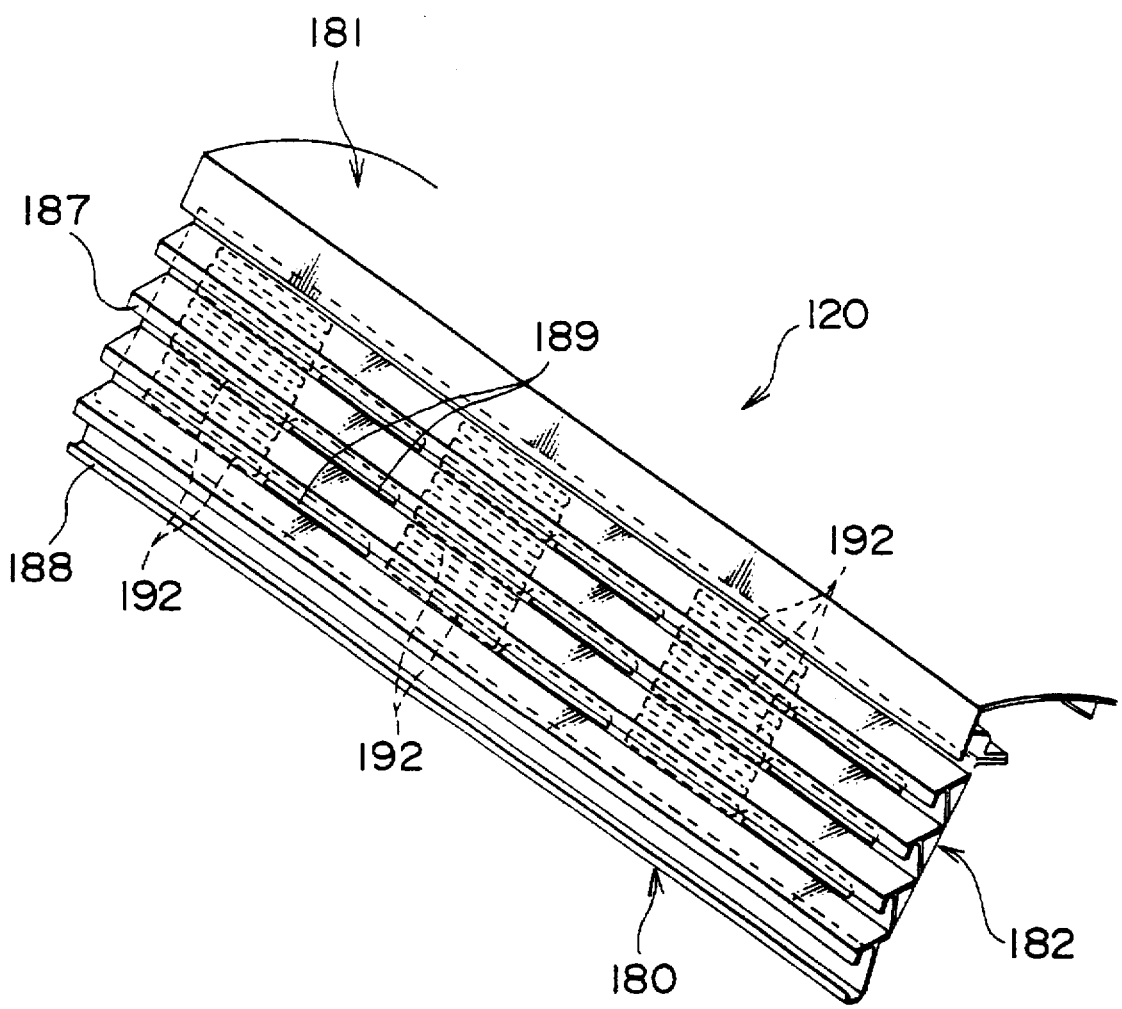
FIG. 66 is a perspective view of a ridge member.
Figure 67:
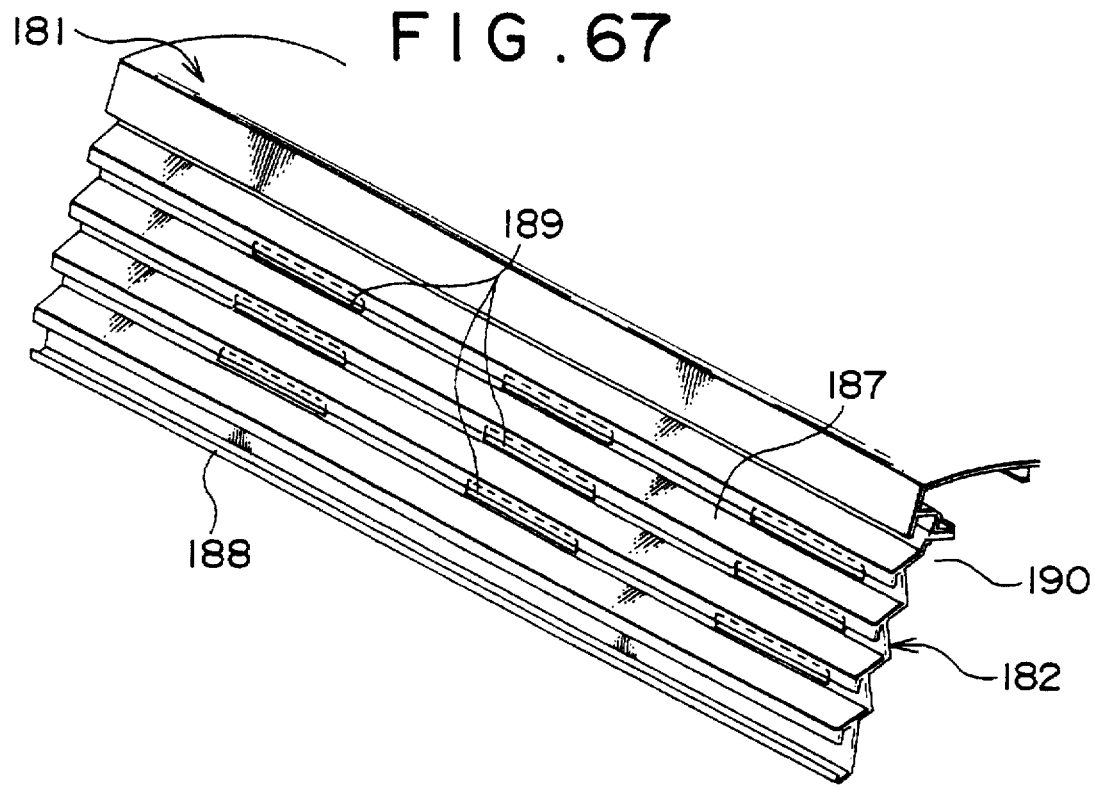
FIG. 67 is a perspective view showing a lateral member of the ridge portion and a ridge crest 181.

The ridge member 120 comprises, as shown in FIG. 66, a pair of ridge lateral members 180, a ridge crest 181 and a ridge water-proof plate 182. The ridge lateral members 180 are arranged in parallel to each other along a peak edge of the roof surface. As shown in FIG. 67, each of the ridge lateral members 180 comprises a stepwise body 187. The stepwise body 187 provided with alternatively a lateral overhanging surface and a rising surface. A ridge member fixing piece 188 is formed from the lower end of the stepwise body 187. More particularly, the lower end of the stepwise body 187 is bend outwardly and downwardly and in turn is bend outwardly upwardly. A plurality of ventilation bores 189 are formed in the rising surface.

The ridge crest 181 is laid across the upper end surfaces of the ridge lateral members 180. A ridge harness space 190 is formed at the lower portion of the ridge crest 181.

Figure 68:
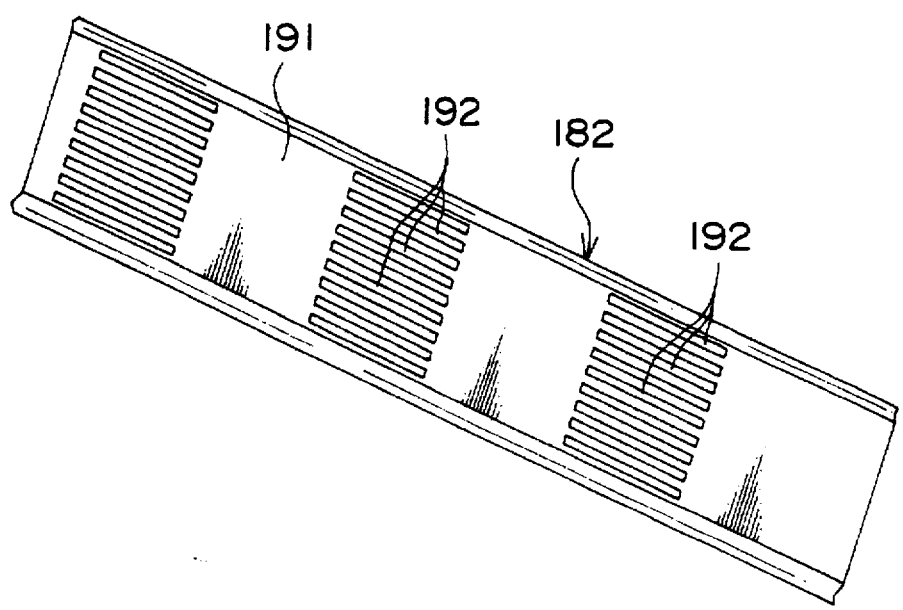
FIG. 68 is a perspective view of a ridge water-proof plate.

The ridge water-proof plate 182 is overlapped with the inside of the ridge lateral members 180. More particularly, as shown in FIG. 68, the ridge water-proof plate 182 comprises an overlapped plate 191 that is abutted to each internal angle of the stepwise body 187 of each of the ridge lateral members 180. A plurality of outlets 192 are formed in the overlapped plate 191. Each of the outlets 192 is formed in a position not being correspondent with any one of ventilation bores 189 of the ridge lateral members 180 in the longitudinal direction of the ridge. Thus, when the ridge water-proof plate 182 is overlapped with the back surface of the ridge lateral member 180, the outlet 192 and the ventilation bore 189 are shifted to each other to prevent direct entrance of rainwater.

Figure 69:
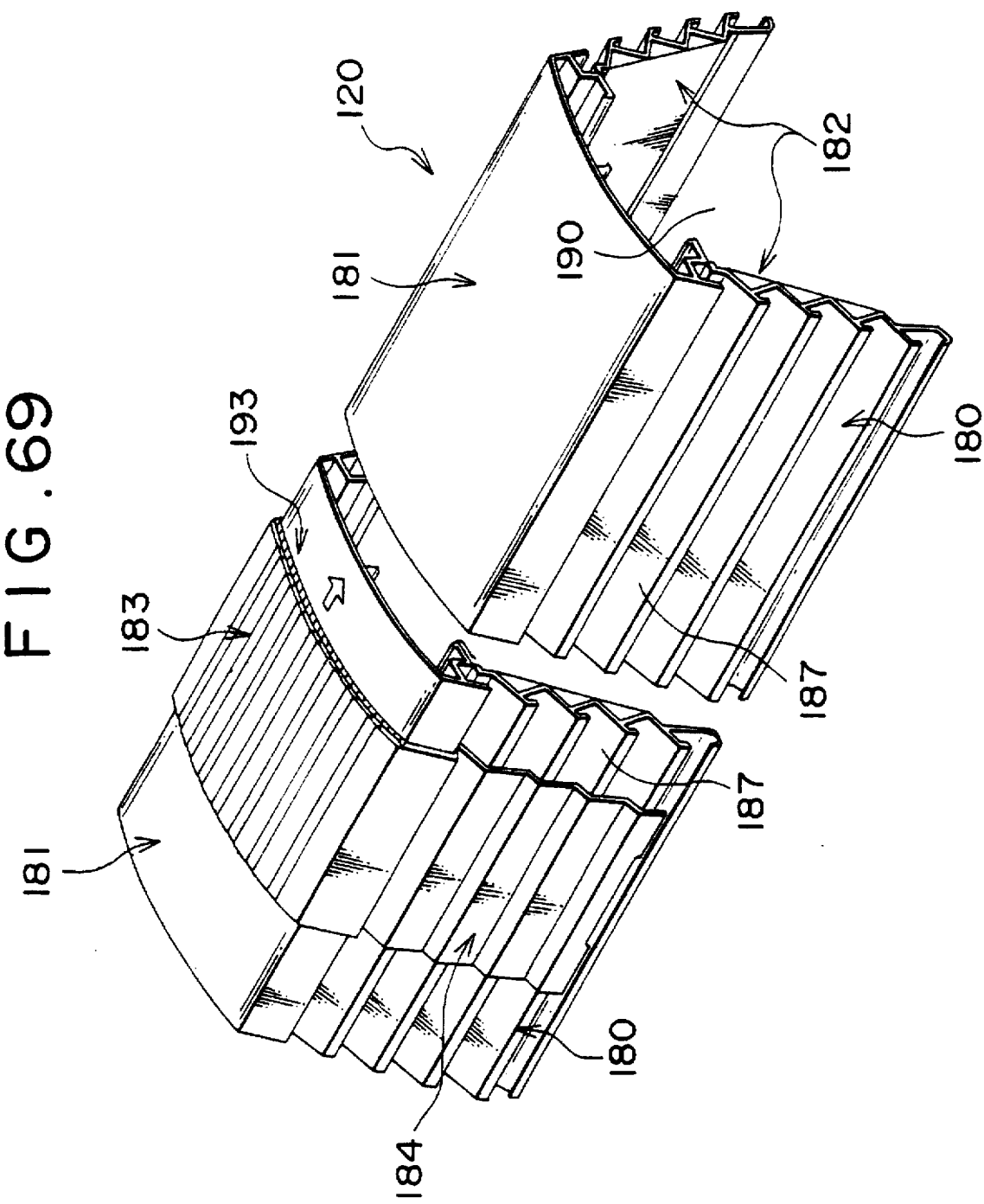
FIG. 69 is a perspective view of adjacent ridge members before being joined with each other.
Figure 70:
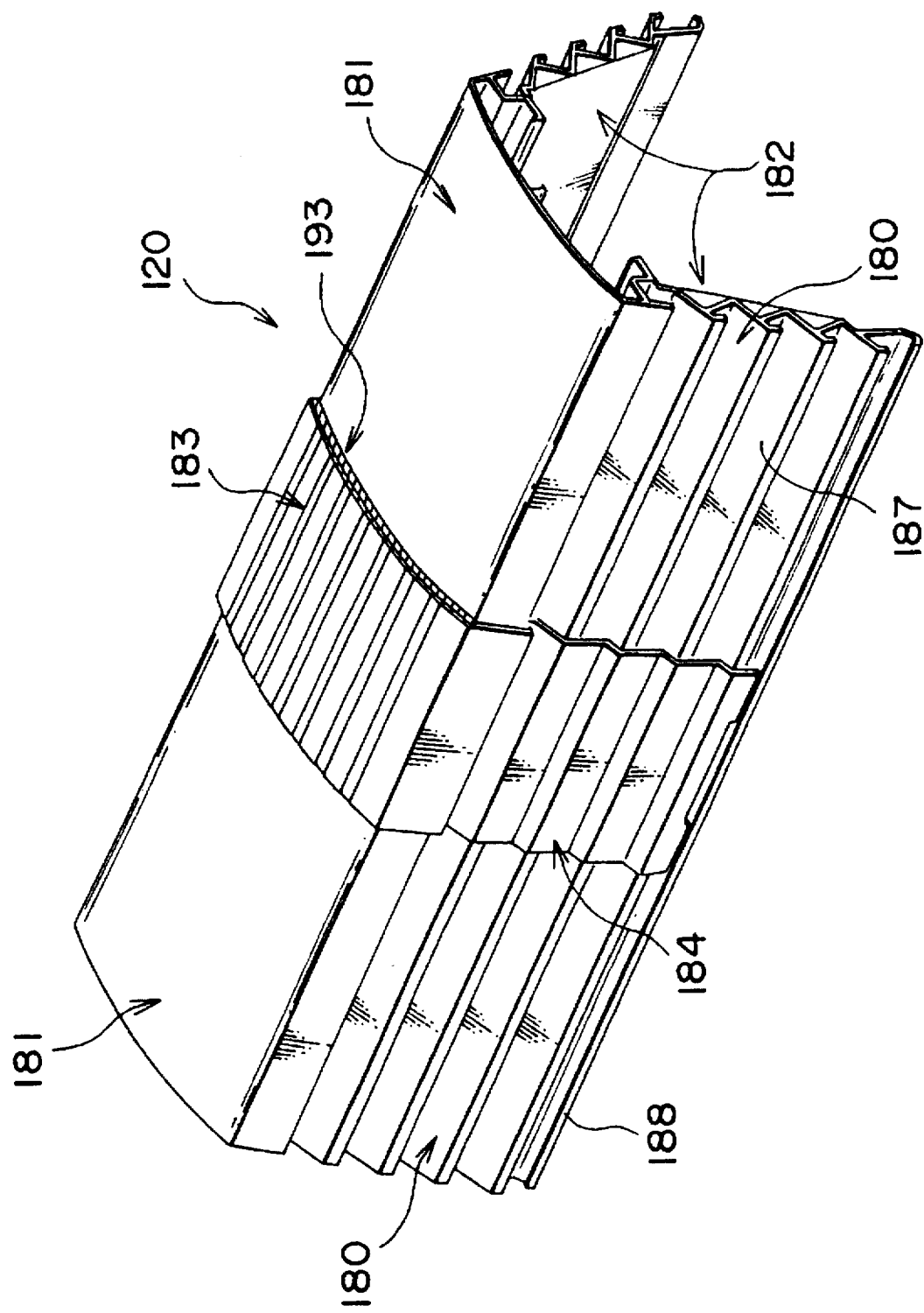
FIG. 70 is a perspective view of adjacent ridge members after being joined with each other.

In addition, as shown in FIG. 69, the adjacent ridge crests 181 are interconnected through a strip-like ridge crest connecting member 183 while the adjacent ridge lateral members 180 are interconnected through a ridge lateral connecting member 184. The ridge crest connecting member 183 covers the connecting portion of the ridge crests 181 along their external surface. A water-proof overlapped plate 193 made of rubber or synthetic resins is overlapped with the lower surface of the ridge crest connecting member 183. The ridge crest connecting member 183 is interfitted with the upper surface of the ridge crests 181 around the connecting end portions. The ridge lateral connecting member 184 is formed into a stepwise shape at an angle of approximately equal to the bending angle of the stepwise body 187 of the ridge lateral member 180. A combination of the ridge crests 181 and the ridge lateral members 180 to which the ridge crest connecting member 183 and the ridge lateral connecting member 184 are attached are aligned to another combination of the ridge crests 181 and the ridge lateral members 180 assembled in the same manner as described above. These combinations are so arranged that a slight distance or space is formed between the connecting end portions. The ridge crest connecting member 183 and the ridge lateral connecting member 184 are slid in the direction depicted by an arrow to cover the interconnected portion of the adjacent ridge members as shown in FIG. 70.

Figure 71:
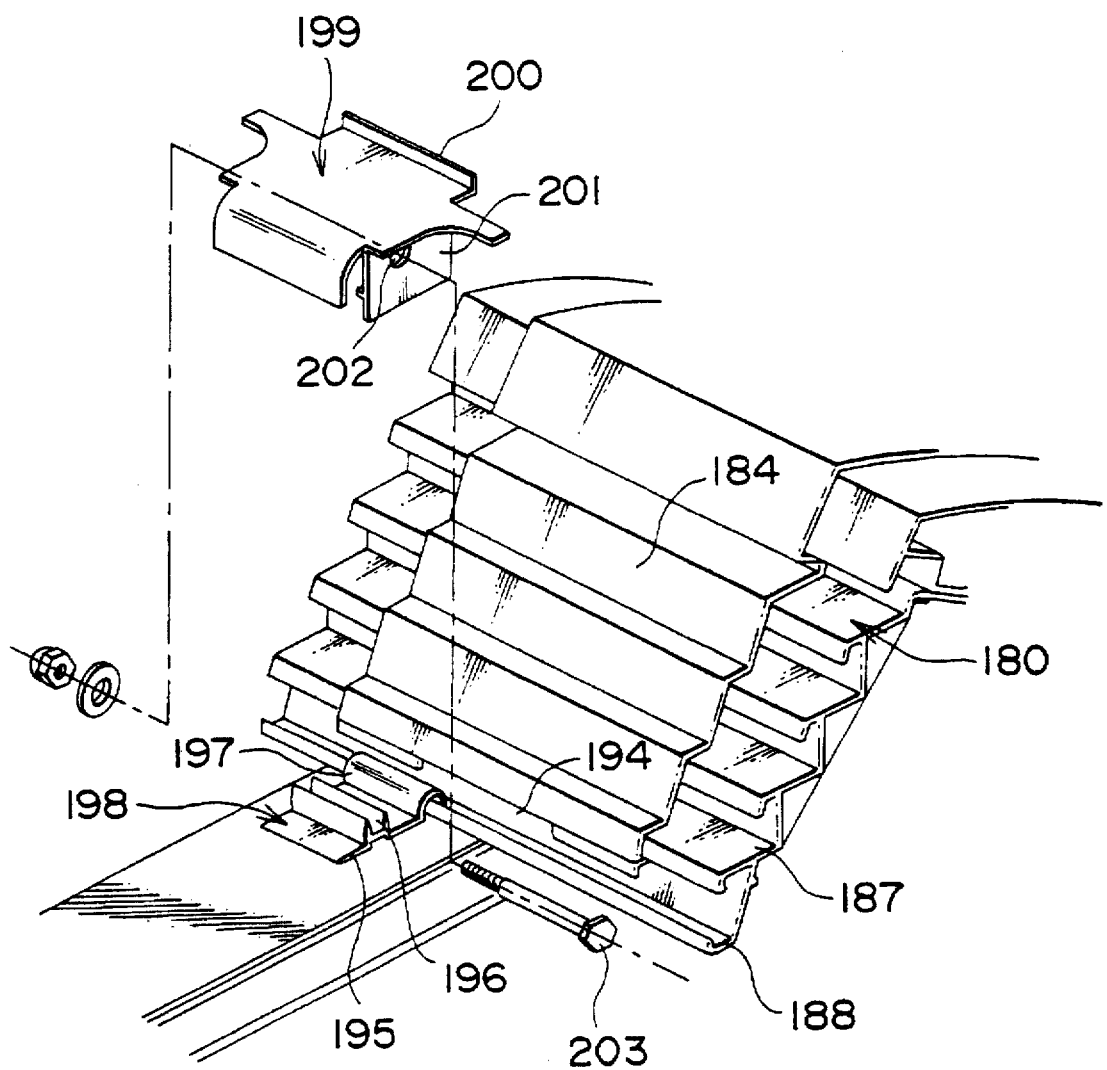
Figure 72:
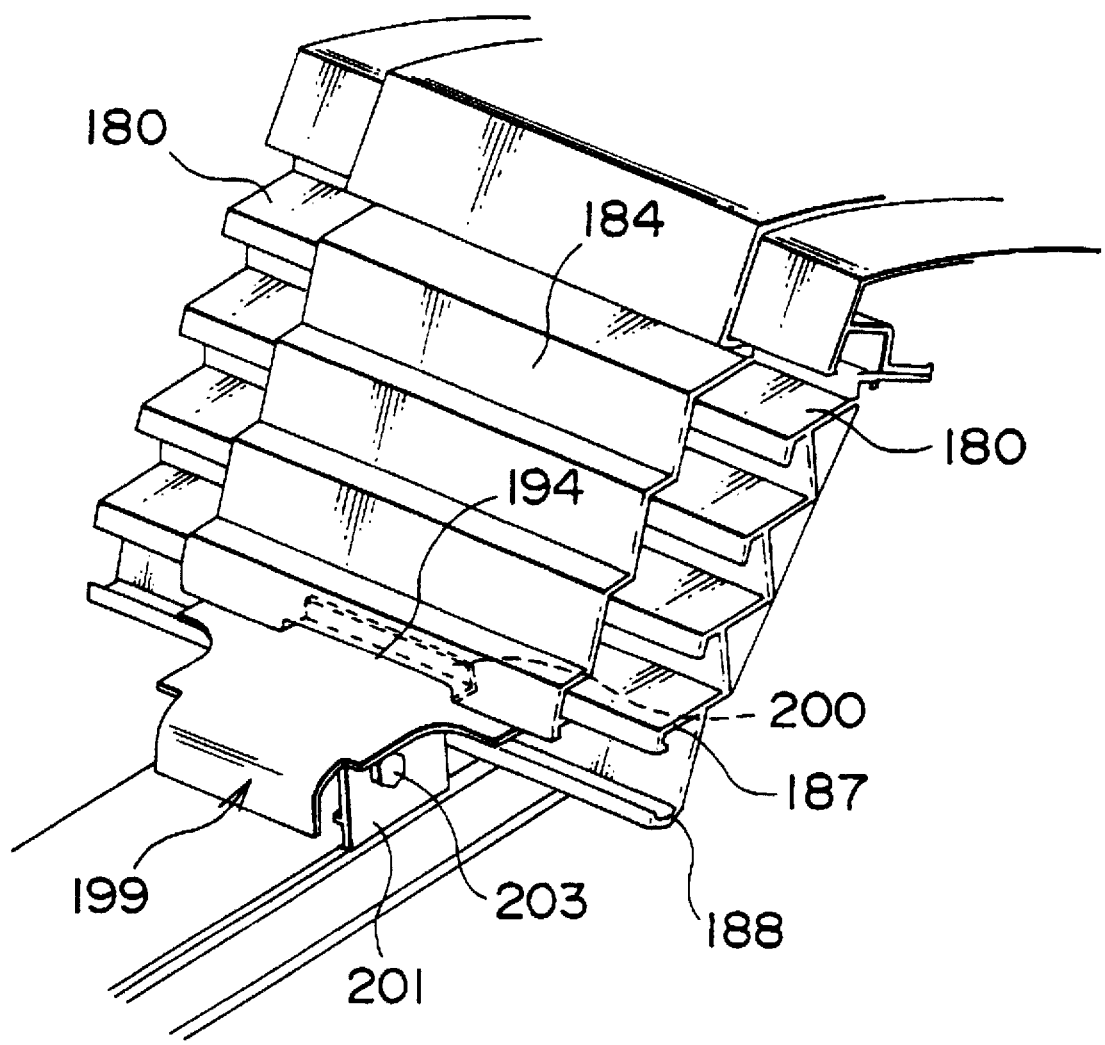

For assembling the ridge members 120, as shown in FIG. 71, the ridge lateral member 180 is mounted on the upper surfaces of the connecting member cover 110 and the lateral connecting member cover 135. A bolt insertion groove 198 is formed along the ridge in the central position of the upper surface of a horizontal portion 195. A fixing member 198 is mounted on the upper surface of the connecting member cover 110 and the lateral connecting member cover 135. The fixing member 198 is provided with a locking key portion 197 that is engaged downward from the edge of the ridge side of the horizontal portion 195 to a ridge member fixing piece 188 provided at the lower end of the ridge lateral member 180. As shown in FIG. 72, A ridge member fitting 199 is covered downward on the fixing member 198. A riser wall 200 projected from the end portion of the ridge member fitting 199 closer to the ridge is inserted into a notch 194 formed in the lower end of the ridge lateral connecting member 184. The riser wall 200 is then engaged with the stepwise body 187 of the ridge lateral member 180. The lower end of a hanging wall 201 formed on the lower surface of the ridge member fitting 199 is engaged with both laterals of the connecting member cover 110 and the lateral connecting member cover 135. A bolt 203 is inserted into and secured therein an elongated bore 202 formed in the hanging wall 201 and the bolt insertion groove 198 of the fixing member 198.

Figure 73:
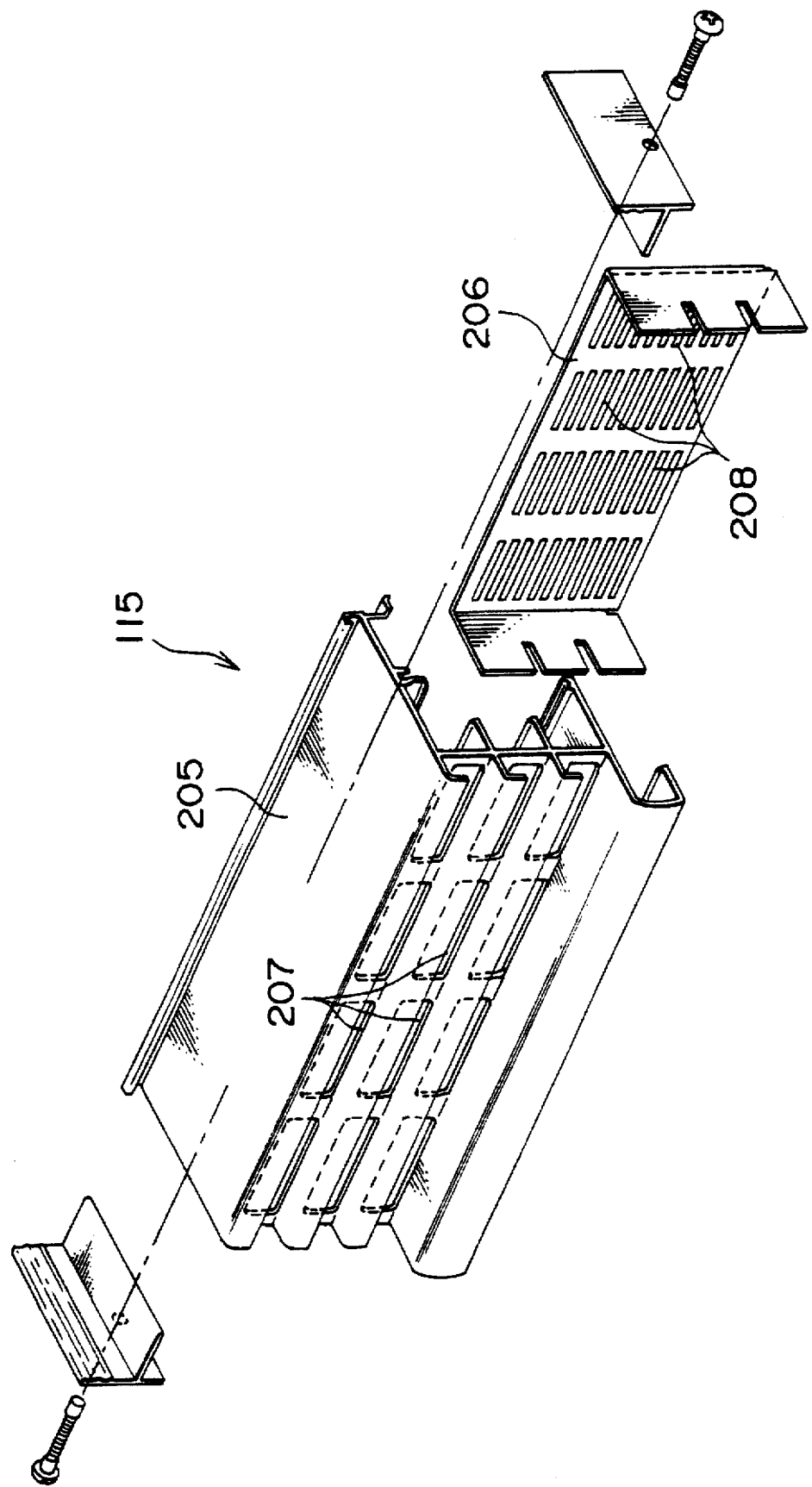
FIG. 73 is an exploded perspective view of an eaves's member.
Figure 74:
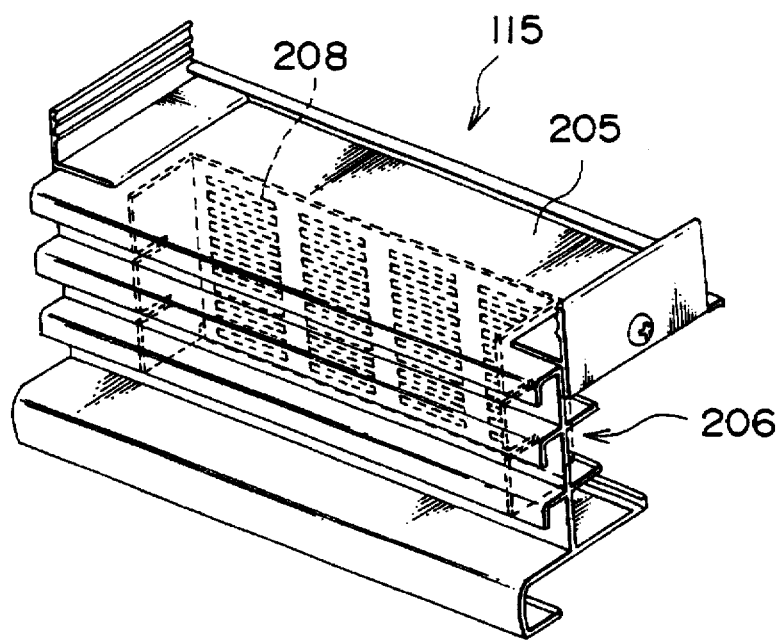
FIG. 74 is a perspective view of the eaves's member after being arranged.
Figure 75:
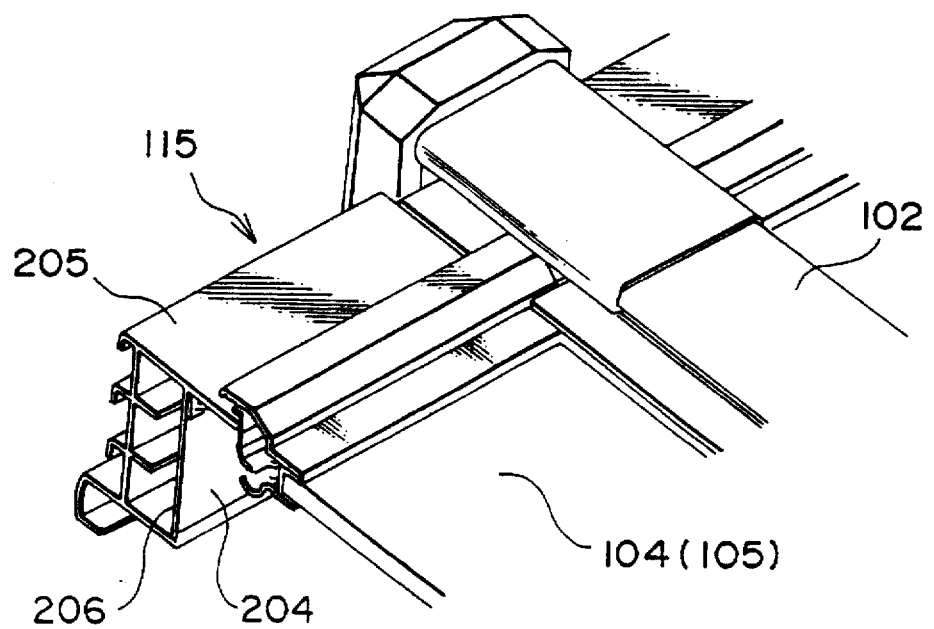
FIG. 75 is a perspective view of an eaves's portion of a roof with a solar energy collector.

The eaves's member 115 comprises, as shown in FIGS. 73 and 74, an eaves's member body 205 and flashing plates 208. The eaves's member body 205 is mounted along the leading edge of each of the modular roof members 104 and 105 laid at the closest position to the eaves. The flashing plates 208 are mounted to the back surface of the eaves's member body 205 at a slight distance from each other. Ventilation bores 207 and 208 are formed in the vertical surface of the eaves's member body 205 and the flashing plate 208, respectively. As shown in FIG. 75, when the eaves's member 115 is attached, a harness space 204 is ensured between the flashing plate 206 and the modular roof members 104 and 105 that are laid at the closest position to the eaves.

The length of the roof deck in the slope direction depends on the dimension of the dwelling, the slope or pitch of the roof and the length of the eaves. It is impossible to cut the modular roof members 104 and 105 with a solar cell built therein and the ridge roof members 106, 106', so that an error between the length of the roof deck and the total valid length of the modular roof members 104 and 105 as well as the ridge roof members 106, 106' should be adjusted by means of changing the combination of the modular roof members 104 and 105 and the ridge roof members 106, 106' and moving the length adjusting piece 130 of the ridge roof members 106, 106' to achieve the fine adjustment.

As mentioned above, the valid length L of the first modular roof member 104 and the ridge roof member 106' is equal to 550 mm. The valid length L' of the second modular roof member 105 and the ridge roof member 108 is equal to 655 mm. Thus, there is a difference of 105 mm between the valid lengths, which the difference of 105 mm between the modular roof members 104 and 105 is effectively used to comply with any roof of various length in the slope direction.

In this event, if an error is caused between the length of the modules and that of the roof in the slope direction, or if a dimensional error is caused on right and left verges due to execution error, these errors should also be adjusted. Since the difference in length between the first and the second modular roof members 104 and 105 is equal to 105 mm, an adjustment in length by an amount smaller than the half of the difference, i.e., 52.5 mm, cannot be available. With this respect, the width available for the fine adjustment at the ridge portion is determined to 65 mm in plus and minus to ensure easy execution.

More particularly, the length adjusting piece 130 can be slid in the slope direction by an amount equal to the elongated adjusting bore 140, i.e. by 65 mm at maximum. Adjustment in the slope direction can be made by using the difference between the valid lengths as well as the width available for adjusting length in the ridge roof members 106, 106'.

Figure 76:
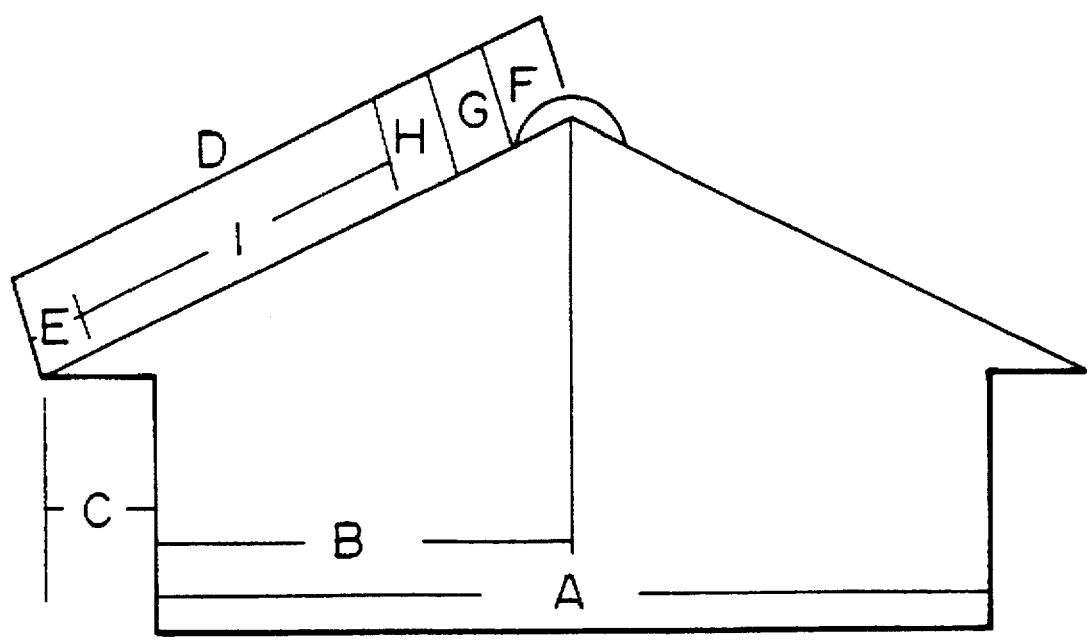
FIG. 76 diagramatically shows a dwelling.

As shown in FIGS. 64, 65 and 76, it is assumed that the distance E between the tip of the eaves's member 115 and the lighting surface of the modular roof members 104 and 105 is approximately equal to 60 mm, the half of the width of the ridge member 120 is equal to 100 mm, a lighting security width G is equal to 25 mm, and the valid length H of the length adjusting piece is equal to 65 mm. Under these conditions, in a dwelling having a frontage A in a span direction of 7,272 mm, a frontage B between the ridge central line and an outer wall of 3,636 mm, the roof slope of $^{45}/_{100}$ pitch which indicates that a height to a horizontal distance l is 0.45, and thus the distance of the oblique side is $\sqrt{1^2+0.45^2}=1.095$ and an extending width C of the eaves of 455 mm, the length D of the roof deck in the slope direction is equal to 4,500 mm obtained as follows:

$$D=(B+C)\times 1.095.$$

Likewise, the length I of the execution space in the slope direction is equal to 4,250 mm given as follows:

$I=D-(E+F+G+H)$.

When this execution space is laid with three first modular roof members 104 and four second modular roof members 105 connected in the slope direction, the total amount K of the valid lengths of the modular roof members 104 and 105 becomes equal to 4,270 mm and an adjusting dimension K–1 can be +20 mm.

The lighting security width G corresponds to a minimum distance required between the external edge of the ridge member 120 and the lighting surface to avoid undesired shadowing on the lighting surface. The valid length H of the length adjusting piece is equal to a length obtained by means of subtracting the lighting security width G from the distance between the end portion of the lighting surface at the ridge side and the external end portion of the ridge member 120 when the indication plate 143 of the ridge roof members 106, 106' indicates the zero point of the scale 141. This valid length H is approximately coincident with the distance between the zero point of the elongated adjusting bore 140 of the length adjusting piece 130 and the end portion at the plus side.

In addition, in the above mentioned equations, calculation is made only for the modular roof members 104 and 105 because the valid lengths of the ridge roof members 106, 106' are equal to those of the first and the second modular roof members 104 and 105.

Further, each of the values of E, F, G and H is previously determined as a constant value according to the standards of the members or other factors. Combinations of the modular roof members 104 and 105 applicable to actual roofs and adjusting dimensions at the ridge portion are set forth in Table 10 below. In addition, Table 11 and Table 12 show combinations of the modular roof members 104 and 105 as well as changes in the adjusting dimension K–I at the ridge portion when the extending width C of the eaves with respect to the frontage A is varied.

TABLE 10

| ROOF SLOPE | A | B (mm) | C (mm) | D | I | COMBINATION OF MODULAR ROOF MEMBERS 104 AND 105 | K(mm) | K – I(mm) |
|---|---|---|---|---|---|---|---|---|
| | | | | $D = (B + C) \times 1.095$ | $I = D - (E + F + G + H)$ | | | |
| 45/100 PITCH | 2.0(ken) | 3.636(mm) | 1.818 | 455 | 2.500 | 2.250 | A × 4 | 2.200 | -50 |
| | 2.5 | 4.545 | 2.273 | " | 3.000 | 2.750 | A × 5 | 2.750 | 0 |
| | 3.0 | 5.454 | 2.727 | " | 3.500 | 3.250 | B × 5 | 3.275 | +25 |
| | 3.0 | 6.363 | 3.182 | " | 4.000 | 3.750 | A × 2 B × 4 | 3.720 | -30 |
| | 4.0 | 7.272 | 3.636 | " | 4.500 | 4.250 | A × 3 B × 4 | 4.270 | +20 |
| | 4.5 | 8.181 | 4.091 | " | 5.000 | 4.750 | A × 5 B × 3 | 4.715 | -35 |
| | 5.0 | 9.090 | 4.545 | " | 5.500 | 5.250 | A × 6 B × 3 | 5.265 | +15 |
| | | | | | $D = (B + C) \times 1.014$ | | | | |
| 3/100 PITCH | 2.0 | 3.636 | 1.818 | 606 | 2.530 | 2.280 | A × 3 B × 1 | 2.305 | +25 |
| | 2.5 | 4.545 | 2.273 | " | 3.000 | 2.750 | A × 5 | 2.750 | 0 |
| | 3.0 | 5.454 | 2.727 | " | 3.480 | 3.230 | B × 5 | 3.275 | +45 |
| | 3.5 | 6.363 | 3.182 | " | 3.960 | 3.710 | A × 2 B × 4 | 3.720 | +10 |
| | 4.0 | 7.272 | 3.636 | " | 4.430 | 4.180 | A × 4 B × 3 | 4.165 | -15 |
| | 4.5 | 8.181 | 4.091 | " | 4.900 | 4.650 | A × 6 B × 2 | 4.610 | -40 |
| | 5.0 | 9.090 | 4.545 | " | 5.380 | 5.130 | A × 7 B × 2 | 5.160 | +30 |
| | | | | | $D = (B + C) \times 1.044$ | I | | | |
| 28/100 PITCH | 2.0 | 3.636 | 1.818 | 303 | 2.450 | 2.200 | A × 4 | 2.200 | 0 |
| | 2.5 | 4.545 | 2.273 | " | 2.980 | 2.730 | A × 5 | 2.750 | +20 |
| | 3.0 | 5.454 | 2.727 | " | 3.500 | 3.250 | B × 5 | 3.275 | +25 |
| | 3.5 | 6.363 | 3.182 | " | 4.030 | 3.780 | A × 1 B × 5 | 3.825 | +45 |
| | 4.0 | 7.272 | 3.636 | " | 4.550 | 4.300 | A × 3 B × 4 | 4.270 | -30 |
| | 4.5 | 8.181 | 4.091 | " | 5.080 | 4.830 | A × 4 B × 4 | 4.820 | -10 |
| | 5.0 | 9.090 | 4.545 | " | 5.600 | 5.350 | A × 5 B × 4 | 5.370 | +20 |

MODULAR ROOF MEMBERS 104 ARE REPRESENTED BY A
MODULAR ROOF MEMBERS 105 ARE REPRESENTED BY B

TABLE 11

| C(mm) | I(mm) | COMBINATION OF MODULAR ROOF MEMBERS 104 AND 105 | | K (mm) | K – I(mm) |
|---|---|---|---|---|---|
| A = 2.0 FRONTAGE | | | | | |
| 455 (STANDARD) | 2.250 | A × 4 | | 2.200 | -50 |
| 555 (LONG) | 2.350 | A × 3 | B × 1 | 2.305 | -45 |
| 655 (LONG) | 2.450 | A × 2 | B × 2 | 2.410 | -40 |
| 755 (LONG) | 2.550 | A × 1 | B × 3 | 2.515 | -35 |
| A = 2.5 FRONTAGE | | | | | |
| 255 (SHORT) | 2.550 | A × 1 | B × 3 | 2.515 | -35 |
| 355 (SHORT) | 2.650 | B × 4 | | 2.620 | -30 |
| 455 (STANDARD) | 2.750 | A × 5 | | 2.750 | 0 |
| 555 (LONG) | 2.850 | A × 4 | B × 1 | 2.855 | +5 |
| 655 (LONG) | 2.950 | A × 3 | B × 2 | 2.960 | +10 |
| 755 (LONG) | 3.050 | A × 2 | B × 3 | 3.065 | +15 |

TABLE 11-continued

| C(mm) | I(mm) | COMBINATION OF MODULAR ROOF MEMBERS 104 AND 105 | | K (mm) | K − I(mm) |
|---|---|---|---|---|---|
| A = 3.0 FRONTAGE | | | | | |
| 255 (SHORT) | 3.050 | A × 2 | B × 3 | 3.065 | +15 |
| 355 (SHORT) | 3.150 | A × 1 | B × 4 | 3.170 | +20 |
| 455 (STANDARD) | 3.250 | B × 5 | | 3.275 | +25 |
| 555 (LONG) | 3.350 | A × 6 | | 3.300 | −50 |
| 655 (LONG) | 3.450 | A × 5 | B × 1 | 3.405 | −45 |
| 755 (LONG) | 3.550 | A × 4 | B × 2 | 3.510 | −40 |
| A = 3.5 FRONTAGE | | | | | |
| 255 (SHORT) | 3.550 | A × 4 | B × 2 | 3.510 | −40 |
| 355 (SHORT) | 3.650 | A × 3 | B × 3 | 3.615 | −35 |
| 455 (STANDARD) | 3.750 | A × 2 | B × 4 | 3.720 | −30 |
| 555 (LONG) | 3.850 | A × 1 | B × 5 | 3.825 | −25 |
| 655 (LONG) | 3.950 | B × 6 | | 3.930 | −20 |
| 755 (LONG) | 4.050 | A × 5 | B × 2 | 4.060 | −10 |

MODULAR ROOF MEMBERS 104 ARE REPRESENTED BY A
MODULAR ROOF MEMBERS 105 ARE REPRESENTED BY B

TABLE 12

| C(mm) | I(mm) | COMBINATION OF MODULAR ROOF MEMBERS 104 AND 105 | | K (mm) | K − I(mm) |
|---|---|---|---|---|---|
| A = 4.0 FRONTAGE | | | | | |
| 255 (SHORT) | 4.050 | A × 5 | B × 2 | 4.060 | +10 |
| 355 (SHORT) | 4.150 | A × 4 | B × 3 | 4.165 | +15 |
| 455 (STANDARD) | 4.250 | A × 3 | B × 4 | 4.270 | +20 |
| 555 (LONG) | 4.350 | A × 2 | B × 5 | 4.375 | +25 |
| 655 (LONG) | 4.450 | A × 1 | B × 6 | 4.480 | +30 |
| 755 (LONG) | 4.550 | B × 7 | | 4.585 | +35 |
| A = 4.5 FRONTAGE | | | | | |
| 255 (SHORT) | 4.550 | B × 7 | | 4.585 | +35 |
| 355 (SHORT) | 4.650 | A × 6 | B × 2 | 4.610 | −40 |
| 455 (STANDARD) | 4.750 | A × 5 | B × 3 | 4.715 | −35 |
| 555 (LONG) | 4.850 | A × 4 | B × 4 | 4.820 | −30 |
| 655 (LONG) | 4.950 | A × 3 | B × 5 | 4.925 | −25 |
| 755 (LONG) | 5.050 | A × 2 | B × 6 | 5.030 | −20 |
| A = 5.0 FRONTAGE | | | | | |
| 255 (SHORT) | 5.050 | A × 2 | B × 6 | 5.030 | −20 |
| 355 (SHORT) | 5.150 | A × 1 | B × 7 | 5.135 | −15 |
| 455 (STANDARD) | 5.250 | A × 6 | B × 3 | 5.265 | +15 |
| 555 (LONG) | 5.350 | A × 5 | B × 4 | 5.370 | +20 |
| 655 (LONG) | 5.450 | A × 4 | B × 5 | 5.475 | +25 |
| 755 (LONG) | 5.550 | A × 3 | B × 6 | 5.580 | +30 |
| A = 5.5 FRONTAGE | | | | | |
| 255 (SHORT) | 5.550 | A × 3 | B × 6 | 5.580 | +30 |
| 355 (SHORT) | 5.650 | A × 2 | B × 7 | 5.685 | +35 |
| 455 (STANDARD) | 5.750 | A × 1 | B × 8 | 5.790 | +40 |
| 555 (LONG) | 5.850 | B × 9 | | 5.895 | +45 |
| 655 (LONG) | 5.950 | A × 6 | B × 4 | 5.920 | −30 |
| 755 (LONG) | 6.050 | A × 5 | B × 5 | 6.025 | −25 |
| A = 6.0 FRONTAGE | | | | | |
| 255 (SHORT) | 6.050 | A × 5 | B × 5 | 6.025 | −25 |
| 355 (SHORT) | 6.150 | A × 4 | B × 6 | 6.130 | −20 |
| 455 (STANDARD) | 6.250 | A × 3 | B × 7 | 6.235 | −15 |
| 555 (LONG) | 6.350 | A × 2 | B × 8 | 6.340 | −10 |
| 655 (LONG) | 6.450 | A × 1 | B × 9 | 6.445 | −5 |
| 755 (LONG) | 6.550 | B × 10 | | 6.550 | 0 |

MODULAR ROOF MEMBERS 104 ARE REPRESENTED BY A
MODULAR ROOF MEMBERS 105 ARE REPRESENTED BY B

Figure 77:
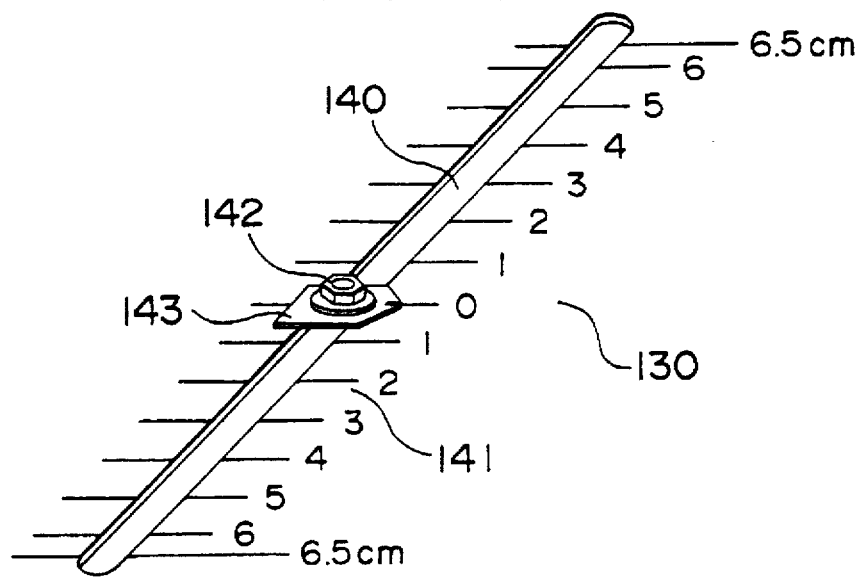
FIG. 77 is a perspective view of an essential part of a length adjusting piece, in which being illustrated is a state where an adjusted dimension is equal to zero.

In the above Table 10 through Table 12, no adjustment is required at the ridge portion when the adjusting dimension K−I is equal to zero. Accordingly, as shown in FIG. 77, the indication plate 143 passing through the bolt 142 for attaching the length adjusting piece 130 is set to zero point of the scale 141 and the length adjusting piece 130 is remained at a normal position thereof as shown in FIG. 64.

Figure 79:
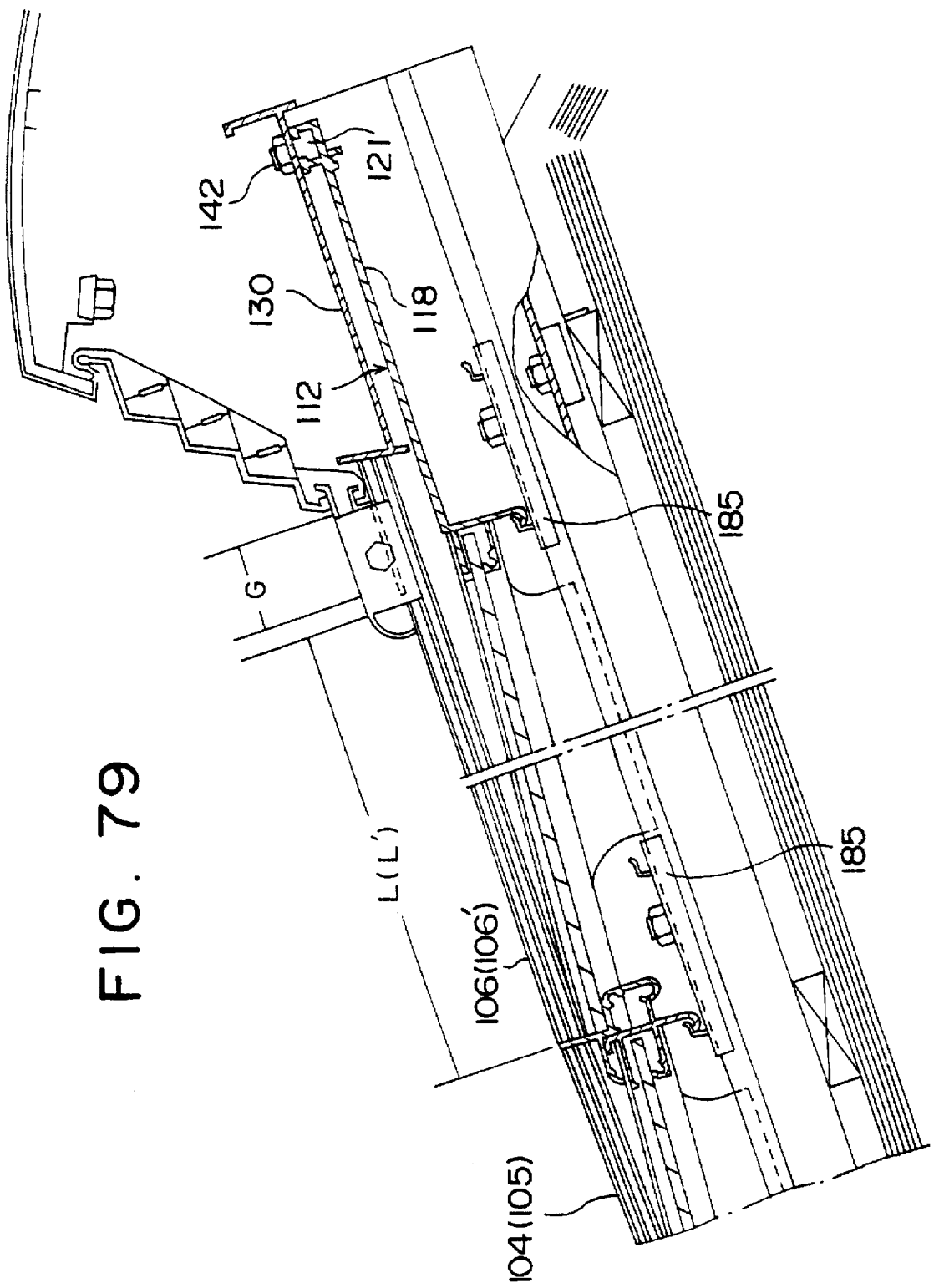
FIG. 79 is a sectional view of the ridge portion of the roof system utilizing a solar cell, in which being illustrated is a state where an adjusted dimension is positive.

In addition, when the adjusting width K−I is positive, the length adjusting piece 130 of the ridge roof member 106, 106' is slid towards the eaves as shown in FIG. 78 to make the indication plate 143 to indicate a positive value on the scale 141 depending on the adjusting dimension. Then, the error is adjusted by means of reducing the length of the ridge roof members 106, 106' as shown in FIG. 79.

Figure 81:
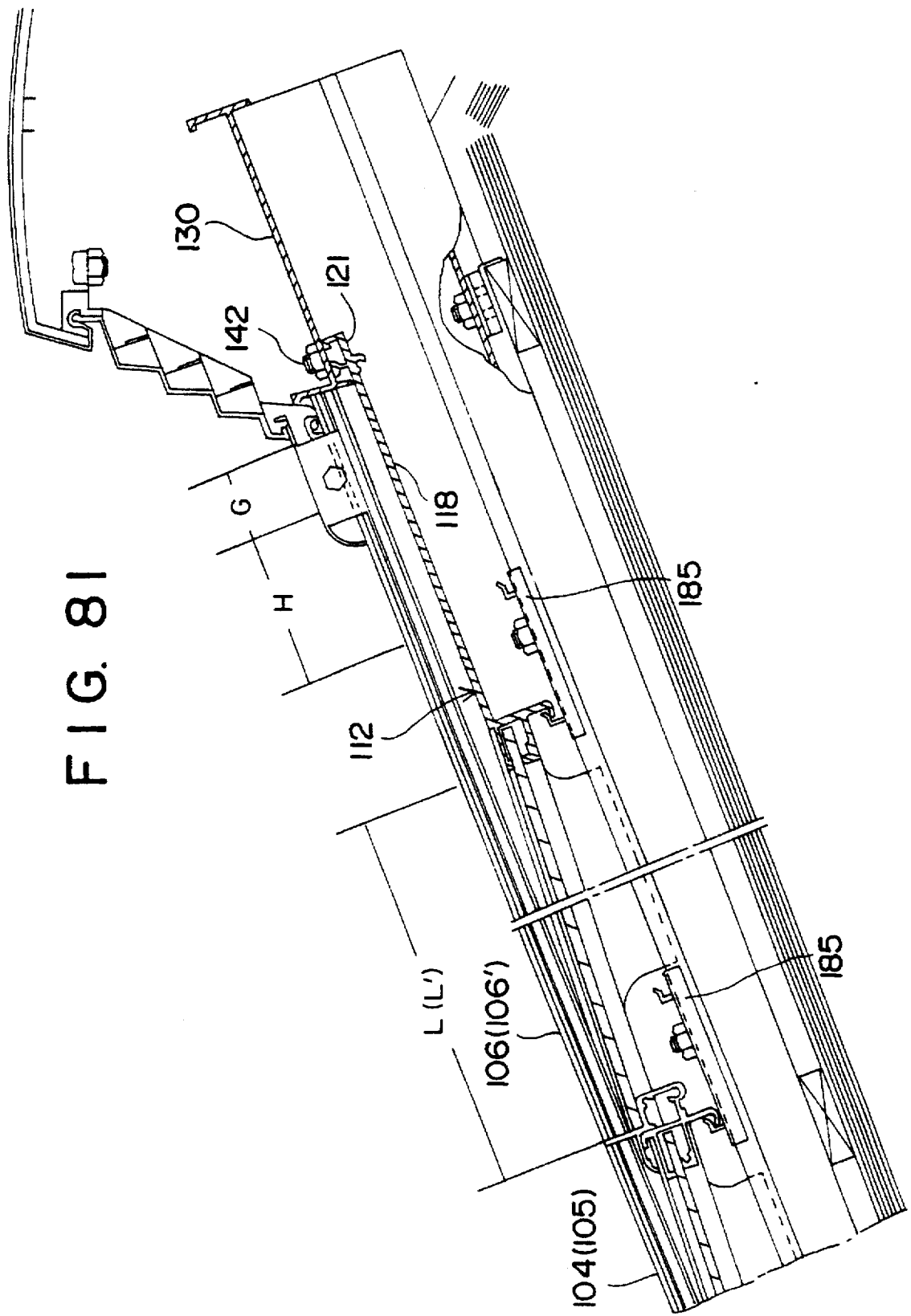
FIG. 81 is a sectional view of the ridge portion of the roof system utilizing a solar cell, in which being illustrated is a state where an adjusted dimension is negative.

On the other hand, when the adjusting width K−I is negative, the length adjusting piece 130 of the ridge roof member 106, 106' is slid towards the top of the ridge as shown in FIG. 80 to make the indication plate 143 to indicate a negative value on the scale 141 depending on the adjusting dimension. Then, the error is adjusted by means of increasing the length of the ridge roof members 106, 106' as shown in FIG. 81.

The number of light collecting plate segments 148 arranged into rows and columns can be varied both for the modular roof members 104 and 105 and the ridge roof members 106, 106'. Eight light collecting plate segments 148 may be aligned in the roof lateral direction. Alternatively, it is possible to combine the first modular roof member 104 composed of four light collecting plate segments 148 aligned in the slope direction and the second modular roof member 105 composed of five of them aligned in the same direction.

Figure 82:
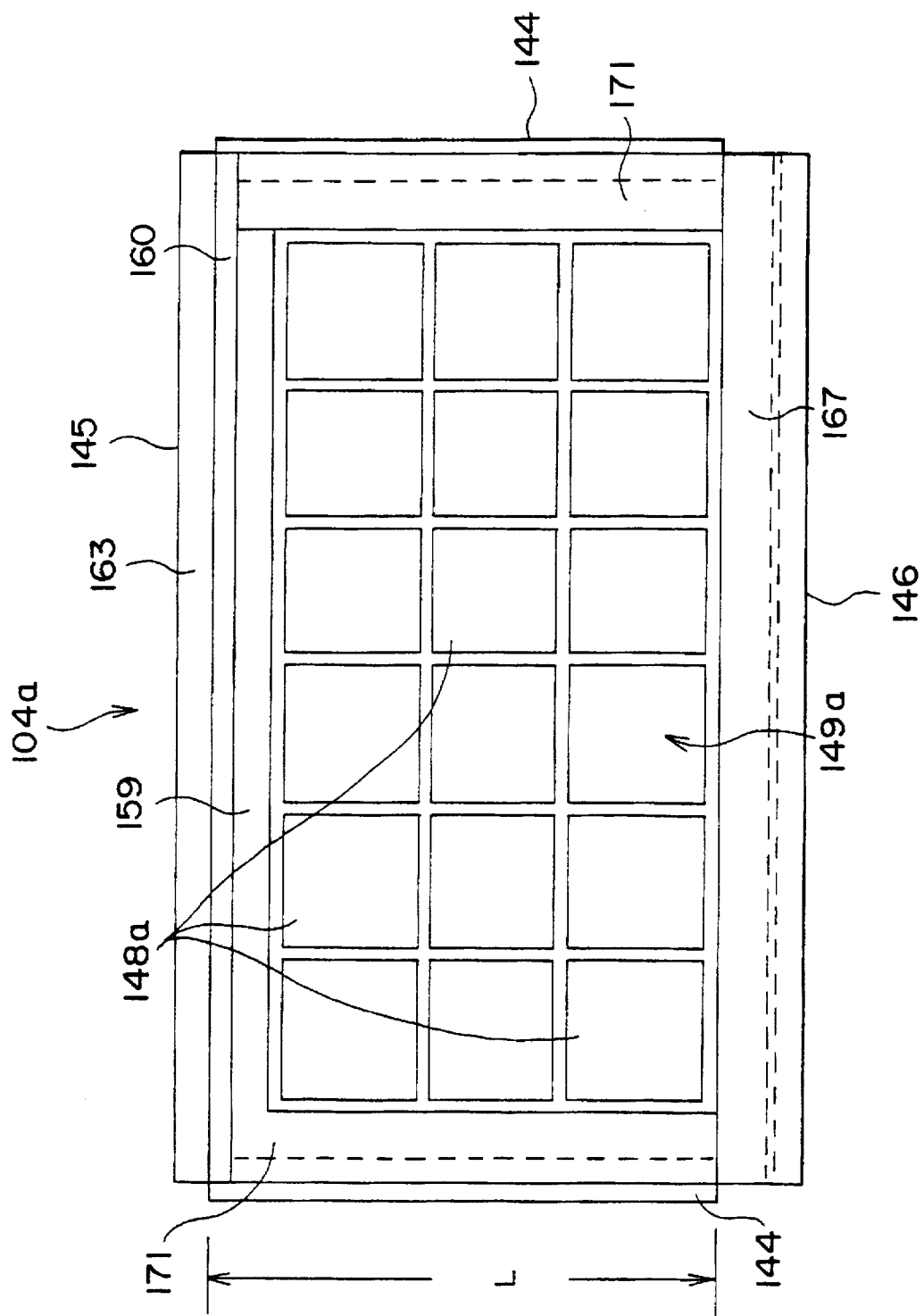
FIG. 82 is a plan view of a first modular roof member according to a fourth embodiment of the present invention.

FIG. 82 shows a first modular roof member 104a according to a fourth embodiment of the present invention. First light collecting plate segments 148a of square shape having sides of 150 mm in each are formed into a composite assembly 149a consisting of six rows of the light collecting plate segments 148a in the roof lateral direction and three columns thereof in the roof slope direction orthogonal to the roof lateral direction. The valid length L in the slope direction is equal to 490 mm.

Figure 83:
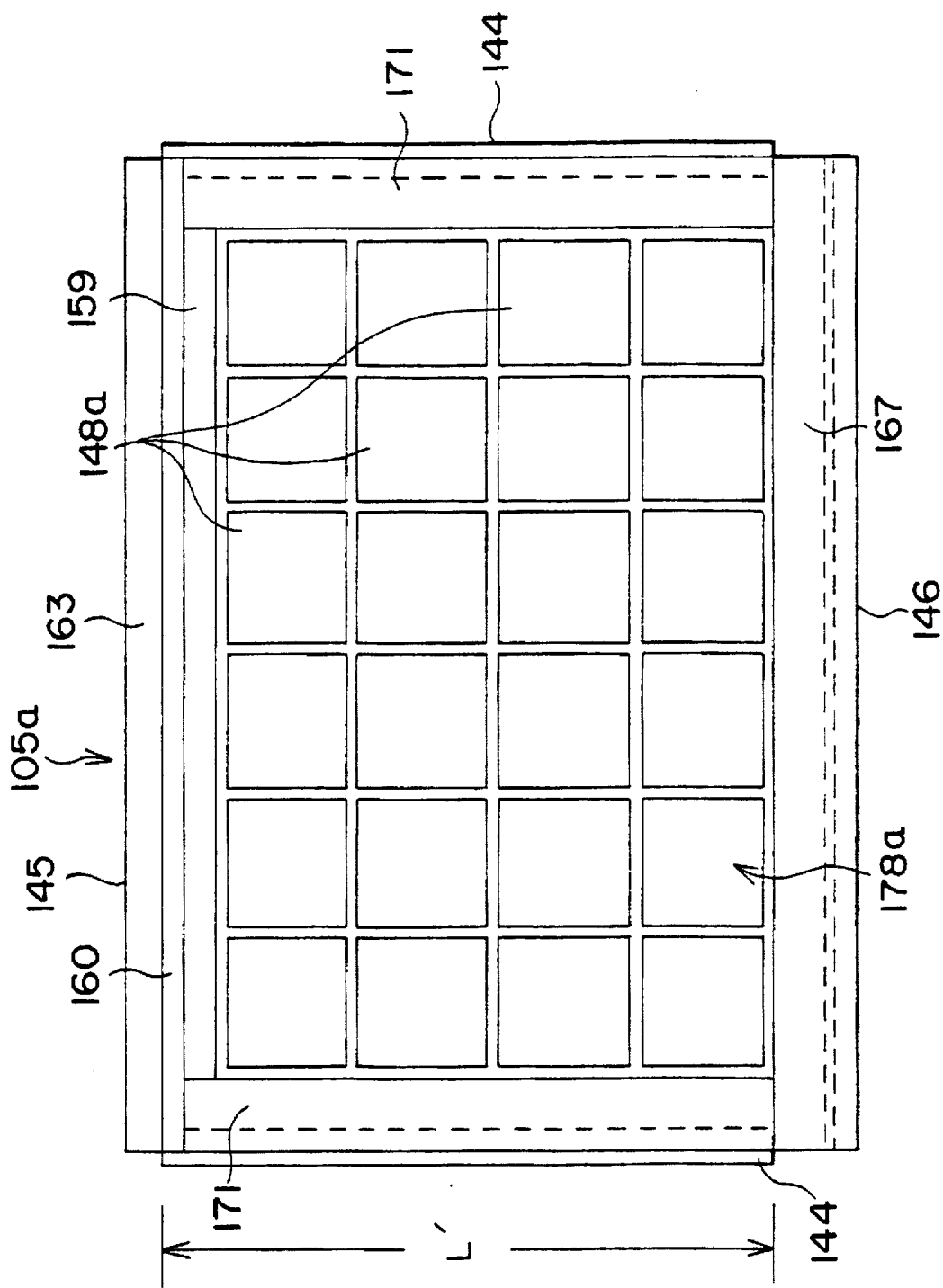
FIG. 83 is a plan view of a second modular roof member according to the fourth embodiment of the present invention.

FIG. 83 shows a second modular roof member 105a according to the fourth embodiment of the present invention. Second light collecting plate segments 148a of square shape having the same dimension as those in first modular roof member 104a are formed into a composite assembly 178a consisting of six rows of the light collecting plate segments 148a in the roof lateral direction and four columns thereof in the roof slope direction orthogonal to the roof lateral direction. The valid length L' in the slope direction is equal to 645 mm.

Figure 84:
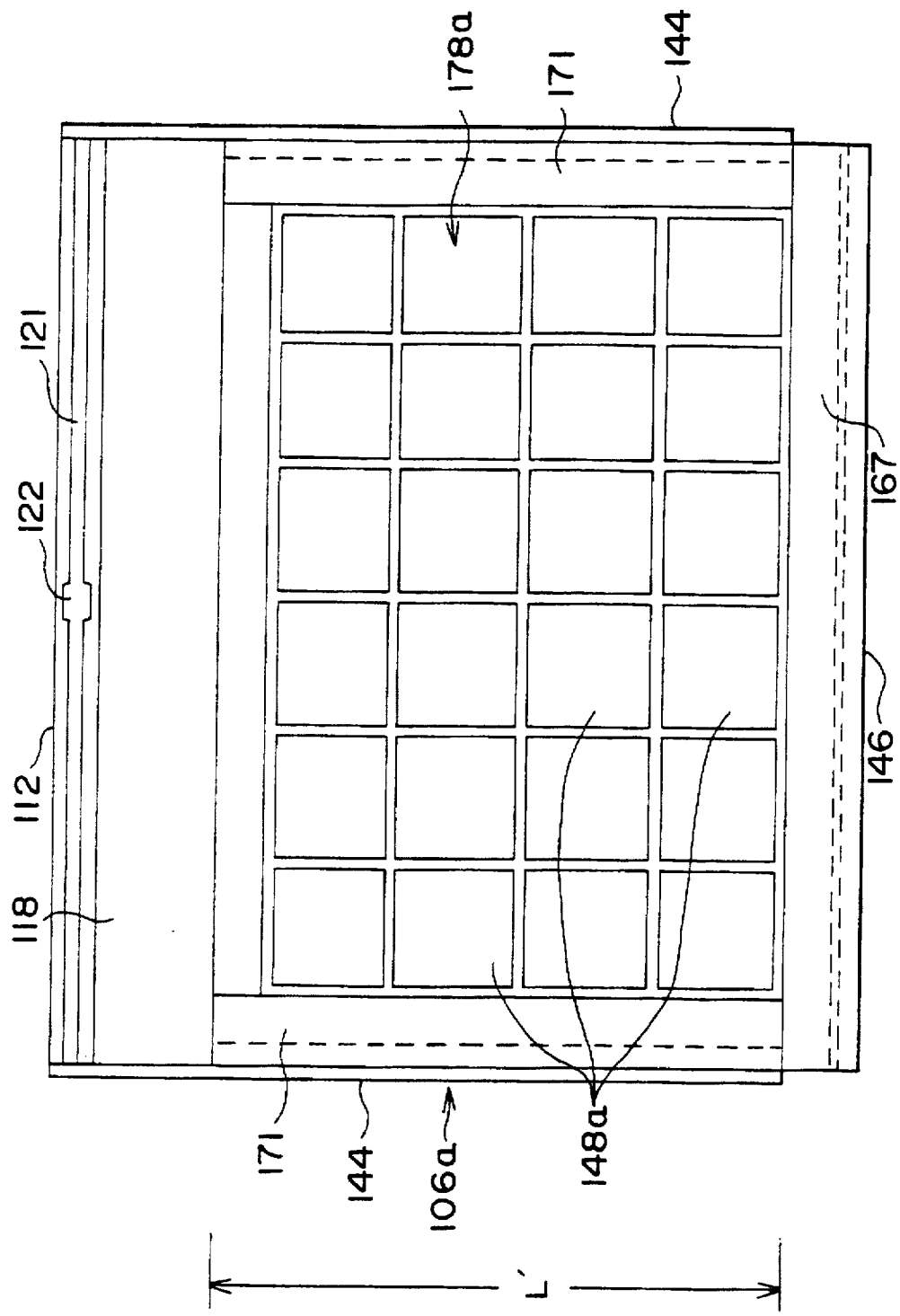
FIG. 84 is a plan view of a roof member at the ridge portion according to the fourth embodiment of the present invention.
Figure 85:
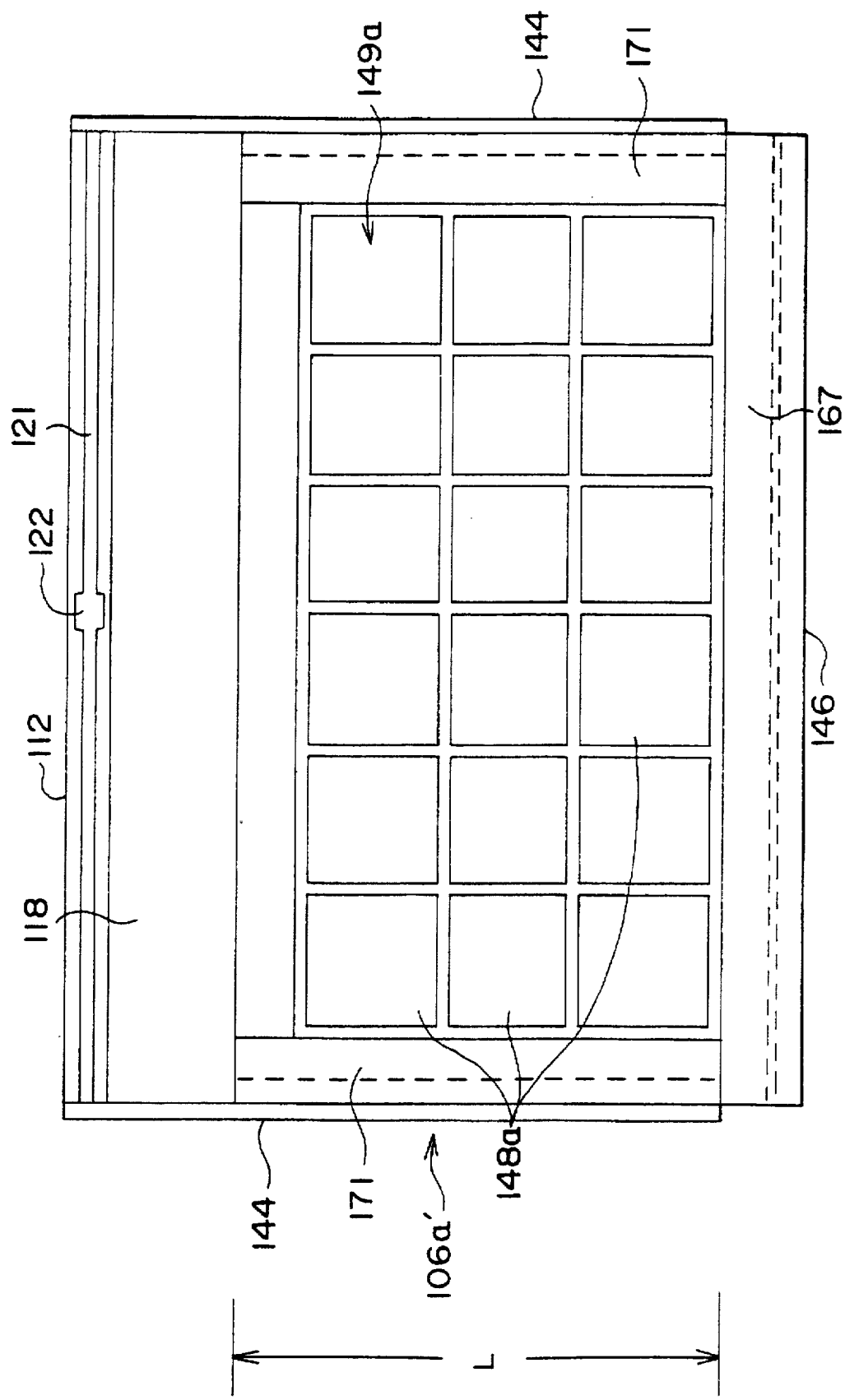
FIG. 85 is a plan view of another roof member at the ridge portion according to the fourth embodiment of the present invention.
Figure 86:
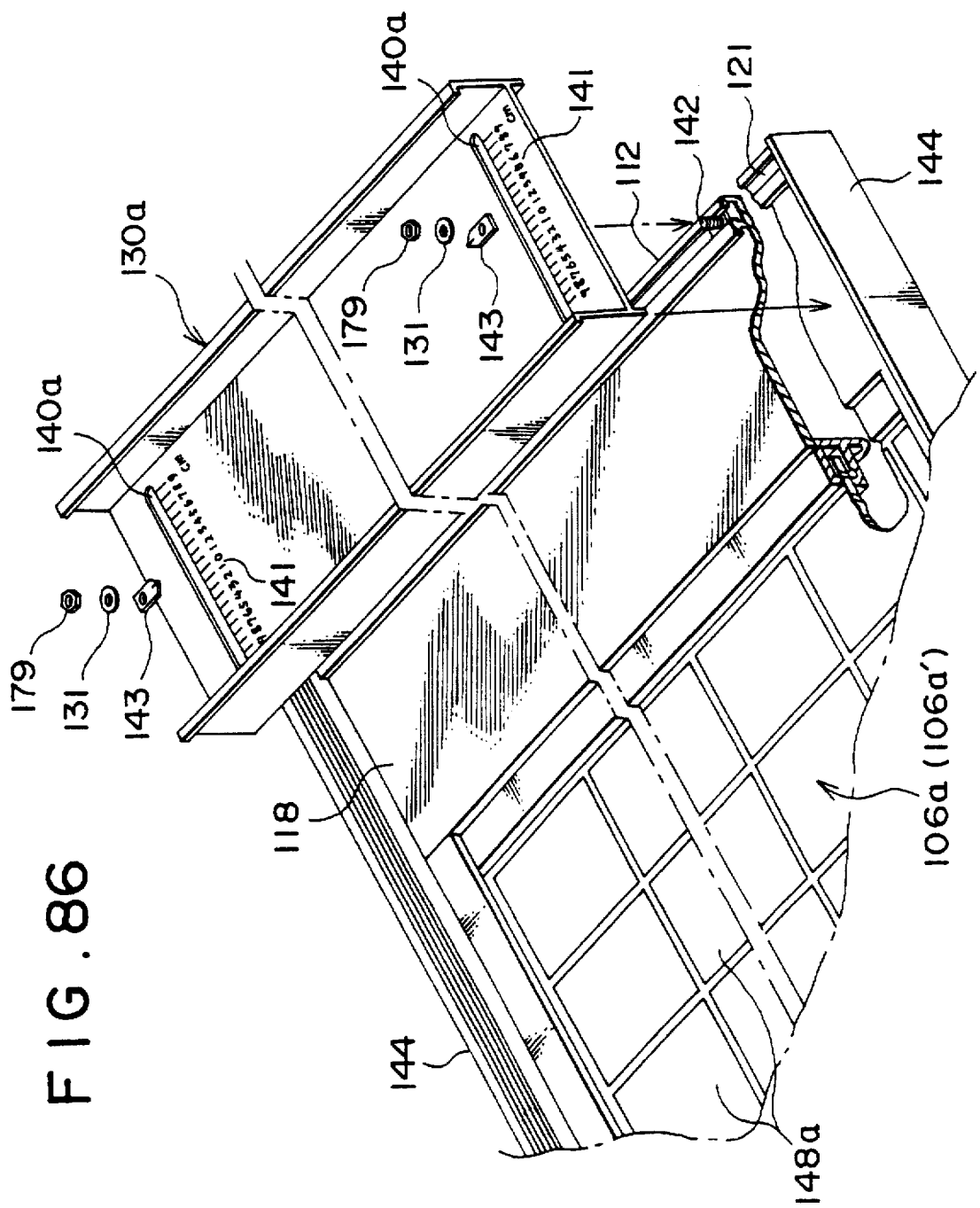
FIG. 86 is a plan view of an essential part of the roof member at the ridge portion according to the fourth embodiment of the present invention.

FIG. 84 shows a ridge roof member 106a a having a composite assembly 178a consisting of four third and fourth rows of light collecting plate segments 148a aligned in the slope direction. Each of the third and fourth rows of light collecting plate segments 148a is equal in dimension to that in the first modular roof member 14a. FIG. 85 shows a ridge roof member 106a' having a composite assembly 149a consisting of three third and fourth rows of light collecting plate segments 148a aligned in the same direction. The valid lengths L and L' of the respective ridge roof members 108a and 108a' are equal to 645 mm and 490 mm, respectively. As shown in FIG. 86, a length adjusting piece 130a attached to the ridge roof members 106, 106' is provided with an elongated adjusting bore 140a. The elongated adjusting bore 140a is slightly larger than the elongated adjusting bore 140 to achieve sliding movement by 90 mm in both plus and minus slope directions.

The first modular roof member 104a, the second modular roof member 105a and the ridge roof members 106a, 106a' are similar in structure to the first modular roof member 104, the second modular roof member 105 and the ridge roof members 106, 106' described in conjunction with the above mentioned embodiment and can be laid in the same manner as described above. Accordingly, similar parts and components are denoted by like reference numerals and description thereof will be omitted.

In the fourth embodiment, there is a difference of 155 mm between the valid lengths of the first and the second modular roof members 104a and 105a. An error, if caused, is adjusted in the same manner as described above by using the difference of 155 mm and the slidable range of the length adjusting piece 130a, i.e., 190 mm.

For example, it is assumed that the distance E between the tip of the eaves's member 115 and the lighting surface of the modular roof members 104a and 105a is approximately equal to 60 mm, the half of the width of the ridge member 120 is equal to 100 mm, a lighting security width G is equal to 25 mm, and the valid length H of the length adjusting piece is equal to 90 mm. Under these conditions, in a dwelling having a frontage A in a span direction of 9,090 mm, a frontage B between the ridge central line and an outer wall of 4,545 mm, the roof slope of 3/100 pitch and an extending width C of the eaves of 606 mm, the length D of the roof deck in the slope direction is equal to 5,380 mm obtained as follows:

$$D=(B+C)\times 1.044.$$

Likewise, the length I of the execution space in the slope direction is equal to 5,105 mm given as follows:

$$I=D-(E+F+G+H).$$

When this execution space is laid with five first modular roof members 104 and four second modular roof members 105 connected in the slope direction, the total amount K of the valid lengths of the modular roof members 104 and 105 becomes equal to 5,030 mm and an adjusting dimension K−1 can be −75 mm.

Combinations of the modular roof members 104a and 105a applicable to actual roofs and adjusting dimensions at the ridge portion are set forth in Table 13 below. In addition, Table 14 and Table 15 show combinations of the modular roof members 104a and 105a as well as changes in the adjusting dimension K−I at the ridge portion when the extending width C of the eaves with respect to the frontage A is varied.

TABLE 13

| ROOF SLOPE | | A | B (mm) | C (mm) | I = D − (E + F + G + H) | COMBINATION OF MODULAR ROOF MEMBERS 104a and 105a | | K(mm) | K − I(mm) |
| --- | --- | --- | --- | --- | --- | --- | --- | --- | --- |
| | | | | | D = (B + C) × 1.095 | | | | |
| 45/100 | 2.0(ken) | 3.636(mm) | 1.818 | 455 | 2.500 | 2.225 | C × 2  D × 2 | 2.270 | +45 |
| PITCH | 2.5 | 4.545 | 2.273 | " | 3.000 | 2.725 | C × 3  D × 2 | 2.760 | +35 |
| | 3.0 | 5.454 | 2.727 | " | 3.500 | 3.225 | D × 5 | 3.225 | 0 |
| | 3.5 | 6.363 | 3.182 | " | 4.000 | 3.725 | C × 1  D × 5 | 3.715 | −10 |
| | 4.0 | 7.272 | 3.636 | " | 4.500 | 4.225 | C × 2  D × 5 | 4.205 | −20 |
| | 4.5 | 8.181 | 4.091 | " | 5.000 | 4.725 | C × 3  D × 5 | 4.695 | −30 |
| | 5.0 | 9.090 | 4.545 | " | 5.500 | 5.225 | C × 4  D × 5 | 5.185 | −40 |
| | | | | | D = (B + C) × 1.044 | | | | |
| 3/100 | 2.0 | 3.636 | 1.818 | 606 | 2.530 | 2.255 | C × 2  D × 2 | 2.270 | +15 |
| PITCH | 2.5 | 4.545 | 2.273 | " | 3.000 | 2.725 | C × 3  D × 2 | 2.760 | +35 |

TABLE 13-continued

| ROOF SLOPE | | A | B (mm) | C (mm) | | I = D − (E + F + G + H) | COMBINATION OF MODULAR ROOF MEMBERS 104a and 105a | | K(mm) | K − I(mm) |
|---|---|---|---|---|---|---|---|---|---|---|
| | 3.0 | 5.454 | 2.727 | " | 3.480 | 3.205 | D × 5 | | 3.225 | −20 |
| | 3.5 | 6.363 | 3.182 | " | 3.960 | 3.685 | C × 1 | D × 5 | 3.715 | +30 |
| | 4.0 | 7.272 | 3.636 | " | 4.430 | 4.155 | C × 2 | D × 5 | 4.205 | −50 |
| | 4.5 | 8.181 | 4.091 | " | 4.900 | 4.625 | C × 3 | D × 5 | 4.695 | +70 |
| | 5.0 | 9.090 | 4.545 | " | 5.380 | 5.105 | C × 5 | D × 4 | 5.030 | −75 |
| | | | | | D = (B + C) × 1.155 | | | | | |
| 58/100 PITCH | 2.0 | 3.636 | 1.818 | 303 | 2.450 | 2.175 | C × 3 | D × 1 | 2.115 | −60 |
| | 2.5 | 4.545 | 2.273 | " | 2.980 | 2.705 | C × 3 | D × 2 | 2.760 | +55 |
| | 3.0 | 5.454 | 2.727 | " | 3.500 | 3.225 | D × 5 | | 3.225 | 0 |
| | 3.5 | 6.363 | 3.182 | " | 4.030 | 3.755 | C × 1 | D × 5 | 3.715 | −40 |
| | 4.0 | 7.272 | 3.636 | " | 4.550 | 4.275 | C × 2 | D × 5 | 4.205 | −70 |
| | 4.5 | 8.181 | 4.091 | " | 5.080 | 4.805 | C × 2 | D × 6 | 4.850 | +45 |
| | 5.0 | 9.090 | 4.545 | " | 5.600 | 5.325 | C × 3 | D × 6 | 5.340 | +15 |

MODULAR ROOF MEMBERS 104a ARE REPRESENTED BY C
MODULAR ROOF MEMBERS 105a ARE REPRESENTED BY D

TABLE 14

| C(mm) | I(mm) | COMBINATION OF MODULAR ROOF MEMBERS 104a AND 105a | | K (mm) | K − I(mm) |
|---|---|---|---|---|---|
| A = 2.0 FRONTAGE | | | | | |
| 455 (STANDARD) | 2.225 | C × 2 | D × 2 | 2.270 | +45 |
| 555 (LONG) | 2.325 | C × 2 | D × 2 | 2.270 | −55 |
| 655 (LONG) | 2.425 | C × 1 | D × 3 | 2.425 | 0 |
| 755 (LONG) | 2.525 | | D × 4 | 2.580 | −55 |
| A = 2.5 FRONTAGE | | | | | |
| 255 (SHORT) | 2.525 | | D × 4 | 2.580 | −55 |
| 355 (SHORT) | 2.625 | C × 4 | D × 1 | 2.605 | −20 |
| 455 (STANDARD) | 2.725 | C × 3 | D × 2 | 2.760 | +35 |
| 555 (LONG) | 2.825 | C × 3 | D × 2 | 2.760 | −65 |
| 655 (LONG) | 2.925 | C × 6 | | 2.940 | +15 |
| 755 (LONG) | 3.025 | C × 5 | D × 1 | 3.095 | +70 |
| A = 3.0 FRONTAGE | | | | | |
| 255 (SHORT) | 3.025 | C × 5 | D × 1 | 3.095 | +70 |
| 355 (SHORT) | 3.125 | C × 5 | D × 1 | 3.095 | −30 |
| 455 (STANDARD) | 3.225 | | D × 5 | 3.225 | 0 |
| 555 (LONG) | 3.325 | C × 4 | D × 2 | 3.250 | −75 |
| 655 (LONG) | 3.425 | C × 7 | | 3.430 | +5 |
| 755 (LONG) | 3.525 | C × 2 | D × 4 | 3.560 | +35 |
| A = 3.5 FRONTAGE | | | | | |
| 255 (SHORTAGE) | 3.525 | C × 2 | D × 4 | 3.650 | +35 |
| 355 (SHORTAGE) | 3.625 | C × 2 | D × 4 | 3.560 | −65 |
| 455 (STANDARD) | 3.725 | C × 1 | D × 5 | 3.715 | −10 |
| 555 (LONG) | 3.825 | | D × 6 | 3.870 | +45 |
| 655 (LONG) | 3.925 | C × 8 | | 3.920 | −5 |
| 755 (LONG) | 4.025 | C × 3 | D × 4 | 4.050 | +25 |

MODULAR ROOF MEMBERS 104a ARE REPRESENTED BY C
MODULAR ROOF MEMBERS 105a ARE REPRESENTED BY D

TABLE 15

| C(mm) | I(mm) | COMBINATION OF MODULAR ROOF MEMBERS 104a AND 105a | | K (mm) | K − I(mm) |
|---|---|---|---|---|---|
| A = 2.0 FRONTAGE | | | | | |
| 255 (SHORT) | 4.025 | C × 3 | D × 4 | 4.050 | +25 |
| 355 (SHORT) | 4.125 | C × 3 | D × 4 | 4.050 | −75 |
| 455 (STANDARD) | 4.225 | C × 2 | D × 5 | 4.205 | −20 |
| 555 (LONG) | 4.325 | C × 1 | D × 6 | 4.360 | +35 |
| 655 (LONG) | 4.425 | C × 9 | | 4.410 | −15 |
| 755 (LONG) | 4.525 | | D × 7 | 4.515 | −10 |
| A = 4.5 FRONTAGE | | | | | |
| 255 (SHORT) | 4.525 | | D × 7 | 4.515 | −10 |
| 355 (SHORT) | 4.625 | C × 3 | D × 5 | 4.695 | +70 |
| 455 (STANDARD) | 4.725 | C × 3 | D × 5 | 4.695 | −30 |
| 555 (LONG) | 4.825 | C × 2 | D × 6 | 4.850 | +25 |
| 655 (LONG) | 4.925 | C × 10 | | 4.900 | −25 |

TABLE 15-continued

| C(mm) | I(mm) | COMBINATION OF MODULAR ROOF MEMBERS 104a AND 105a | | K (mm) | K − I(mm) |
|---|---|---|---|---|---|
| 755 (LONG) | 5.025 | C × 1 | D × 7 | 5.005 | −20 |
| A = 5.0 FRONTAGE | | | | | |
| 255 (SHORT) | 5.025 | C × 1 | D × 7 | 5.005 | −20 |
| 355 (SHORT) | 5.125 | | D × 8 | 5.160 | +35 |
| 455 (STANDARD) | 5.225 | C × 4 | D × 5 | 5.185 | −40 |
| 555 (LONG) | 5.325 | C × 3 | D × 6 | 5.340 | +15 |
| 655 (LONG) | 5.425 | C × 2 | D × 7 | 5.495 | +70 |
| 755 (LONG) | 5.525 | C × 10 | D × 1 | 5.545 | +20 |
| A = 5.5 FRONTAGE | | | | | |
| 255 (SHORT) | 5.525 | C × 10 | D × 1 | 5.545 | +20 |
| 355 (SHORT) | 5.625 | C × 5 | D × 5 | 5.675 | +50 |
| 455 (STANDARD) | 5.725 | C × 9 | D × 2 | 5.700 | −25 |
| 555 (LONG) | 5.825 | C × 8 | D × 3 | 5.855 | +30 |
| 655 (LONG) | 5.925 | C × 3 | D × 7 | 5.985 | +60 |
| 755 (LONG) | 6.025 | C × 7 | D × 4 | 6.010 | −15 |
| A = 6.0 FRONTAGE | | | | | |
| 255 (SHORT) | 6.025 | C × 7 | D × 4 | 6.010 | −15 |
| 355 (SHORT) | 6.125 | C × 6 | D × 5 | 6.165 | +40 |
| 455 (STANDARD) | 6.225 | C × 6 | D × 5 | 6.165 | −60 |
| 555 (LONG) | 6.325 | C × 5 | D × 6 | 6.320 | −5 |
| 655 (LONG) | 6.425 | | D × 10 | 6.450 | +25 |
| 755 (LONG) | 6.525 | C × 8 | D × 4 | 6.500 | −25 |

MODULAR ROOF MEMBERS 104a ARE REPRESENTED BY C
MODULAR ROOF MEMBERS 105a ARE REPRESENTED BY D

While the above mentioned embodiments have thus been described in conjunction with exemplified numbers of light collecting plate segments, the number of them is not limited to those described above. In addition, it has been described in conjunction with the light collecting plate segments having the length in each side of 100 mm and 150 mm, it is not restricted to those and the light collecting plate segments of 110 mm, 120 mm, 130 mm or 140 mm can be equally applied by adequately modifying the dimension of the length adjusting piece.

It should be understood that the present invention is not limited to the particular embodiment shown and described above, and various changes and modifications may be made without departing from the spirit and scope of the appended claims.

What is claimed is:

1. A roof system utilizing a solar cell comprising:

a first modular roof member composed of a plurality of first light collecting plate segments each of which having a solar cell embedded therein, the first light collecting plate segments being aligned in one direction and in another direction perpendicular to the one direction; and a second modular roof member disposed adjacent the first modular roof member and extending in the one direction, composed of a plurality of second light collecting plate segments each of which is equal in size to the first light collecting plate segments, the second light collecting plate segments being aligned in the one direction and in the other direction perpendicular to the one direction, the number of the second light collecting plate segments in the one direction being larger by one than that of the first light collecting plate segments;

wherein the one direction is a roof slope direction, the other direction is a roof lateral direction;

said roof system further comprising:

a ridge roof member, disposed adjacent the second modular roof member and extending in the one direction, composed of third light collecting plate segments each of which being equal in dimension to the first light collecting plate segments, the third light collecting plate segments being equal in number to said first light collecting plate segments, and a length adjusting piece slidably engaged in the slope direction along an end portion of the ridge roof member along the slope direction;

wherein said ridge roof member includes:

a framework body consisting of right and left end jambs, a ridge beam and a sill beam, the end jambs and beams being formed into a rectangular shape in plane, and a composite assembly interfitted to an internal periphery of said framework body, said composite assembly having a transparent substrate beneath which the plurality of third light collecting plate segments are juxtaposed;

wherein the ridge beam has:

a riser wall, and a horizontal adjusting surface provided with a bolt supporting groove formed in the end portion thereof, the bolt supporting groove being opened upward along the roof in a lateral direction and having an opening portion and a bottom portion, the opening portion is smaller in width than the bottom portion; and wherein the bolt supporting groove is provided, at a middle portion thereof, with a notch for accepting a bolt head.

2. A roof system as claimed in claim 1, wherein the length adjusting piece includes:

a horizontal slide surface which is approximately equal in width and in length to said horizonal adjusting surface;

a ridge door portion extending upward and disposed at an end portion of said horizontal slide surface closer to the eaves; and a flashing portion extending upward and disposed at an end portion of said horizontal slide surface closer to the ridge;

said horizontal slide surface has lateral side portions where an elongated adjusting bore for accepting the bolt is formed in the slope direction, the elongated adjusting bore is provided with a scale at a side edge thereof.

3. A roof system utilizing solar cells comprising:

a first modular roof member composed of a plurality of first light collecting plate segments each of which having a solar cell embedded therein, the first light collecting plate segments being aligned in parallel in a slope direction and a lateral direction perpendicular to said slope direction forming a plurality of columns and rows;

a second modular roof member extending from the first modular roof member in the slope direction, composed of a plurality of second light collecting plate segments each of which is equal in size to the first light collecting plate segments, the second light collecting plate segments being aligned in parallel in the slope direction and in the lateral direction perpendicular to said slope direction forming a plurality of columns and rows, the number of light collecting segments in the slope direction being larger by one than the number of light collecting plate segments in the slope direction of the first modular roof member;

a roof ridge member, extending from the second modular roof member in the slope direction, composed of a plurality of third light collecting plate segments each of which is equal in size to said first light collecting plate segments, the third light collecting plate segments being equal in number to that of one of said first modular roof member or said second modular roof member, and being aligned in parallel in the slope direction and the lateral direction; and a length adjusting piece being engaged to the roof ridge member to be slidable in the slope direction;

wherein each of said first modular roof member and said second modular roof member includes a framework body including right and left end jambs, a head beam and a sill beam, each of the end jambs having an internal surface to which a corresponding supporting jamb is mounted, the end jambs and beams being formed into a rectangular shape in plane, and a composite assembly interfitted to an internal periphery of said framework body, said composite assembly having a transparent substrate beneath which the plurality of light collecting plate segments are juxtaposed, wherein said ridge roof member includes a framework body consisting of right and left end jambs, a ridge beam and a sill beam, the end jambs and beams being formed into a rectangular shape in plane, and a composite assembly interfitted to an internal periphery of said framework body, said composite assembly having a transparent substrate beneath which the plurality of third light collecting plate segments are juxtaposed, the ridge beam having a riser wall and a horizontal adjusting surface for engaging the length adjusting piece provided with a bolt supporting groove formed in a tip portion thereof, the bolt supporting groove being opened upward along the roof lateral direction and having an opening portion and a bottom portion, the opening portion is smaller in width than the bottom portion, and wherein the bolt supporting groove is provided, at a middle portion thereof, with a notch for accepting a bolt head.

4. A roof system as claimed in claim 3, wherein the length adjusting piece includes:

a horizontal slide surface which is approximately equal in width and in length to said horizontal adjusting surface, a ridge door portion extending upward and disposed at an end portion of said horizontal slide surface closer to the eaves; and a flashing portion extending upward and disposed at an end portion of said horizontal slide surface closer to the ridge, wherein said horizontal slide surface has lateral side portions where an elongated adjusting bore for accepting the bolt is formed in the slope direction, the elongated adjusting bore is provided with a scale at a side edge thereof.

* * * * *